US012369685B1

(12) United States Patent
Klassen et al.

(10) Patent No.: US 12,369,685 B1
(45) Date of Patent: Jul. 29, 2025

(54) SHOE MIDSOLE WITH DELAYED ENERGY RETURN AND LATERAL SHEAR STABILITY

(71) Applicant: 1158990 B.C. Ltd., Surrey (CA)

(72) Inventors: James Brent Klassen, Osoyoos (CA); Benjamin Andrew Blackford, Vancouver (CA); Kellen Devries, Surrey (CA); Sava Vujic, Calgary (CA); Sarah Marie Dueck, Langley (CA); Michael Riley Gibney, Aldergrove (CA); David Michael Bernhardt, White Rock (CA); Steven Giles Dal Bello, Port Moody (CA); Bradley Graham Humble, Burnaby (CA); Javier Peter Fernandez-Han, Burnaby (CA); Alexander Sean Li, Langley (CA); Justin Michael Hebert, Airdrie (CA)

(73) Assignee: 1158990 B.C. Ltd., Surrey (CA)

( * ) Notice: Subject to any disclaimer, the term of this patent is extended or adjusted under 35 U.S.C. 154(b) by 0 days.

(21) Appl. No.: 18/946,667

(22) Filed: Nov. 13, 2024

Related U.S. Application Data

(60) Provisional application No. 63/706,610, filed on Oct. 11, 2024, provisional application No. 63/679,079, (Continued)

(51) Int. Cl.
*A43B 7/32* (2006.01)
*A43B 7/1415* (2022.01)
(Continued)

(52) U.S. Cl.
CPC .......... *A43B 13/181* (2013.01); *A43B 7/1415* (2013.01); *F16F 1/36* (2013.01)

(58) Field of Classification Search
None
See application file for complete search history.

(56) References Cited

U.S. PATENT DOCUMENTS 3,029,071 A   4/1962  Wells
4,342,158 A * 8/1982  McMahon ............. A43B 21/30
                                                36/35 B
(Continued)

FOREIGN PATENT DOCUMENTS

EP   0875164 A1  11/1998
EP   4157023 B1   8/2024
(Continued)

OTHER PUBLICATIONS

Al-Hurr Al-Dalli, "Adidas Switch FWQ review," https://runrepeat.com/adidas-switch-fwd, Nov. 13, 2023, 47 pages.

*Primary Examiner* — Jila M Mohandesi
(74) *Attorney, Agent, or Firm* — Seed IP Law Group LLP

(57) ABSTRACT

An energy return device for a midsole of a shoe comprises a resilient foam or matrix structure, such as a domed disk, around a cavity. The resilient structure is arranged to collapse into the cavity under foot strike pressure. The structure may initially resist the pressure primarily by compression forces directed around the cavity. As the cavity collapses these forces may provide decreasing vertical spring rate as the structure bends or as the forces become less vertical, causing the structure to stay more compressed through the midstride and energy return to be delayed until the user has moved further forward in their stance. At full collapse the material of the structure may resist further downward force of the user by direct compression. A lateral expansion limiter may resist lateral expansion to increase vertical force supplied by the compression forces around the cavity and (Continued)

reduce interference with other components. A support structure may help guide the collapse and increase spring force.

30 Claims, 51 Drawing Sheets

Related U.S. Application Data filed on Aug. 2, 2024, provisional application No. 63/669,653, filed on Jul. 10, 2024, provisional application No. 63/659,322, filed on Jun. 12, 2024.

(51) Int. Cl.
| | |
|---|---|
| *A43B 7/142* | (2022.01) |
| *A43B 7/144* | (2022.01) |
| *A43B 13/18* | (2006.01) |
| *F16F 1/36* | (2006.01) |

(56) References Cited

U.S. PATENT DOCUMENTS

| | | | |
|---|---|---|---|
| 4,494,321 A * | 1/1985 | Lawlor | A43B 13/20 |
| | | | D2/956 |
| 4,535,553 A | 8/1985 | Derderian et al. | |
| 4,918,838 A * | 4/1990 | Chang | A43B 13/203 |
| | | | 36/28 |
| 5,005,299 A | 4/1991 | Whatley | |
| 5,014,449 A * | 5/1991 | Richard | A43B 13/187 |
| | | | 36/114 |
| 5,353,523 A | 10/1994 | Kilgore et al. | |
| 5,822,886 A | 10/1998 | Luthi et al. | |
| 5,918,384 A | 7/1999 | Meschan | |
| 6,266,897 B1 | 7/2001 | Seydel et al. | |
| 6,553,692 B1 | 4/2003 | Chung | |
| 6,732,457 B2 * | 5/2004 | Gardiner | A43B 13/38 |
| | | | 36/43 |
| 6,880,267 B2 | 4/2005 | Smaldone et al. | |
| 6,964,120 B2 | 11/2005 | Cartier et al. | |
| 7,089,690 B2 | 8/2006 | Krstic | |
| 7,159,339 B2 | 1/2007 | Mathieu et al. | |
| 7,219,449 B1 | 5/2007 | Hoffberg et al. | |
| 7,228,648 B2 | 6/2007 | Yang | |
| 7,401,419 B2 | 7/2008 | Lucas et al. | |
| 7,644,518 B2 | 1/2010 | Chandler et al. | |
| 7,757,410 B2 | 7/2010 | Aveni et al. | |
| 7,757,411 B2 | 7/2010 | Nakano | |
| 7,877,899 B2 | 2/2011 | Nishiwaki et al. | |
| 8,122,615 B2 | 2/2012 | Lucas et al. | |
| 8,555,529 B2 | 10/2013 | Antonelli et al. | |
| 8,707,582 B2 * | 4/2014 | Klassen | F16F 1/025 |
| | | | 267/164 |
| 8,789,293 B2 | 7/2014 | Greene | |
| 9,320,317 B2 | 4/2016 | Bernhard et al. | |
| 9,500,245 B2 * | 11/2016 | Klassen | A43B 13/12 |
| 9,717,304 B2 | 8/2017 | Bernhard et al. | |
| 9,775,403 B2 | 10/2017 | Bernhard et al. | |
| 9,974,356 B2 * | 5/2018 | Foxen | A43B 7/1485 |
| 10,045,589 B2 * | 8/2018 | Abshire | A43B 21/26 |
| 10,058,144 B2 * | 8/2018 | Foxen | A43B 13/146 |
| D869,830 S | 12/2019 | Lucas et al. | |
| 10,709,197 B2 | 7/2020 | Sills | |
| 10,721,992 B2 | 7/2020 | Bernhard et al. | |
| 10,806,215 B2 | 10/2020 | Cortez et al. | |
| D930,333 S | 9/2021 | Miner | |
| 11,166,524 B2 | 11/2021 | Case et al. | |
| 11,213,094 B2 | 1/2022 | Case et al. | |
| 11,330,860 B2 * | 5/2022 | Klassen | A43B 13/12 |
| 11,419,386 B2 | 8/2022 | Case et al. | |
| 11,707,106 B2 | 7/2023 | Aubonnet et al. | |
| 11,957,206 B2 | 4/2024 | Le et al. | |
| 11,963,576 B2 | 4/2024 | Kita et al. | |
| 11,980,249 B2 | 5/2024 | Montross et al. | |
| 12,070,098 B2 | 8/2024 | Case et al. | |
| 12,171,305 B1 * | 12/2024 | Klassen | A43B 7/32 |
| 2003/0126760 A1 * | 7/2003 | LeVert | A43B 13/187 |
| | | | 36/27 |
| 2003/0188455 A1 | 10/2003 | Weaver, III | |
| 2004/0216330 A1 | 11/2004 | Swigart | |
| 2005/0132607 A1 | 6/2005 | Dojan et al. | |
| 2006/0213082 A1 | 9/2006 | Meschan | |
| 2007/0119074 A1 | 5/2007 | Aveni et al. | |
| 2008/0166524 A1 | 7/2008 | Skaja et al. | |
| 2008/0256827 A1 | 10/2008 | Hardy et al. | |
| 2009/0056165 A1 | 3/2009 | Lee | |
| 2009/0139114 A1 * | 6/2009 | Malek | A43B 7/144 |
| | | | 36/35 B |
| 2009/0265868 A1 | 10/2009 | Aveni | |
| 2010/0058616 A1 | 3/2010 | Ryoo | |
| 2011/0277351 A1 * | 11/2011 | Scoledes | A43B 5/10 |
| | | | 264/129 |
| 2012/0159810 A1 * | 6/2012 | Klassen | F16F 1/324 |
| | | | 267/152 |
| 2013/0160324 A1 | 6/2013 | Peyton et al. | |
| 2015/0007456 A1 * | 1/2015 | Klassen | A43B 21/26 |
| | | | 36/102 |
| 2016/0270477 A1 | 9/2016 | Kurosaki et al. | |
| 2017/0027279 A1 * | 2/2017 | Klassen | F16F 1/32 |
| 2020/0359741 A1 | 11/2020 | Case et al. | |
| 2021/0161249 A1 | 6/2021 | Smith et al. | |
| 2021/0321716 A1 | 10/2021 | Kormann et al. | |
| 2021/0368907 A1 | 12/2021 | Wardlaw et al. | |
| 2022/0031018 A1 | 2/2022 | Bernhard et al. | |
| 2022/0125160 A1 | 4/2022 | Baza et al. | |
| 2023/0041399 A1 | 2/2023 | Bernhard et al. | |
| 2023/0140074 A1 | 5/2023 | Bernhard et al. | |
| 2024/0138513 A1 | 5/2024 | Despots Allaire et al. | |

FOREIGN PATENT DOCUMENTS

| | | |
|---|---|---|
| WO | 8103602 A1 | 12/1981 |
| WO | 2016168080 A1 | 10/2016 |

\* cited by examiner

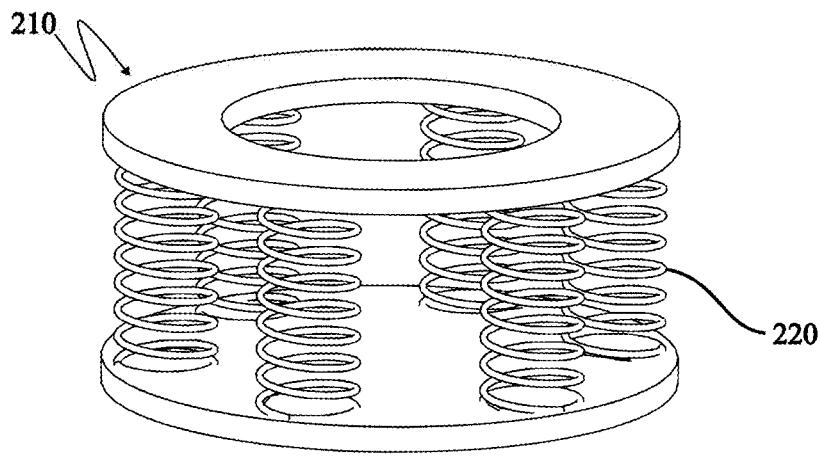
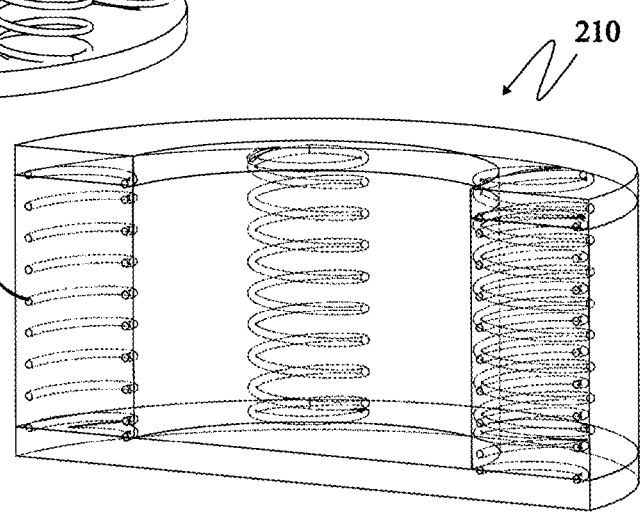
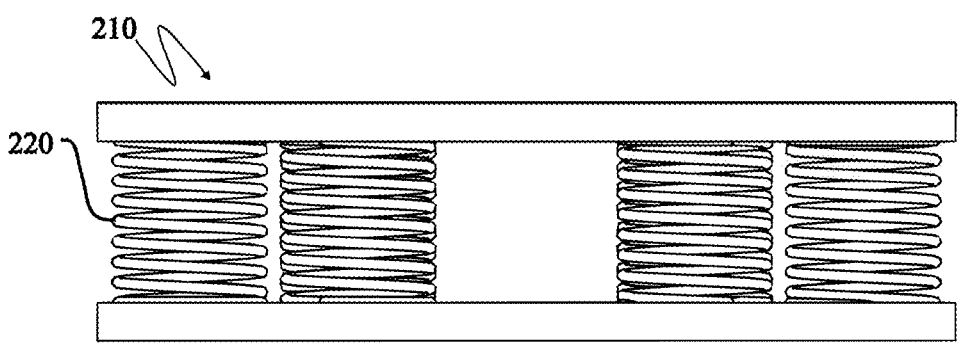
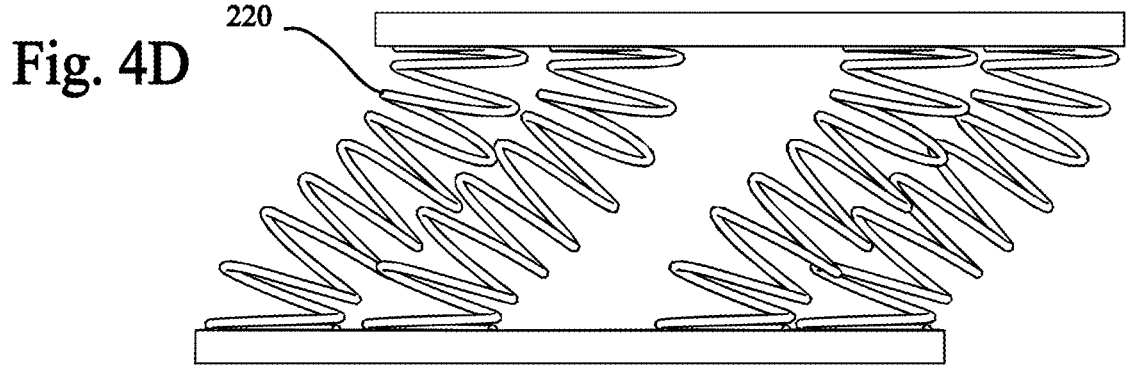

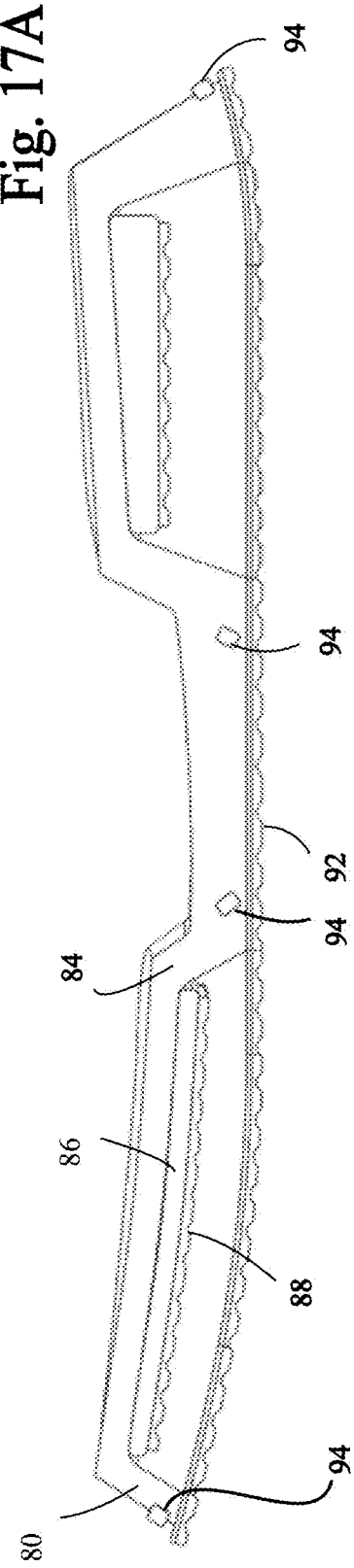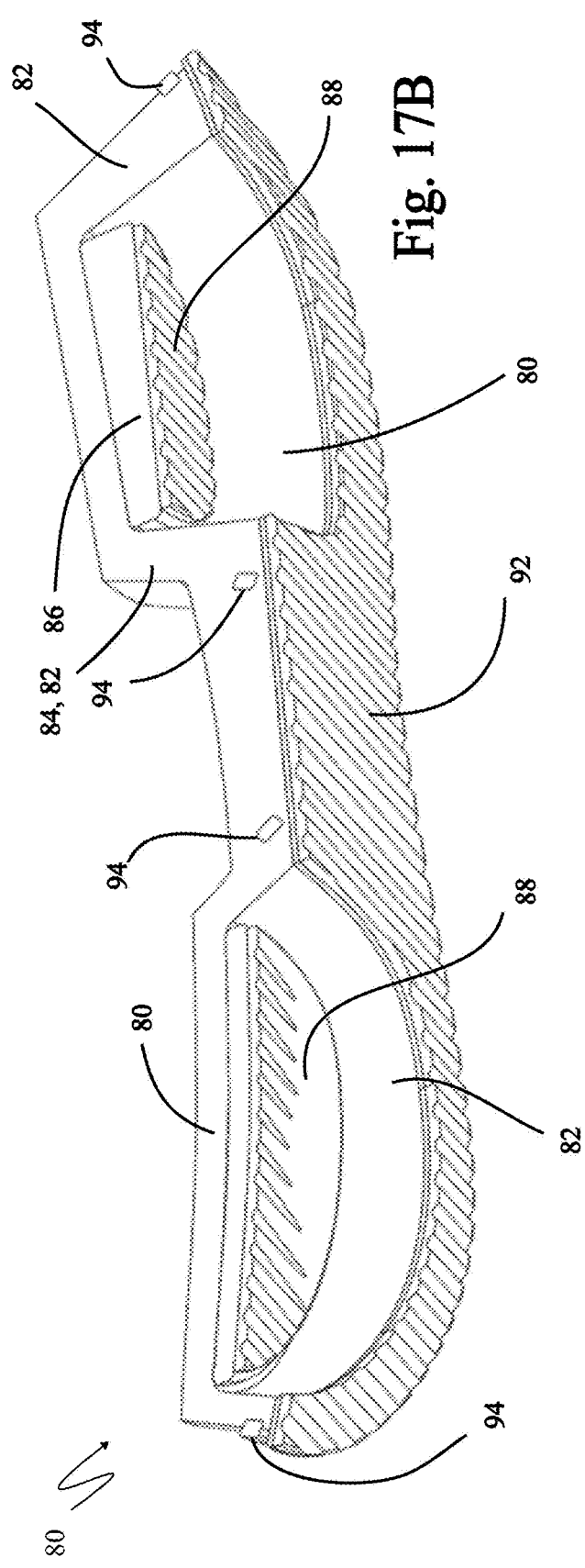

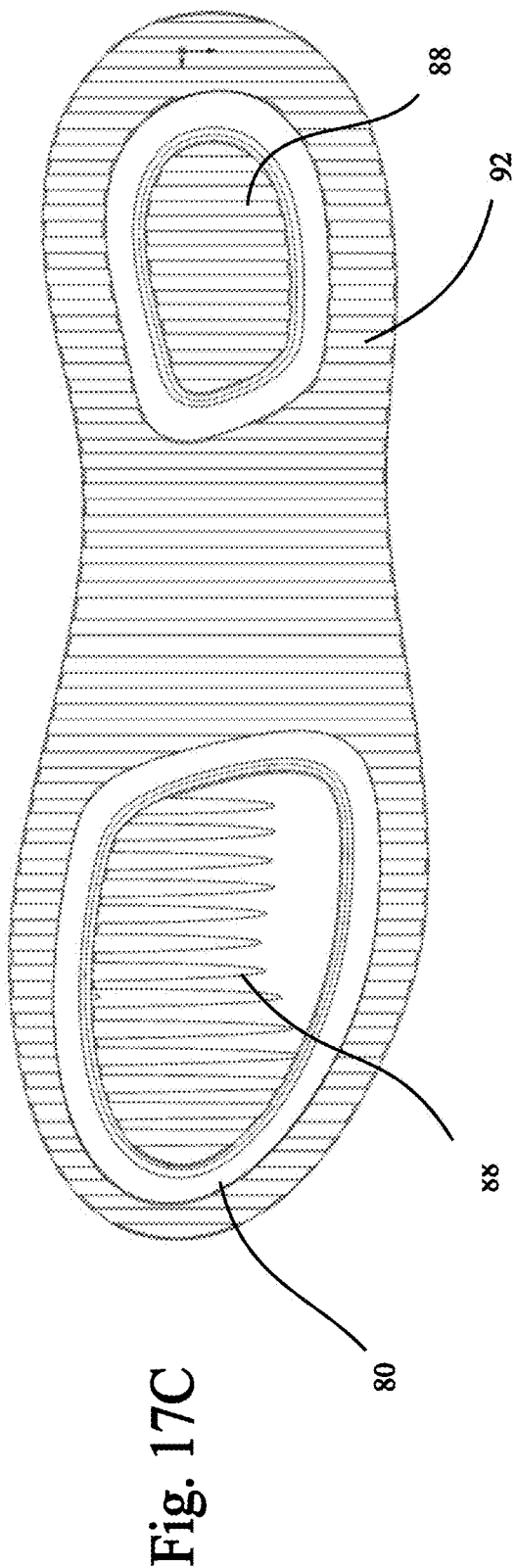
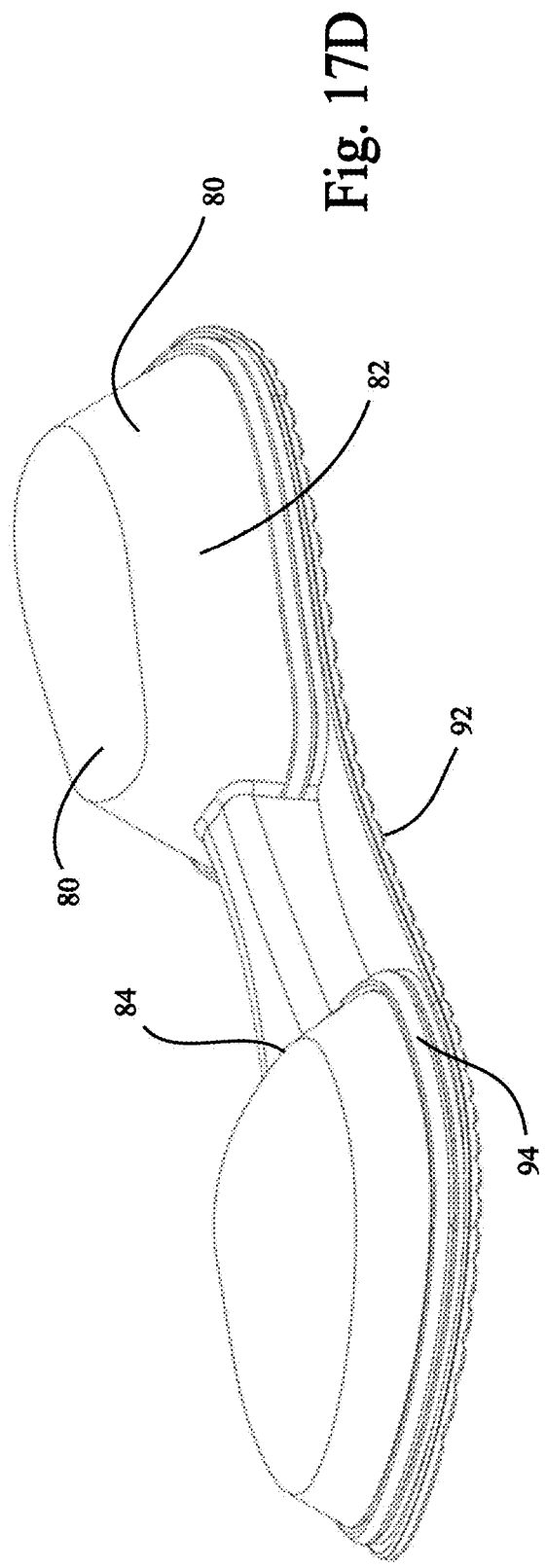
Fig. 17C
Fig. 17D

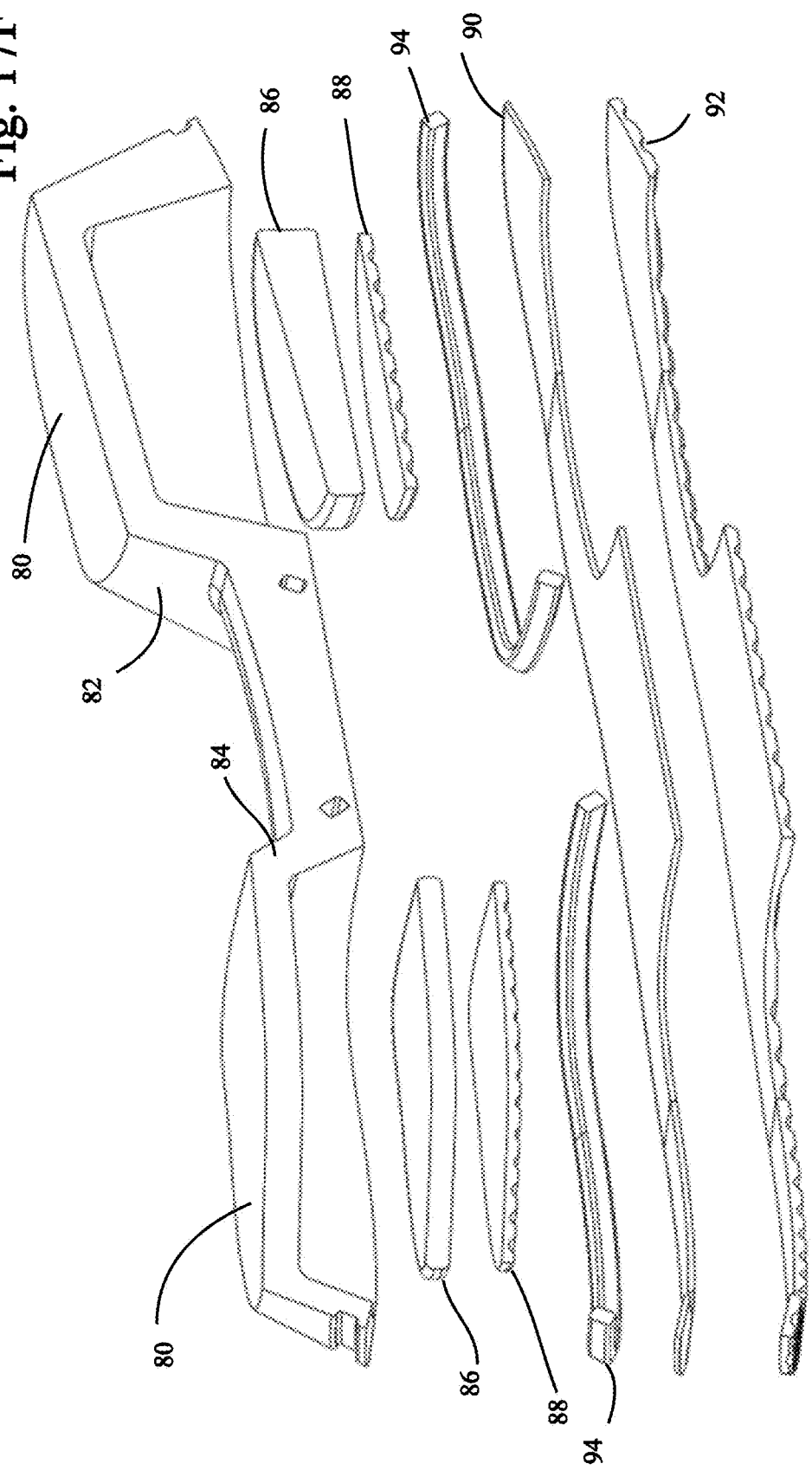

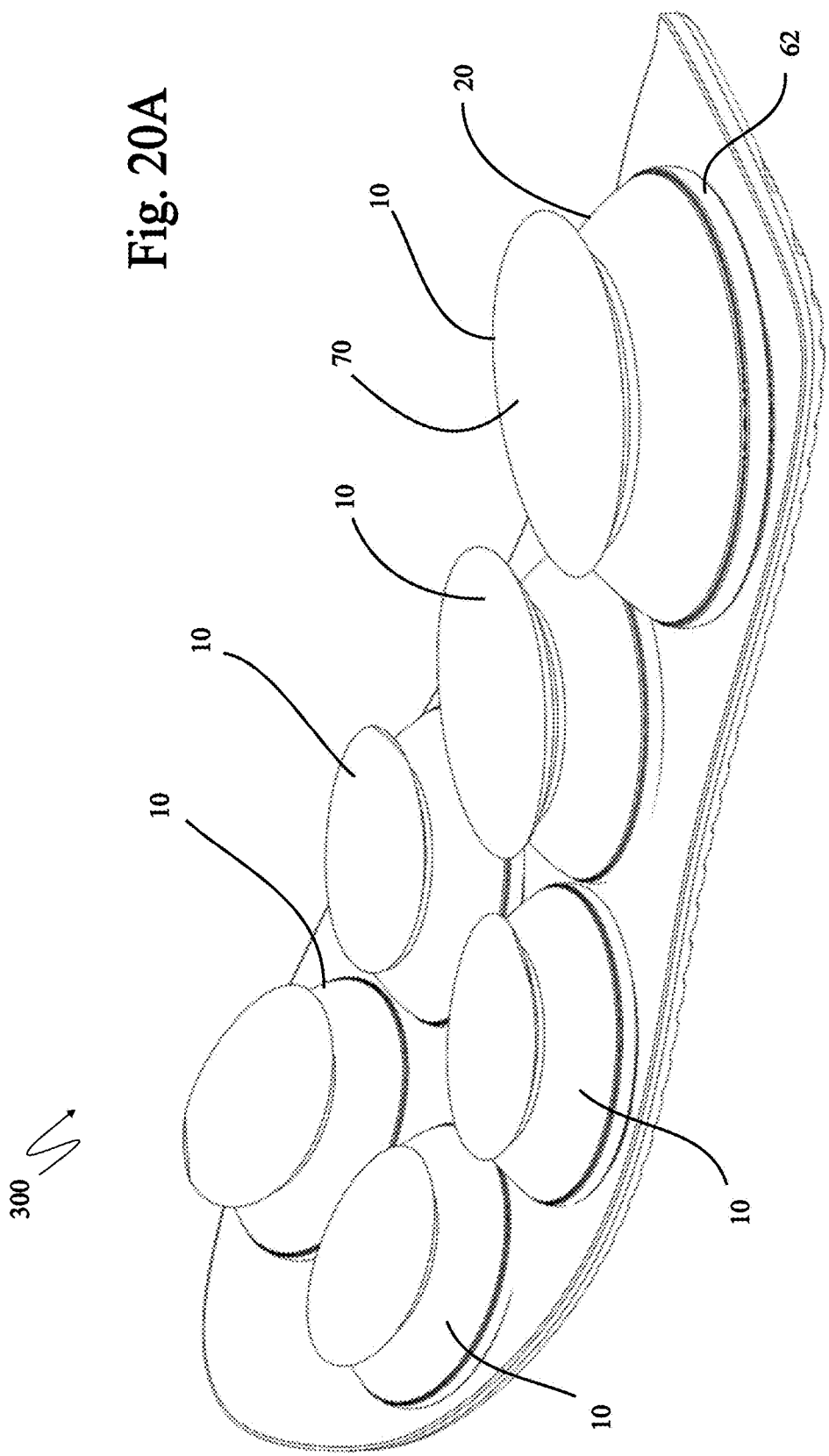

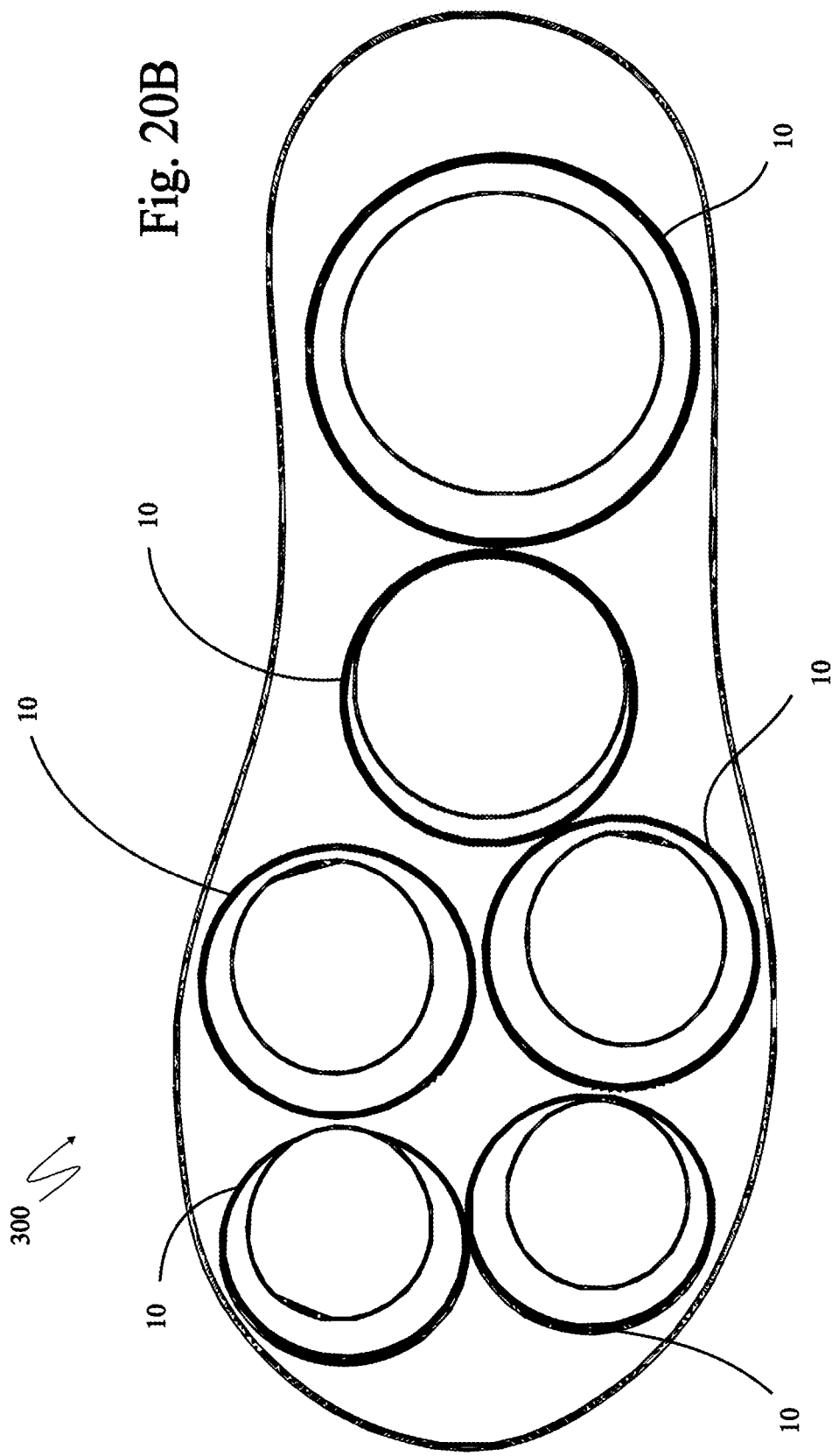

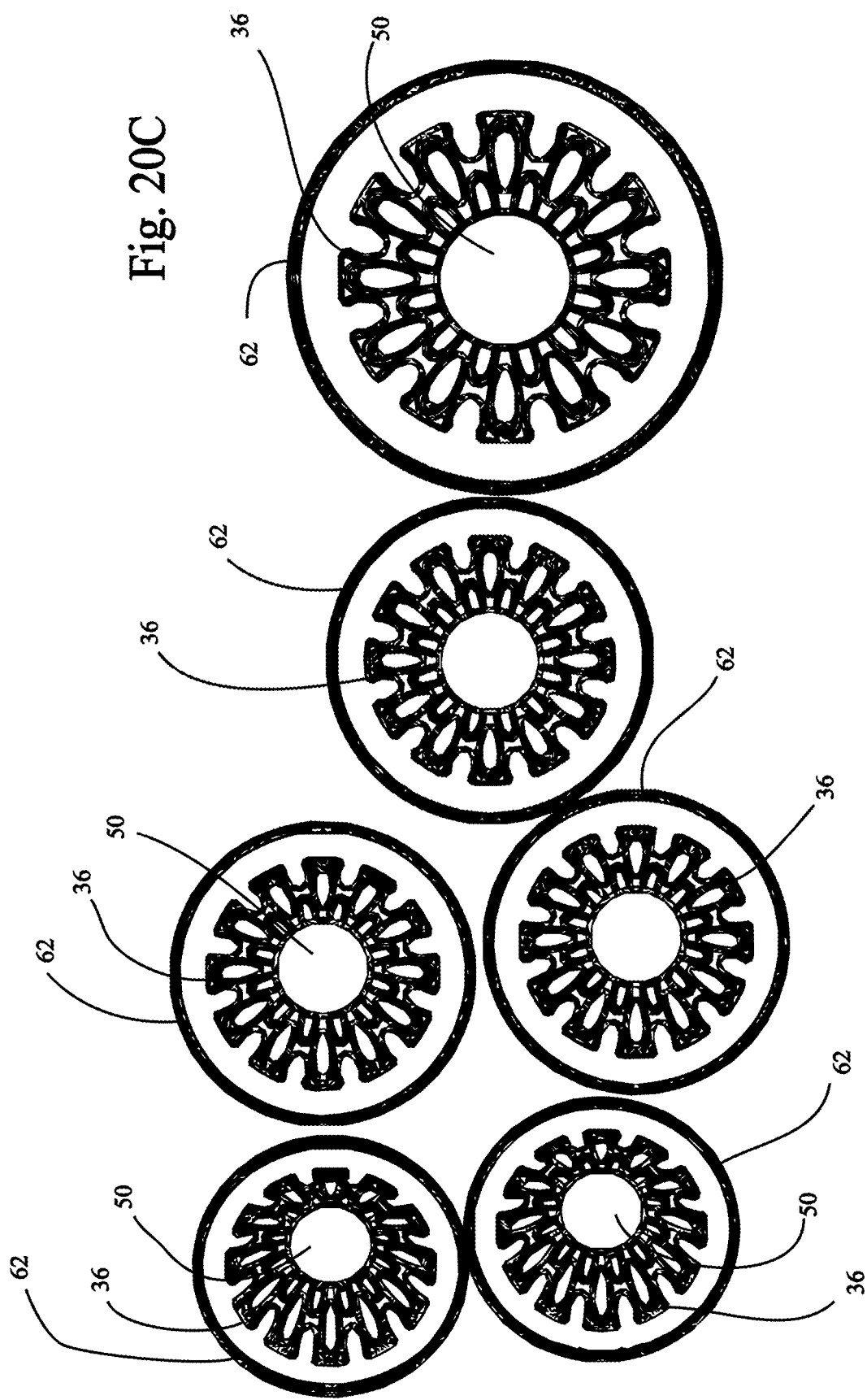

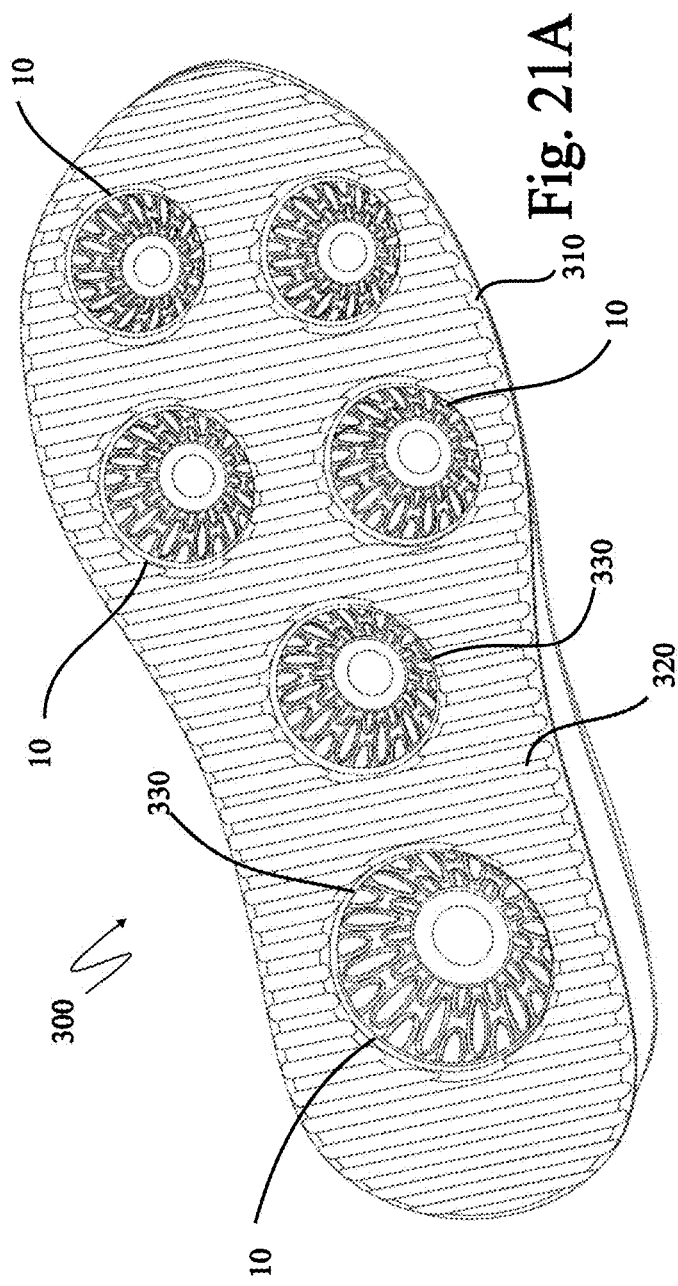
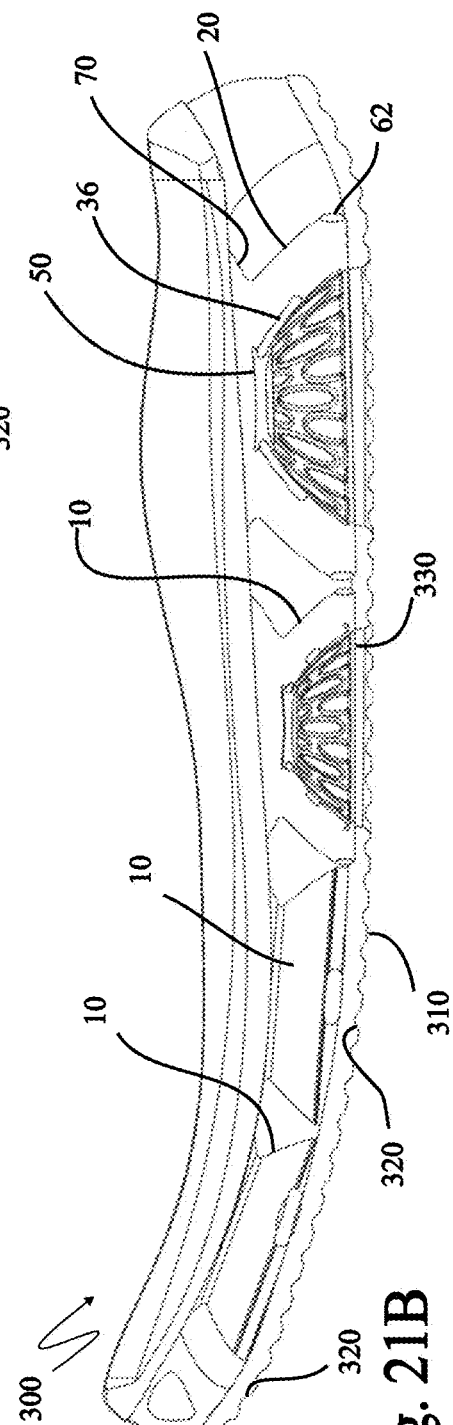
Fig. 21A
Fig. 21B

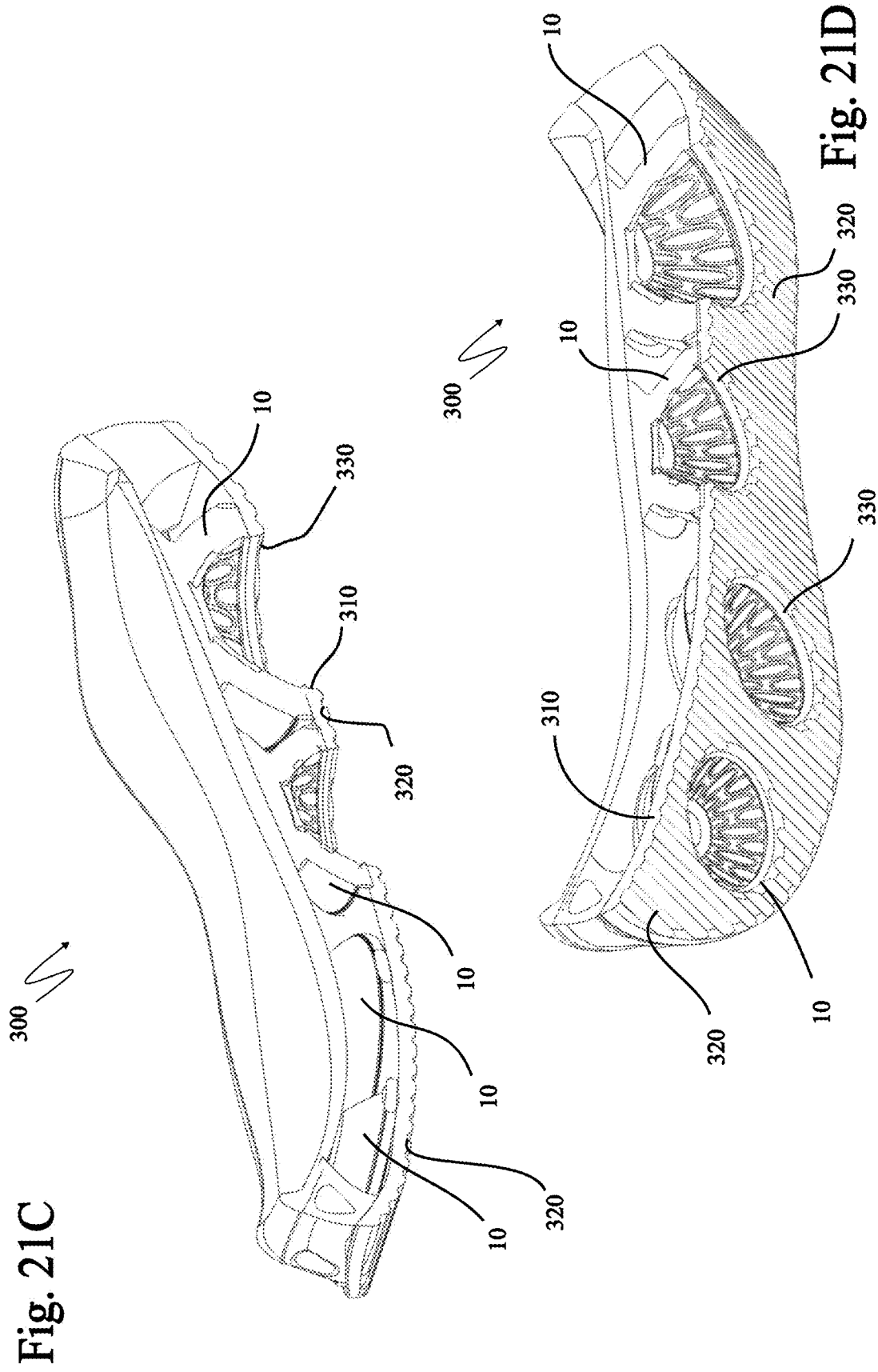

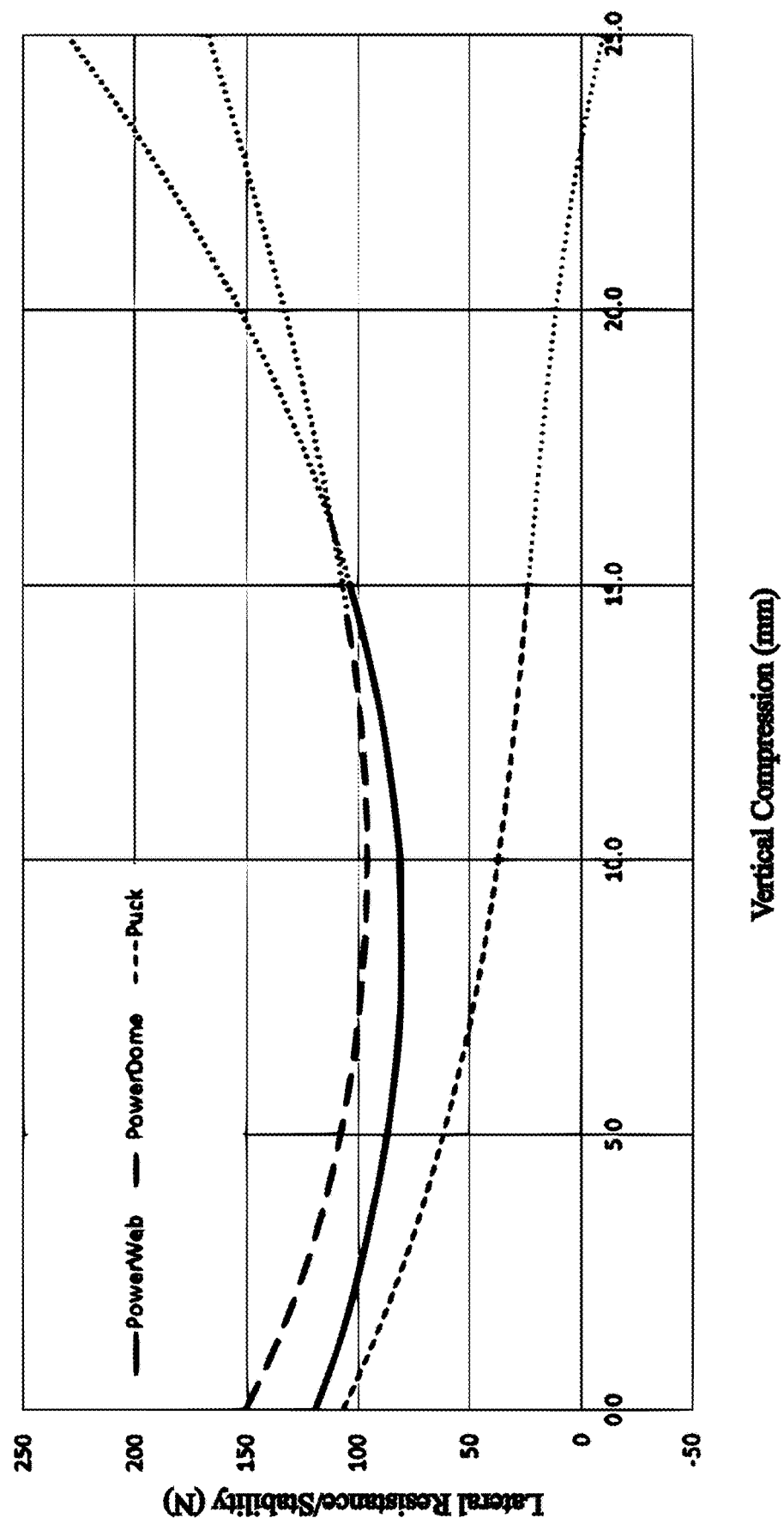

Fig. 31A
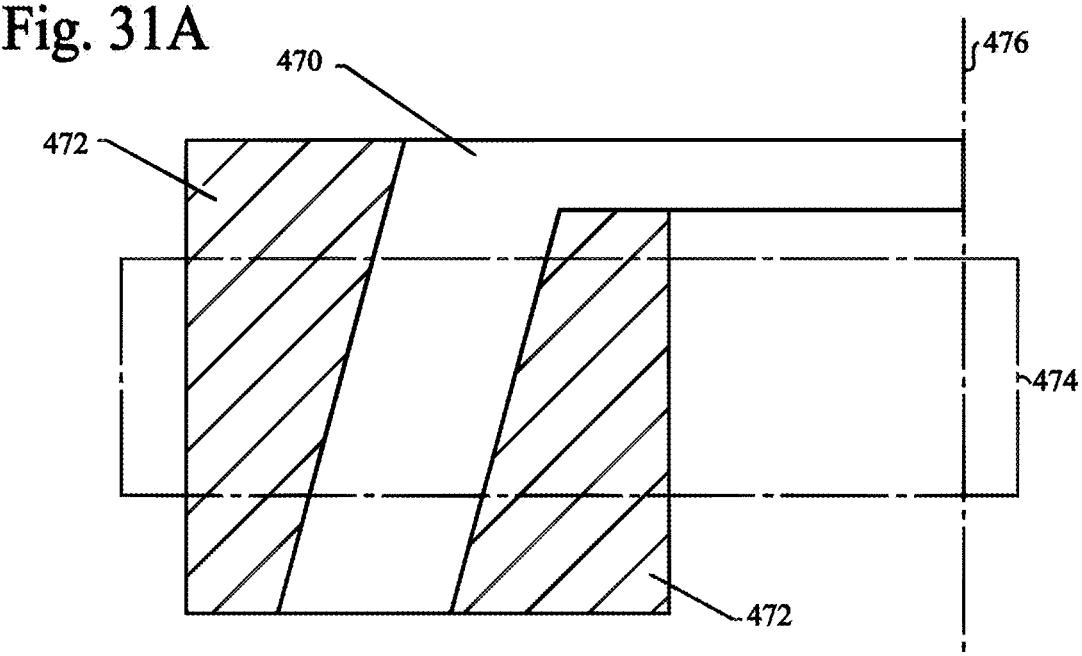
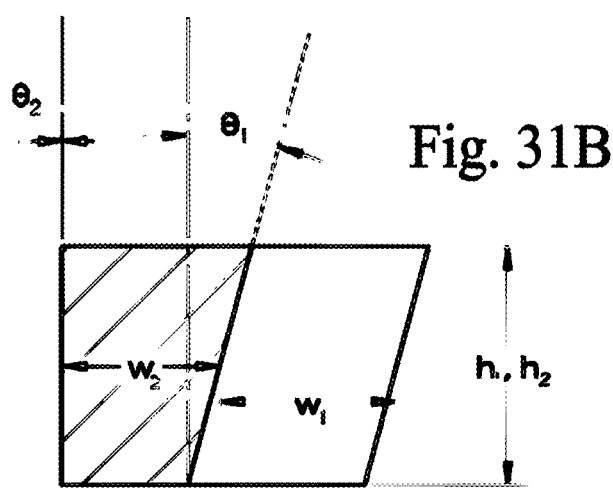
Fig. 31B
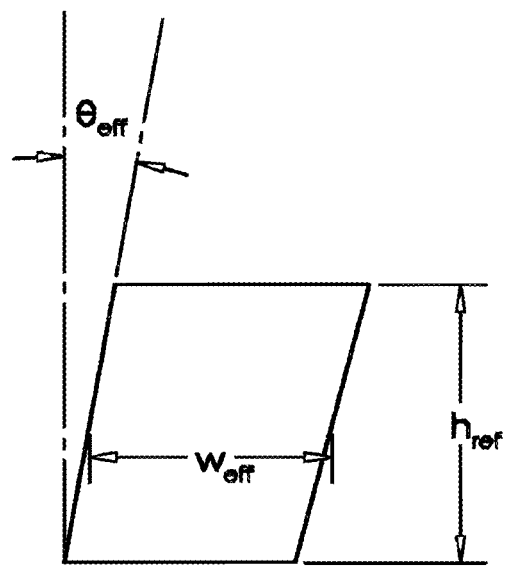
Fig. 31C

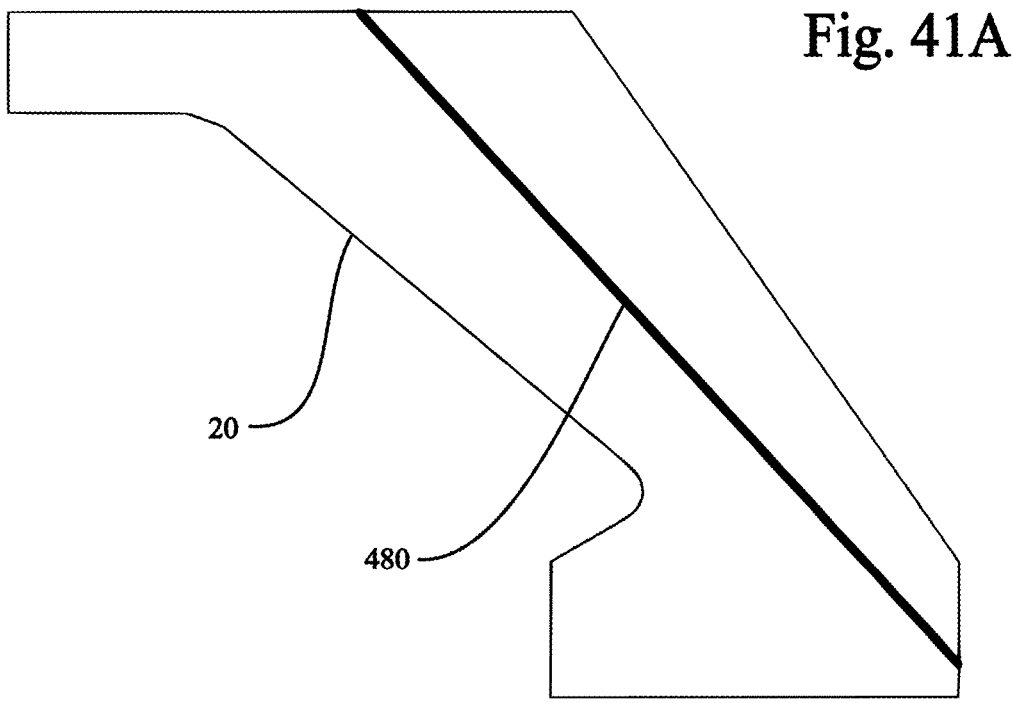
Fig. 41A
Fig. 41B
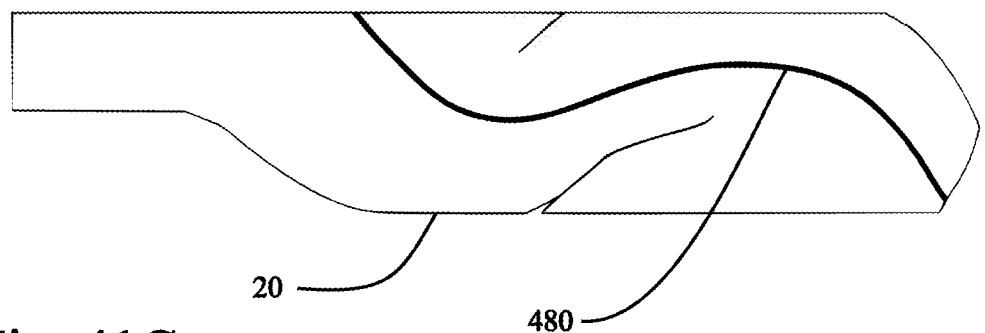
Fig. 41C
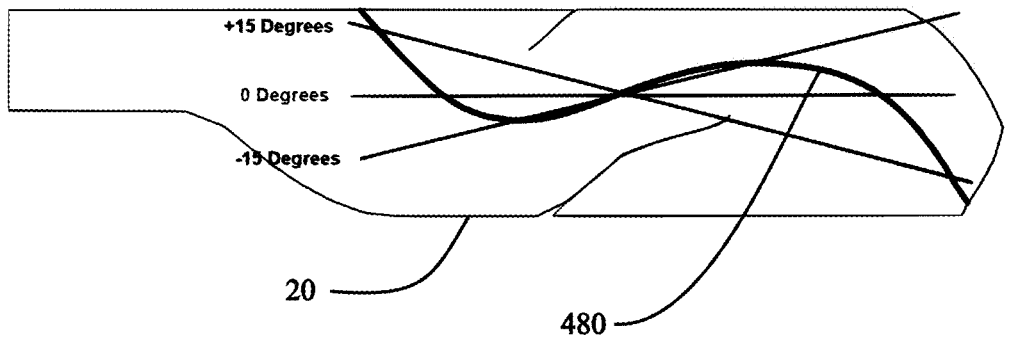

SHOE MIDSOLE WITH DELAYED ENERGY RETURN AND LATERAL SHEAR STABILITY

TECHNICAL FIELD

Shoes with high travel, energy return and lateral shear stability.

BACKGROUND

The inventors have previously disclosed footwear energy return devices, for example using a conical disk with a ring spring.

It is desirable for a shoe midsole to provide a wide and diverse range of performance benefits. This is very challenging with conventional solid foam midsole construction.

To achieve some desired characteristics there may be compromises that must be made to achieve them. High compression travel for a given stack height is desirable for the benefit of providing greater impact reduction by reducing the deceleration rate. However, higher travel will typically, with a solid foam midsole, have the compromise of reduced lateral shear stability because solid foams (or other geometries such as a foam cylinder) show reduced lateral shear stability if they are taller for a given diameter. A solid foam midsole will also demonstrate lower lateral shear stability the more it is compressed. This is undesirable for a shoe because lateral shear stability is typically more desirable when the midsole is compressed.

Lower durometer foam is desirable for the benefit of providing greater impact reduction by reducing the vertical deceleration rate during foot strike (partially as a result of providing greater travel) but it has the compromise of greater reduction in lateral shear stability because solid foams (or other geometries such as a foam cylinder) show reduced lateral shear stability if they are lower durometer.

In other words, it is expected, when designing a solid foam midsole, that increasing the travel, through the use of lower durometer foam and/or greater at-rest thickness, will decrease lateral shear stability of the midsole. This can lead to instability, poor ground feel and the risk of ankle roll. Shoe designers have been reticent to create midsoles with higher compression travel, by use of lower durometer foam, because it would lead to low lateral shear stability.

Additionally, common foam midsoles return a high percentage of foot-strike energy undesirably early in the stance phase of the gait cycle, before the user's center of gravity (CG) is forward of their heel. This can be undesirable because energy returned before this point does not contribute as effectively to forward motion of the person. This problem can be partially addressed by using a thicker and/or softer foam. The thicker and/or softer foam reduces the bounce frequency so more of the energy can be released later in the stride than with a higher bounce frequency of a thinner conventional foam midsole. However, the thicker and/or softer foam may feel unstable, reduce ground feel, and increase the risk of an ankle roll-over due to the high lateral shearing propensity of the midsole.

SUMMARY

A foam sole or midsole component within a range of geometries, provides for greater compression of the midsole for a given at-rest stack height as compared to a conventional solid foam midsole. Embodiments of the device also provide increased lateral shear stability (rather than decreased lateral shear stability) as they approach and reach full compression. This allows for the use of higher compression travel for a given starting thickness or stack height, without compromising lateral shear stability. Embodiments of the present device allow high midsole compression travel without sacrificing lateral shear stability.

In addition to improved impact reduction as a result of higher travel for a given at-rest thickness or stack height, embodiments of the device achieve a high level of propulsion by combining high travel with a spring rate that reduces through the mid-range of the compression, much more than with a conventional solid foam midsole. This allows the midsole to remain more compressed than a typical midsole, through the midstride, so there is more expansion travel available to return more energy to the user as they unweight the heel section and other parts of the midsole.

In an embodiment, a highly resilient material may include resilient foam, such as, but not limited to Pebax®, is configured as a conical disk shape, where the average OD of a section of the diagonal sidewall of a dome or linear or curved section of the device on a horizontal plane at 75% of the stack height (this OD is referred to as the functional upper OD or FUOD) has the following relationship to the ID of a section of the diagonal sidewall of a dome or linear or curved section of the device on a horizontal plane at 25% of the stack height (this ID is referred to as the functional lower ID or FLID): in cases where the FUOD is greater than the FLID, the FUOD can be <150%, <149%, <148%, <147%, <146%, <145%, <144%, <143%, <142%, <141%, <140% of the FLID and in cases where the FUOD is smaller than the FLID, the FUOD can be >70%, >71%, >72%, >73%, >74%, >75%, >76%, >77%, >78%, >79%, >80% of the FLID. The stack height is measured vertically from the bottom of the outsole to the top of the upper and does not include any removable insoles. In embodiments where the device is comprised of linear sections having the same cross-section as a conical disk, the FLID will correspond to the distance between the inner walls at 25% of the stack height, and the FUOD will correspond to the distance between the outer walls at 75% of the stack height.

In some embodiments, a conical disk may be used on its own with a portion of the benefit of the device. In some embodiments, a circumferentially (or horizontally) expandable conical disk or web member (or linear or curved diagonal web member) is secured to the inside surface, outside surface or is embedded inside of the foam conical disk. This circumferentially expandable conical disk may be of a solid material such as, but not limited to Delrin® (polyoxymethylene) or Pebax®, or polypropylene. It may also be constructed from a higher density foam than the conical foam disk with some of the same benefits. The circumferentially expandable conical disk increases the strain on the conical foam disk during compression in such a way as to further increase the effect of reducing the spring force and/or spring rate through the midrange of the travel. The circumferentially expandable conical disk will also further increase the lateral shear stability of the midsole.

In some embodiments, a linear or curved diagonal foam structure may be used on its own with a portion of the benefit of the device. In some embodiments, a horizontally expandable linear or curved diagonal web member is secured by one or more of being attached to the inside surface, being attached to the outside surface, or being embedded inside of the foam structure. This horizontally expandable web member may be of a solid material such as, but not limited to Delrin® (polyoxymethylene) or Pebax®, or polypropylene. It may also be constructed from a higher density foam than the linear or curved diagonal foam structure with some of the same benefits. The horizontally expandable linear or curved diagonal web member increases the strain on the linear or curved diagonal foam structure during compression in such a way as to further increase the effect of reducing the spring force and/or spring rate through the midrange of the travel and/or increase the lateral shear stability of the midsole.

Some embodiments of the present device provide higher than usual compression travel for a given stack height, as compared to a conventional foam midsole. This can provide improved impact reduction during ground strike. Some embodiments disclosed here provide a reduced spring rate partway through the travel, which results in a delayed energy return to increase propulsion. Some embodiments of the device disclosed here also provide increased lateral shear stability as they are compressed, as a result of the unique geometry, in comparison to a conventional foam midsole.

In various embodiments there is provided an energy return device for a midsole of a shoe for absorbing and returning energy from compression of the device under a downward force applied from a typical wearer to an upper of the shoe over a range of travel extending in a height direction from the upper of the shoe in an uncompressed state towards an outsole of the shoe, the energy return device comprising a resilient structure of compressible foam or matrix material supporting the upper in relation to the outsole, the resilient structure defining a cavity, the resilient structure defining an opening for air to enter the cavity or being permeable to air; the resilient structure being arranged to collapse, under the compression by the downward force applied to the upper by the typical user, into the cavity so that during a first part of the range of travel of the compression the structure deforms by bending of the resilient structure, the resilient structure collapsing into lateral bounds defined by the resilient structure at a height corresponding to a maximum lateral extent of the cavity, and during a second part of the range of travel of the compression at a further degree of compression than the first part the resilient structure deforms by direct compression of the material of the resilient structure between the insole and the outsole. The compression of the material of the resilient structure between the insole and the outsole may include the vertical compression of the now-horizontal sidewall (a lateral wall of the resilient structure) such that there remains no cavity or air gap between the now-horizontal sidewall and a base of the midsole device or the outsole of the shoe.

In various embodiments an energy return device there may be one or more of the features of: the energy return device comprises a lateral expansion limiter arranged to resist lateral expansion of the resilient structure; the resilient structure comprises a domed disk when not compressed under the downward force; the domed disk comprises a conical disk; the conical disk is a hollow frustum; the lateral expansion limiting structure comprises a ring about a base of the domed disk; the ring is a ring spring; the energy return device comprises a support structure extending along walls of the domed disk and having greater stiffness than the domed disk for shaping the collapse of the dome under the compression by the downward force; the support structure comprises a conical disk; the support structure comprises a web; the web comprises radially extending fingers; a first finger is circumferentially connected to a second finger with a bridge member at a first radial position and said second finger and a third finger are connected together at a second radial position and the second finger and the third finger are not connected together at the first radial position; the bridge member is thinner than the first finger member where it is attached to the first finger member and thinner than the second finger member where it is attached to the second finger member; successive circumferentially adjacent fingers of the radially extending fingers are not all circumferentially connected at an upper end of the web; the successive circumferentially adjacent radially extending fingers are not all circumferentially connected at a lower end of the web; under the compression of the structure under the downward force from the user the support structure compresses from conical to flat; under the compression of the structure under the downward force from the user the support structure compresses from conical to inverted conical; the support structure is attached to an inside surface of the domed disk; the support structure is attached to an outside surface of the domed disk; the support structure is embedded within the domed disk; the support structure has pockets or through holes that are radially aligned so as to make the insert conical disc insert more extensible or compressible in the circumstantial direction relative to the radial direction, such that under the compression by the downward force, the support structure flares out at a bottom end of the support structure increasing a strain deformation of and around a bottom of the domed disk; the domed disk when not compressed by the downward force has an upper average outer diameter at a plane perpendicular to the height direction at 75% of the stack height that is <150%, <149%, <148%, <147%, <146%, <145%, <144%, <143%, <142%, <141%, or <140% and >70%, >71%, >72%, >73%, >74%, >75%, >76%, >77%, >78%, >79%, or >80% of a lower average inner diameter at a plane perpendicular to the height direction at 25% of the stack height; the energy return device comprises an opening in the outsole, and the opening for air to enter the cavity is present and aligned with the opening in the outsole or the structure is permeable to air; the outsole has a tread design which allows air to flow in and out of the conical disk assembly and to the edges of the outsole when it is in contact with the ground; the opening for air to enter the cavity is present and aligned with the opening in the outsole and a ceiling of the cavity comprises a surface adapted to contact ground under the shoe in use; the lateral expansion limiter comprises the upper or the outsole; the energy return device comprises a compression biased damper made of a compressible material and adapted to begin compressing part way through the range of travel; the compression biased damper is located within the cavity; the energy return device has greater than 40%, or greater than 50% of a total energy return within a portion of the range of travel corresponding to the downward force being less than 50% of the downward force applied from the typical wearer; a portion of the resilient structure including at least parts of 80% or more, 70% or more, 60% or more, 50% or more, 40% or more, 30% or more, 20% or more, 10% or more of a height of the resilient structure, when not compressed under the downward force, vertically overlaps the cavity; when the resilient structure is compressed in the height direction, there is a degree of compression less than or equal to the compression of the device under the downward force applied from the typical wearer at which a set of points of the resilient structure forming, when the structure is not compressed under the downward force, a straight line in a vertical cross section of the resilient structure having an angle in relation to the height direction representing an outer wall angle of the resilient structure, are shifted under the degree of compression to form a curve that crosses a plane perpendicular to the height direction 3 times or more; a plane through which the S-curve passes 3 times or more is tilted by 1 to 2 deg, 2 to 3 deg, 3 to 4 deg, 4 to 5 deg, 5 to 6 deg, 6 to 7 deg, 7 to 8 deg, 8 to 9 deg, or 9 to 10 deg, 10 to 11 deg, 11 to 12 deg, 12 to 13 deg, 13 to 14 deg, 14 to 15 deg, 15 to 16 deg, 16 to 17 deg, 17 to 18 deg, 18 to 19 deg, 19 to 20 deg from being perpendicular to the height direction; an outer angle of the resilient structure, or the outer wall angle, measured from vertical is >15 deg, >16 deg, >17 deg, >18 deg, >19 deg, >20 deg, >21 deg, >22 deg, >23 deg, >24 deg, >25 deg, >26 deg, >27 deg, >28 deg, >29 deg, >30 deg, >31 deg, >32 deg, >33 deg, >34 deg, >35 deg, >36 deg, >37 deg, >38 deg, >39 deg, >40 deg, >41 deg, >42 deg, >43 deg, >44 deg, >45 deg, >46 deg, >47 deg, >48 deg, >49 deg, >50 deg, >51 deg, >52 deg, >53 deg, >54 deg, >55 deg measured over 40% or more, 50% or more, 60% or more, 70% or more of a height distance from the outsole to the upper; the opening for air to enter the cavity and in which the opening has a check valve biased to resist air flow out of the cavity; the resilient structure further defines a second opening to the cavity, the second opening having a restricted orifice; having the opening for air to enter the cavity in which the opening has an orifice restricted in size to cause greater resistance to compression, as compared to energy return in expansion from the energy return device; having the opening for air to enter the cavity and in which the opening is adapted to be restricted by the downward force applied from the typical wearer; the opening is located at a heelward end of the resilient structure and adapted to be restricted by the downward force applied by a heel strike and become less restricted as the user moves forward in a stride; the opening is adapted to be less restricted by a foot strike that is not a heel strike than by a heel strike; the energy return device is shaped to conform to a tapering of the height between the upper and the outsole towards a front end of the midsole; the resilient structure is formed as one piece with the outsole; the resilient structure is formed of closed cell foam; where the compression of the material of the resilient structure between the insole and the outsole includes the vertical compression of the now-horizontal sidewall.

In some embodiments there is provided a shoe having a midsole comprising one or more energy return devices having one or more of the preceding features. In various further embodiments, the shoe may have any one or more of the following features: a single energy return device of the one or more energy return devices is used under a heel of the shoe in the midsole; the one or more energy return devices are multiple energy return devices; the shoe comprises at least an energy return device of the multiple energy return devices under the heel of the shoe and plural energy return device of the multiple energy return devices under the forefoot of smaller diameter and height than the at least an energy return device under the heel; the multiple energy return devices include two energy return devices in the forefoot and are collectively wider than the upper by 10% or more, 20%, or more, 30% or more, of a largest diameter of the two energy return devices; the shoe comprises a wedge of compressible foam or deformable material ahead of the forwardmost energy return device connecting a bottom surface of the upper with a top surface of the outsole, that shears as the stance progresses toward toe-off, and the resistance to shearing of this member un-shears the structure during toe-off; the multiple energy return devices are arranged from the heel to the forefoot so that a second energy return device of the multiple energy return devices begins to compress from foot strike pressure before a previous disk is fully compressed; one or more of the one or more energy return devices protrude into or through the outsole; the one or more of the one or more energy return devices contact the ground.

BRIEF DESCRIPTION OF THE FIGURES

Embodiments will now be described with reference to the figures, in which like reference characters denote like elements, by way of example, and in which:

FIG. 4A is a perspective view of a cylindrical array of coil springs demonstrating an operational principle of a block of foam under compression.

FIG. 4B is a perspective cross-section view of the cylindrical array of coil springs of FIG. 4A.

FIG. 4C is a front view of the cylindrical array of coil springs of FIG. 4A under compression.

FIG. 4D is a front view of the cylindrical array of coil springs of FIG. 4A shearing sideways.

FIG. 17A is a side cross-section view of a non-round configuration of a midsole device including linear sections of diagonal wall shapes.

FIG. 17B is a perspective cross-section view from below of the non-round configuration of a midsole device of FIG. 17A.

FIG. 17C is a bottom view of the non-round configuration of a midsole device of FIG. 17A.

FIG. 17D is a perspective from above of the non-round configuration of a midsole device of FIG. 17A.

FIG. 17F is a perspective cross-section exploded view of the non-round configuration of a midsole device of FIG. 17A.

FIG. 20A is a perspective view of an outsole and midsole devices according to an embodiment.

FIG. 20B is a top view of the outsole and midsole devices of FIG. 20A.

FIG. 20C is a top view of support structures of the midsole devices as arranged for positioning on the outsole of FIG. 20A.

FIG. 21A is a bottom perspective view of midsole devices in a midsole according to an embodiment having holes in the outsole for flow of air.

FIG. 21B is a side cross-section view of the midsole of FIG. 21A.

FIG. 21C is a perspective cross-section view of the midsole of FIG. 21A

FIG. 21D is a bottom perspective cross-section view of the midsole of FIG. 21A

FIG. 23B is a graph of lateral shear stability of a conventional foam midsole as represented in an FEA analysis applied to a 3D cylindrical representation of a cylindrical foam puck, as compared to an exemplary conical foam disk of the present device, and a similar conical foam disk with an exemplary web insert.

FIG. 31A is a schematic illustration of an approach to characterizing a simplified structural representation of a domed disk.

FIG. 31B is a schematic illustration of an approach to characterizing a simplified structural representation of a domed disk showing a simplified effective angle and effective width of a structure.

FIG. 31C is a schematic illustration of an approach to characterizing a simplified structural representation of a domed disk showing the identification of widths and angles of sections of material in a structure.

FIG. 41A is a front cross-section view of a schematic illustration of a foam domed disk including a material line representing either a straight bifurcation line (if a CAD model) or line between actual points (for an actual device).

FIG. 41B is a front cross-section view of the foam domed disk of FIG. 41 under compression exhibiting an S-shaped curve.

FIG. 41C is a front cross-section view of the foam domed disk of FIG. 41 under compression exhibiting an S-shaped curve including a horizontal line (0°), and two lines at 15° from horizontal each passing through a nominal center point of the S-shaped curve.

DETAILED DESCRIPTION

Figure 1:
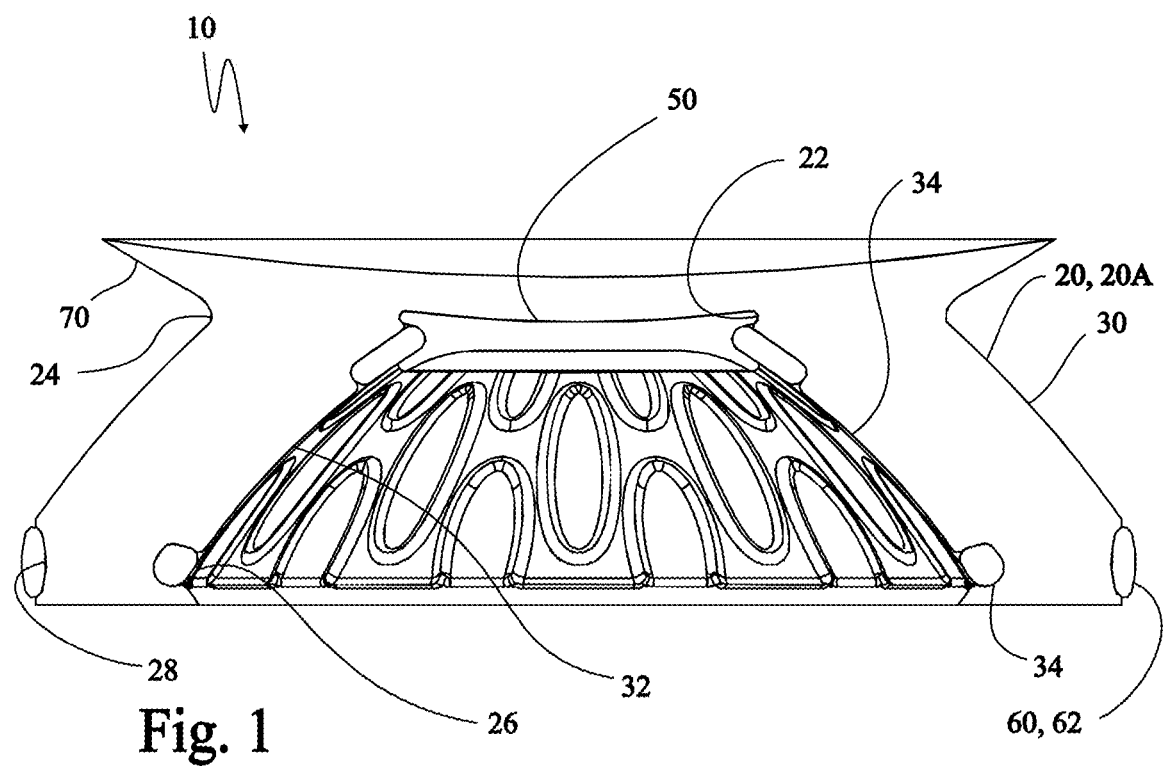
FIG. 1 is a front cross-section view of a midsole device according to an embodiment.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Throughout this specification, various structures with approximately circular, cylindrical or conical structure are described which have radial and axial dimensions for that structure. Embodiments of the invention may have multiple circular, cylindrical or conical structures in an article of footwear or part thereof, each structure having their own radial dimension and their own axial dimension. Each article of footwear has: a length which may be measured in the direction from heel to toe; a width, which may be measured in the direction from horizontal interior of the foot to horizontal exterior of the foot; and a depth, which may be measured in the direction downwards into the surface on which the footwear rests. The horizontal interior of the foot refers to the anatomical medial direction (i.e., laterally/horizontally towards the centerline of a human body wearing footwear containing or defined by the device) whereas the horizontal exterior of the foot refers to the anatomical lateral direction (i.e., laterally/horizontally away from the centerline of a human body wearing footwear containing or defined by the device).

An energy return device for a midsole of a shoe may absorb and return energy from compression of the device under a downward force applied by a wearer to an upper of the shoe in a height direction extending between an outsole of the shoe and the upper, which may be the depth direction defined above, or may be angled from the depth direction where compression occurs in a non-vertical direction. The energy return device may include a resilient structure such as a foam structure supporting the upper in relation to the outsole. The foam structure defines an opening for air to enter the cavity. The foam structure is arranged to collapse, under the downward force applied to the upper by the wearer, into the cavity so that as the compression begins, the foam structure deforms by bending of the foam structure, the foam structure collapsing into lateral bounds defined by the foam structure at a height corresponding to a maximum lateral extent of the cavity, and at a point near maximum compression under an exemplary downward force applied to the midsole by the user, the foam structure deforms by direct compression of the foam structure between the upper and the outsole. This latter deformation by direct compression may, depending on the embodiment, be very limited as the stiffness of the foam structure against direct compression may be much higher than the stiffness against the bending at the beginning of the compression. The compression of the material of the resilient structure between the insole and the outsole may include the vertical compression of the now-horizontal sidewall (a lateral wall of the resilient structure) such that there remains substantially no cavity or air gap between portions of the now substantially horizontal sidewall and a base of the midsole device or the outsole of the shoe. The exemplary downward force may be, for example, a downward force applied by a typical or exemplary user. In some embodiments, the resilient structure comprises a domed structure. The domed structure may comprise, for example, a domed disk, and the cavity is a volume cupped by the dome shape of the domed disk. The opening may be, for example, the entire interior of the base of the domed disk, although depending on the embodiments the base may be enclosed and other openings may be defined. The term "upper" refers to a portion of the shoe having a surface in contact with the bottom of the wearer's foot (directly or via, for example, a sock and/or insole) and does not necessarily imply the presence or absence of a discrete insole component. The cavity may be empty (containing air only) or contain a low resistance air-permeable material or structure such as low durometer open cell foam.

A domed structure as used herein generally means a geometry that converges, in one orientation, upwards from a wide base to a top surface that may comprise a flattened or curved top and generally surrounds, via this curving shape, a cavity, typically with an opening at the base. While domed structures such as domed disks are typically contemplated as having the base at the bottom, an inverted orientation is not excluded. Also, while embodiments disclosed below have a circular base, other shapes, such as oval shapes or non-round or faceted shapes are also contemplated. Specific geometries of domed disks are described in greater detail later in this specification. The term 'conical disk' is understood to include truncated and approximately conical geometries including, but not limited to, truncated circular cones (i.e., a conical frustum) and truncated elliptic or faceted cones. A conical disk comprises a top surface and walls converging upwards towards a projected apex, which may for example be above or within the top surface. The top surface and bottom edges of the walls of a conical disk may have a circular, elliptic, or other approximately round shape. The term 'frustum' as used herein refers to a three-dimensional volume defined by the top surface and walls converging towards a projected apex above a top surface. As used herein, the walls of a frustum may generally converge uniformly towards the projected apex, but do not need to converge linearly; as a non-limiting example, a frustum as used herein may refer to a truncated elliptic paraboloid. Additionally, the top and bottom surfaces of a conical disk, including the top and bottom surfaces of a frustum, may or may not be flat and may or may not be parallel with each other.

In various embodiments of the device disclosed here, a midsole device 10 comprises a resilient compressible structure defining a cavity, for example arching over the cavity. An example of such a resilient compressible structure is a resilient domed structure, e.g., compressible foam domed disk 20, such as a conical disk 20A. Compressible foam domed disks 20 may be made of highly resilient materials such as highly resilient foam, such as, but not limited to, Polyurethane or Pebax®. Due to the converging (conical) geometry, flexibility, and compressibility of the foam, high travel can be achieved for a given stack height and maximum diameter of the base. In various embodiments, the compressible foam domed disk 20 is rigid enough, either due to the properties and shape of the foam or by support using a support structure such as the web support structure described below, to bend under the compression by the downward force applied to the upper in a manner that the downward force is initially resisted primarily by vertical/diagonal compression of the foam along the vertical/diagonal length of the walls. As compression continues, the spring rate may reduce, due to the parallel internal strain on the structure becoming less vertical as the structure collapses, due to buckling, or both. The compression of the sidewalls of the foam is then also vertically applied but is now compressing across the thickness of the walls. Toward the bottom of the travel, the internal compression stress along the length of the foam walls may be partially or fully retained in the radial direction by a lateral expansion limiter 60 at the base.

Some embodiments of the compressible foam domed disk 20 may be defined by specific ranges of geometries. The compressible foam domed disk 20 has a disk upper inner diameter (UID) 22, a disk upper outer diameter (UOD) 24, a disk lower inner diameter (LID) 26 and a disk lower outer diameter (LOD) 28. In the event of an inverted dome, the "upper" end is the narrower vertical end and the "lower" end, including the "base", is the wider vertical end. These terms may be used even in non-round embodiments to describe inner and outer perimeters at narrower ("upper") and wider ("lower") vertical ends of generally dome-shaped embodiments. The foam domed disk also has a disk exterior surface 30 and a disk interior surface 32. Where a support structure extending along the walls of the dome, such as support structure 34 described below, is present, the diameters 22, 24, 26, 28 are of the dome inclusive of the support structure. For the purpose of this disclosure and the claims, where the foam structure flares out at the otherwise narrow end, the UOD will be taken as the smallest dimension in the top (i.e., in the vertical direction of general narrowing) 50% of the structure by height. Where there is no such flaring, any narrowing of the outer diameter above a highest point within the cavity will be excluded. The LID of the structure will be taken as the largest ID in the bottom (i.e., in the direction of general widening) half (in terms of height) of the structure.

Figure 38:
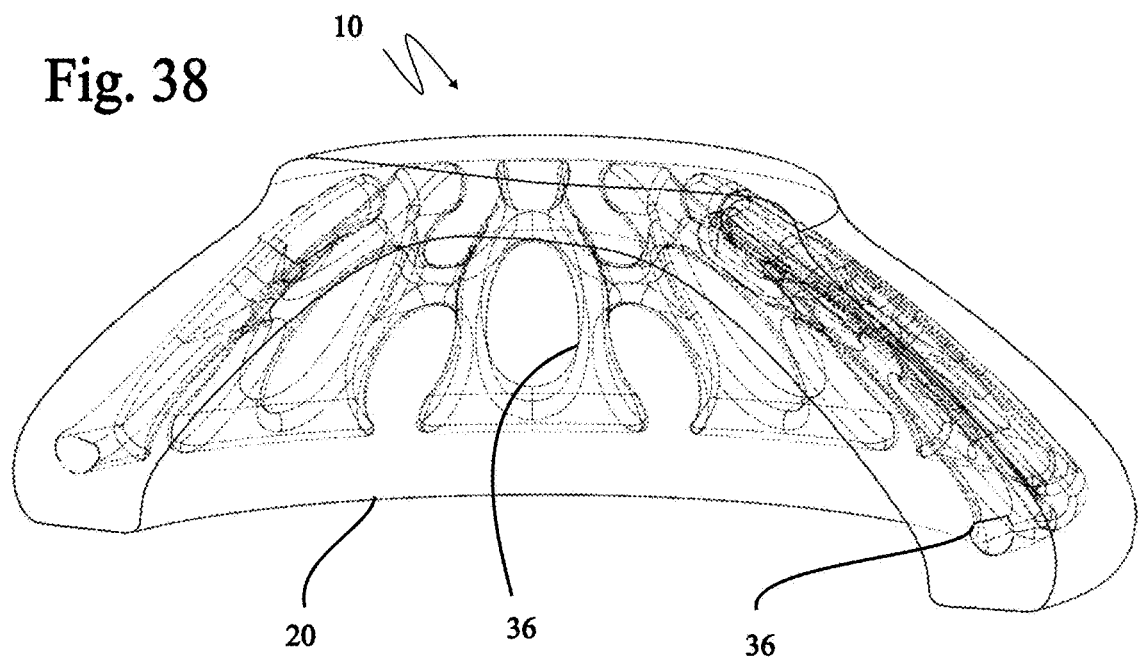
FIG. 38 is a perspective cross-section partially-transparent view of a midsole device comprising web structure embedded within foam walls of a foam domed disk.

A circumferentially expandable interior support structure 34 such as a web structure 36 may extend along the walls of the dome, for example embedded within the dome as shown in FIG. 38, or adhered or otherwise attached to the inner surface of the foam domed disk 20, as is illustrated for example in FIG. 1. This web structure 36 is more rigid in the radial/diagonal direction than the foam and translates a portion of the vertically downward force on the web into a horizontally outward force on the base of the foam conical disk. This stores a portion of the foot strike energy in the compression of the foam in the radially outward direction and/or expansion of the bottom OD of the foam circumferentially as the OD expands radially outward. While a web structure 36 is shown as the interior support structure 34 in the drawings, other comparably rigid structures may be used in place of a web structure 36, such as, for example, individual radial/diagonal spokes made of a rigid material. An interior web or spoked support structure 34 may have an interior support structure upper end 38 and an interior support structure lower end 40.

Figure 9:
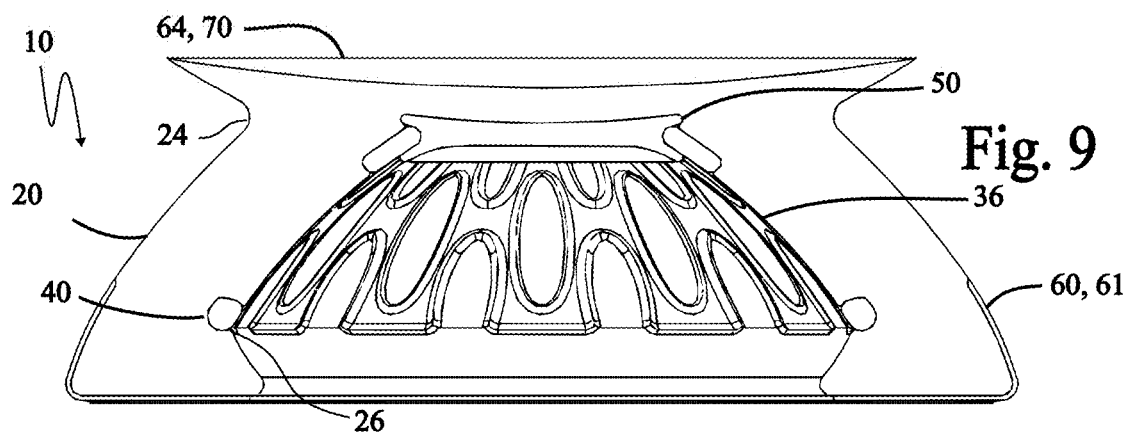
FIG. 9 is a front cross-section view of a midsole device according to an embodiment with additional material above and below the web insert.

It has been observed that radially outward stretching of the base of the conical foam disk, past a certain amount, can be problematic because it becomes difficult to locate the base of the conical foam disc relative to the top of the outsole. For this reason, it is seen as beneficial to limit the radial expansion of the base of the conical foam disc. Lateral expansion of the cavity may also be limited, in dome or in non-dome embodiments, for example to increase compression of the foam around the cavity as the cavity collapses vertically, and thus the force supplied by such compression. Thus, the energy return device may comprise a lateral expansion limiter 60 arranged to resist lateral expansion of the foam structure. The lateral expansion limiter may be arranged to resist lateral expansion for example at the height corresponding to a maximum lateral extent of the cavity, for example at a height corresponding to the LID 26 in a dome embodiment. The expansion of the outer diameter (OD) of the conical foam disk may be controlled in several ways. In some embodiments, for example the embodiments shown in FIG. 3, 9, 25E or 26E, the base of the conical disk may be adhered to, embedded in or otherwise attached to the outsole to prevent it from radially expanding. In this case, most of the radial force component of the compression of the conical disk is taken up by horizontal tension in the outsole and the compression of the walls of the conical disk itself. Thus, the outsole itself may act as the lateral expansion limiter 60. In FIGS. 3 and 9, a cylindrical or L-shaped ring 61, which may be attached to the outsole, acts as the lateral expansion limiter on its own or in combination with the outsole.

As shown in FIG. 1, the base of the conical disk may have a rigid or flexible ring member 62 around the OD of the base to act as the lateral expansion limiter 60. This can be used to increase the spring force of the device and to achieve other effects as described in the disclosure.

Figure 2:
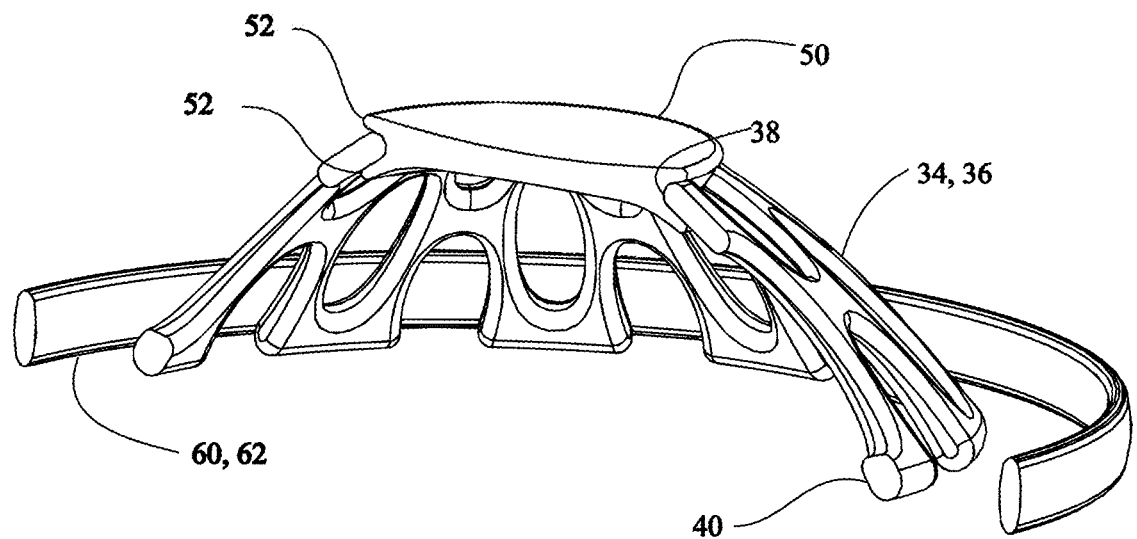
FIG. 2 is a perspective cross-section view of supporting structural elements of a midsole device according to the embodiment of FIG. 1.

FIG. 2, an assembly of an exemplary device is shown in cross-section with the conical foam disk removed. Each of the three remaining components may or may not be present in various embodiments. At the guide support structure upper end 38 of the web structure 36, an apex insert 50 is shown. The apex insert 50 may provide positioning and resistance to contraction of the guide support structure upper end 38. The apex insert may be made of any material such as, but not limited to, foam or a non-compressible plastic. If made of a compressible or deformable material, it may allow a small amount of contraction of the guide support structure upper end 38, but less contraction than if there was no apex insert 50. This contraction may serve to reduce the stress on other parts of the foam domed disk 20 to prevent overstraining the foam in other areas. The apex insert may have flanged edges 52 that engage the surface of the guide support structure 34 at the guide support structure upper end 38. A lateral expansion limiter 60 may limit expansion of the LOD 28. In some embodiments, lateral expansion limiter 60 may comprise an exterior support ring 62 around the outside of the LOD 28, as illustrated in FIG. 1, which serve to increase the force needed to expand the outer diameter of the conical foam disk during vertical compression of the foam domed disk 20 and web structure 36.

As shown in FIG. 3, an embodiment of the device is shown as a conical resilient structure 110. There are many types of resilient materials, such as high resilience foam, which may be used for this construction. 35 durometer Pebax® foam is one non-limiting example which may be used to construct embodiments of the conical resilient structure 110 disclosed here. FIG. 3 shows a higher density conical foam insert 130 as a support structure 34, inside a comparatively lower density conical foam disk 120. The device may be used without this conical foam insert 130 with a usable portion of the effects described here. In this embodiment, a lateral expansion limiter 60 is included and comprises a ring which may be an L-shaped ring 61 enclosing the lower outer diameter of the conical resilient structure 110, and which may be adhered or otherwise attached to the outsole.

In various such embodiments, as the user's heel compresses a foam domed disk, e.g., a conical foam disc, the direction of force of compression of the walls of the conical disk proceeds initially in a diagonal direction which produces an outward force around the base of the conical foam disc. As the compression displacement (also referred to as "travel" in this disclosure) increases initially, the amount of bending/shearing of the foam walls of the conical disk increases. When constructed according to the principles disclosed here, this bending/shearing deformation results in a reduced rate of load-carrying capacity of the conical disk and results in a reduction of the spring rate as compression continues through the midrange of the compression travel. This falling off of the spring rate results in more of the foot strike energy being stored through the midstride, because the midsole is able to stay more compressed with less downward force of the user, through the midstride, so the midsole compression energy at the heel can be released later in the stride when it contributes more to forward propulsion. As the device nears full compression, the bending/shearing of the walls reduces due to collapsing of the walls and contact with the ground or top of the outsole. After this contact, the compression of the walls across the thickness of the collapsed walls is increased and acts as a compressible bottom out bumper.

Lateral Shear Stability

High thickness midsoles especially those comprising primarily low durometer foam without further structure via shaping of the foam or additional elements are inherently unstable in shear deformation. To illustrate this drawback of a high travel conventional foam midsole, FIGS. 4A-4D show a cylindrical array of coil springs 210, which will be used in this description to conceptually represent the forces at work in a block of foam under compression. At rest, as shown in FIG. 4A, the only force opposing the lateral shearing of the foam is the resistance to shear deformation of the foam, or in the case of these figures, the springs 220. This stabilizing force will be lower if the midsole is taller for a given width, other factors being held equal. As the springs 220 are compressed, for example approaching the state shown in FIG. 4C, it becomes increasingly unstable in the lateral shear direction. This is because the lowest energy position of the springs is in an elongated state which occurs when the springs shear sideways, as shown in FIG. 4D. This makes a conventional foam structure, as illustrated by the array of coil springs, less laterally stable as compression increases toward full compression. This can be detrimental to the performance and safety of a shoe midsole and is especially detrimental with tall stack height, low durometer conventional foam midsoles.

Figure 23A:
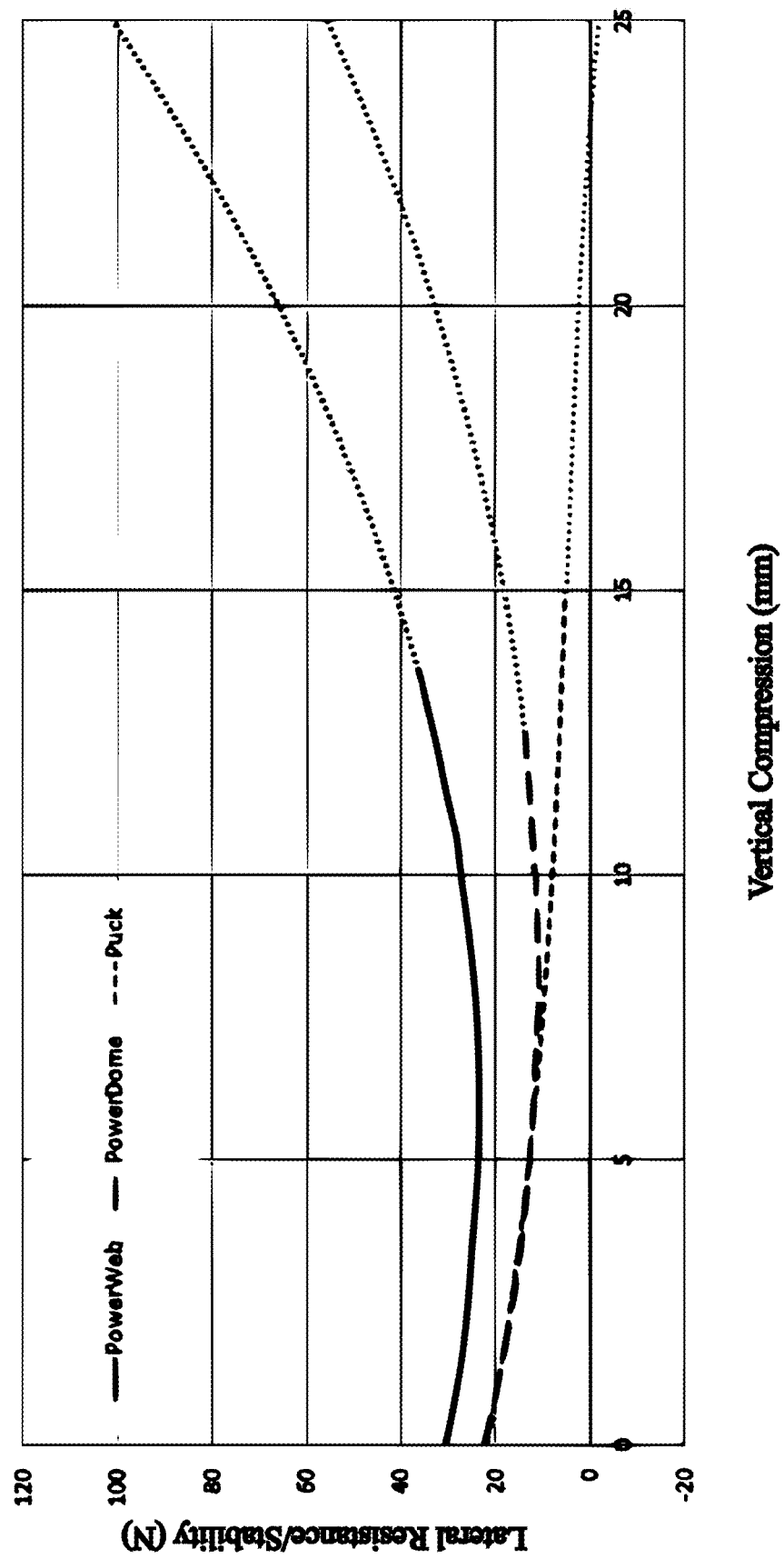
FIG. 23A is a graph of lateral shear stability of a conventional foam midsole as represented in an FEA analysis applied to a 2D planar representation of a cylindrical foam puck, as compared to a 2D planar representation of an exemplary conical foam disk of the present device, and a similar 2D planar representation of a conical foam disk with an exemplary web insert, in terms of lateral shear stability.

The graphs in FIGS. 23A and 23B show the lateral shear stability of a conventional foam midsole as represented in an FEA analysis with a cylindrical foam puck, as compared to an exemplary conical foam disk of the present device, and a similar conical foam disk with an exemplary web insert, in terms of lateral shear stability. To create this graph, the geometry was bonded to a flat plate on the top and bottom faces. The bottom plate was fixed in space, while the top plate underwent a series of consecutive deformations. The top plate was first shifted 5 mm laterally, which develops a lateral "correcting" force in the geometry that pushes towards the centerline of the body. This lateral shift is maintained as the top plate is then compressed up to 15 mm. The change in correcting force (referred to as lateral resistance in the graph) is then measured as a response of compression depth. A quadratic equation is then fitted to the first section of each curve, and extrapolated out to 25 mm of compression, shown in the graphs with a smaller dotted line. This test was run twice for each geometry; once with axial-symmetry applied on the 2D surface (simulating a cylindrical shape), as illustrated in FIG. 23B, and a second time with an extruded planar shape, as illustrated in FIG. 23A. An unexpected effect of the construction of embodiments shown here is an increase in the lateral shear stability with greater compression, as compared to a decrease in the lateral shear stability of a conventional solid foam midsole. Additionally, the extrapolation of the puck geometry can be seen extending into negative force values. These negative values indicate that the lateral force is no longer pushing back towards the center of the geometry (stabilizing force), but is now applying additional force to shift the geometry further laterally (buckling force).

Figure 5A:
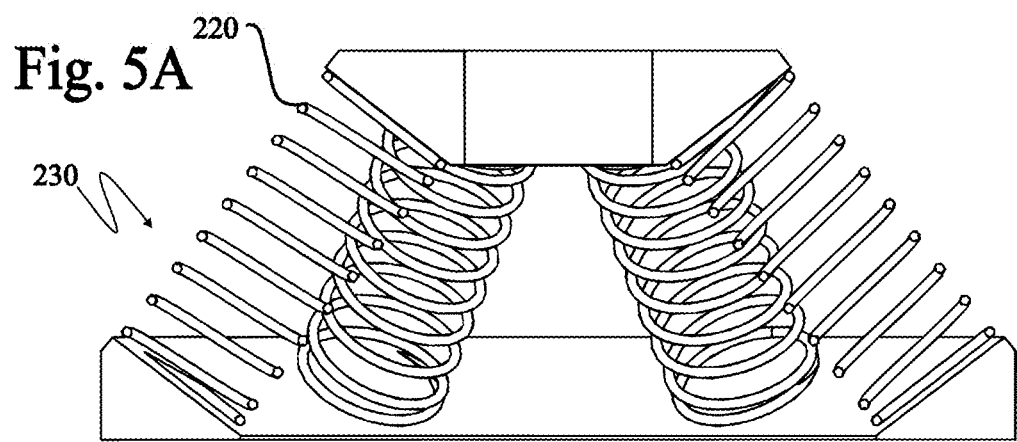
FIG. 5A is a front cross-section view of a conical coil spring array demonstrating principles of operation of a conical foam disk according to some embodiments.
Figure 5B:
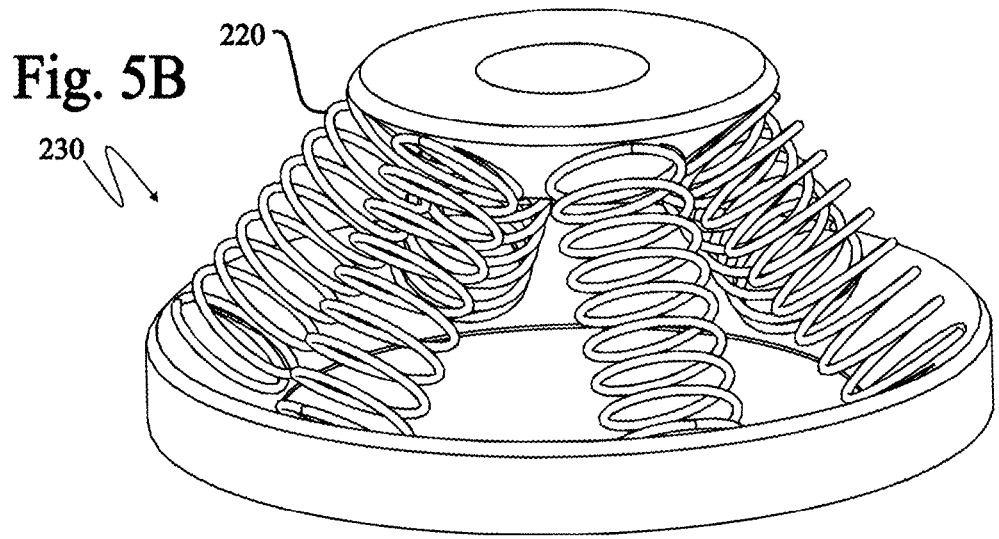
FIG. 5B is an isometric view of the conical coil spring array of FIG. 5A.
Figure 5C:
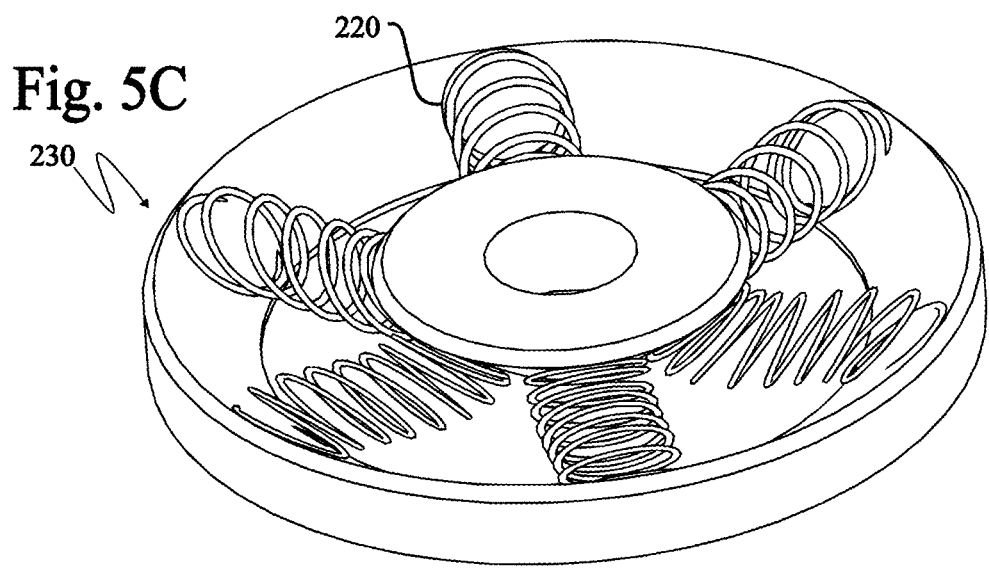
FIG. 5C is a perspective view of the conical spring array of FIG. 5A under compression.
Figure 5D:
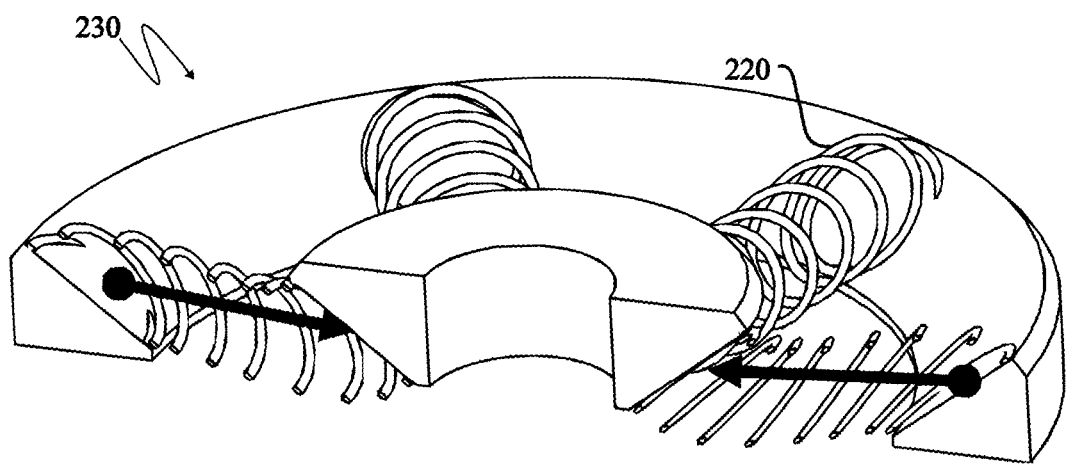
FIG. 5D is a perspective cross-section view of the conical spring array of FIG. 5A under compression illustrating some of the lateral forces created by the conical shape.
Figure 5E:
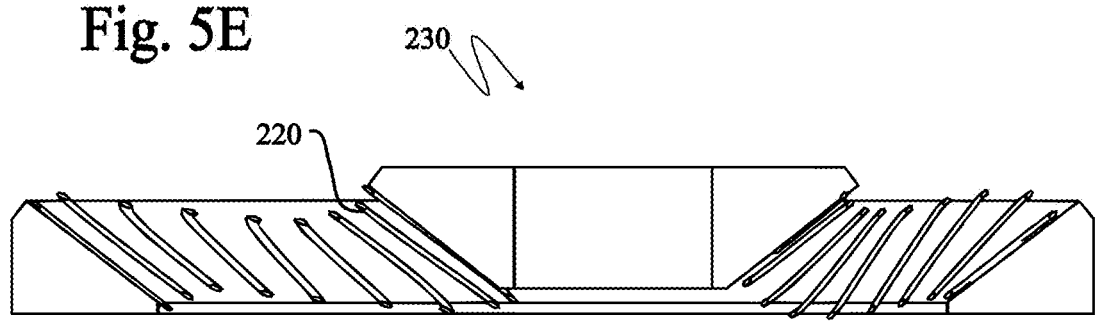
FIG. 5E is a front cross-section view of the conical spring array of FIG. 5A under compression illustrating the effect of a lateral shearing motion.

A conical array of coil springs 230 is illustrated in FIGS. 5A-5E, for better visualization in three dimensions of the differences between a conventional foam block (as illustrated conceptually by the cylindrical array of springs 210 in FIGS. 4A-4D) and a conical disk. The fully compressed lateral shear stability as shown in FIG. 5C-5E of a conical array of coil springs (representing the conical foam disc) is greater than the cylindrical array of coil springs as shown in FIG. 4A-4D (representing the conventional foam block) as a result of the compression of a far spring (in the leading direction of the shearing motion), and the extension of a near spring (in the trailing direction of the shearing motion) that is required in order to shear the top of the assembly, in a horizontal direction, relative to the bottom. In a conical foam disc of the present device, lateral shear on the conical foam disc results in compression of a first wall of the conical foam disc and extension of an opposing second wall of the conical foam disc that result in an opposing force against the lateral shearing force as the top of the device is translated laterally with respect to the base. The lateral shear stability increases with further compression of the conical resilient foam disk due to the increased spring force as the springs are compressed. At full compression, it can be seen in FIGS. 5C-5E, that all of the springs in the circular array are all highly loaded in the radially inward direction, even though the structure is providing minimal force, by comparison, in the vertical direction.

At full compression the springs 220 are essentially preloaded against each other in the horizontal direction. This creates high internal stress in the structure at full compression with a high force, pointing inward toward the center axis of the conceptual conical disk. The springs 220 are all partially in compression along a horizontal plane, which increases the inward force from all directions to dramatically increase the lateral shear stability of the portion of the midsole in which the device is situated when at full compression. By positioning one or more such devices through a midsole, the various regions or areas of the midsole may be provided with significantly improved lateral shear stability in that region or area.

The greater the compression of a midsole, the more important it is to have increased lateral shear stability. This is important because the highest lateral shear stability requirement will typically coincide with the highest vertical force of the user to compress the midsole. Additionally, when in motion and especially when accelerating, the highest vertical forces may coincide with moments of high lateral force (e.g., a sprinter running on the curve of a track). For example, an athlete using high-performance shoes requires lateral shear stability when their feet are applying significant force through the shoes to the ground surface; a decrease in lateral shear stability leaves the user at risk of sudden lateral motion that could result in an accident or injury. The construction of various embodiments of the present device provides increased lateral shear stability as the device approaches full compression, reducing these risks.

Comfortable Force Distribution Geometry

Figure 6:
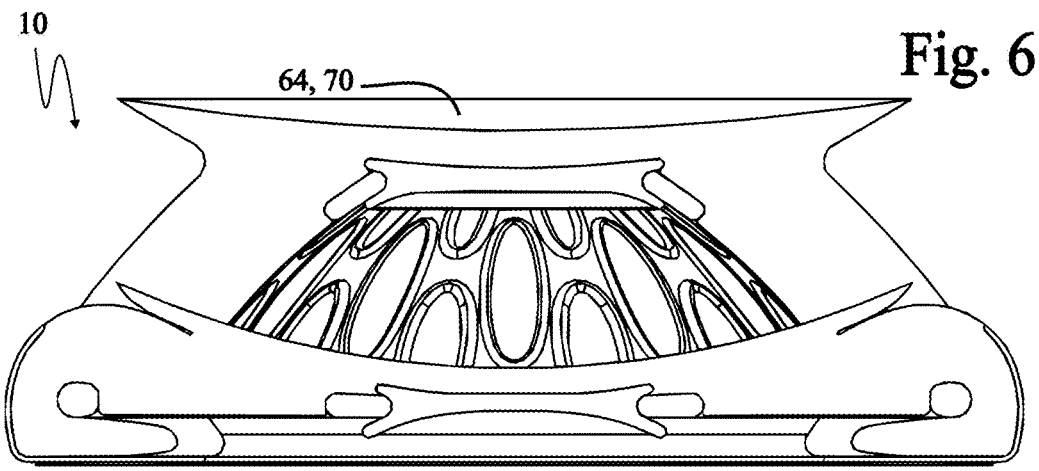
FIG. 6 is a front cross-section view of two midsole devices according to an embodiment in which the first midsole device is in an uncompressed state and situated behind the second midsole device which is in a compressed state.
Figure 7:
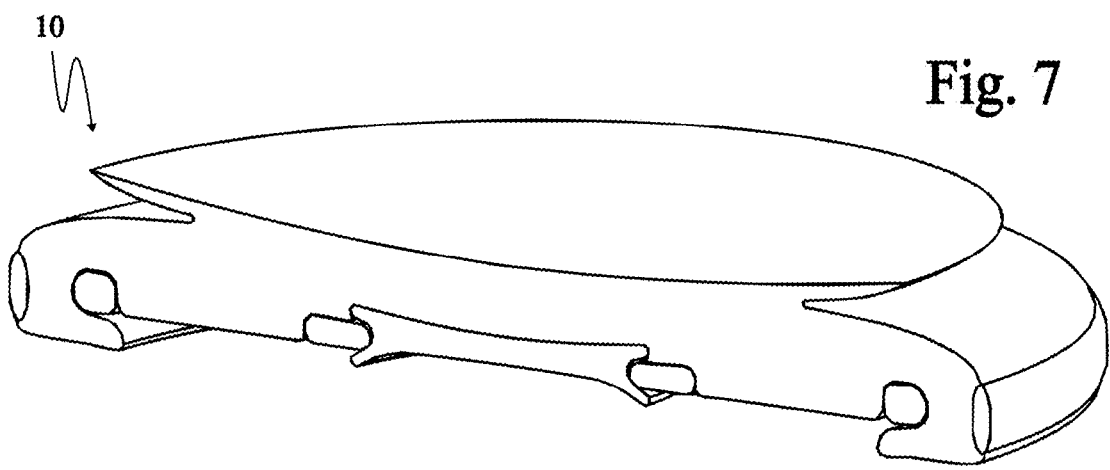
FIG. 7 is a perspective cross-section view of a midsole device according to an embodiment in a compressed state.
Figure 8:
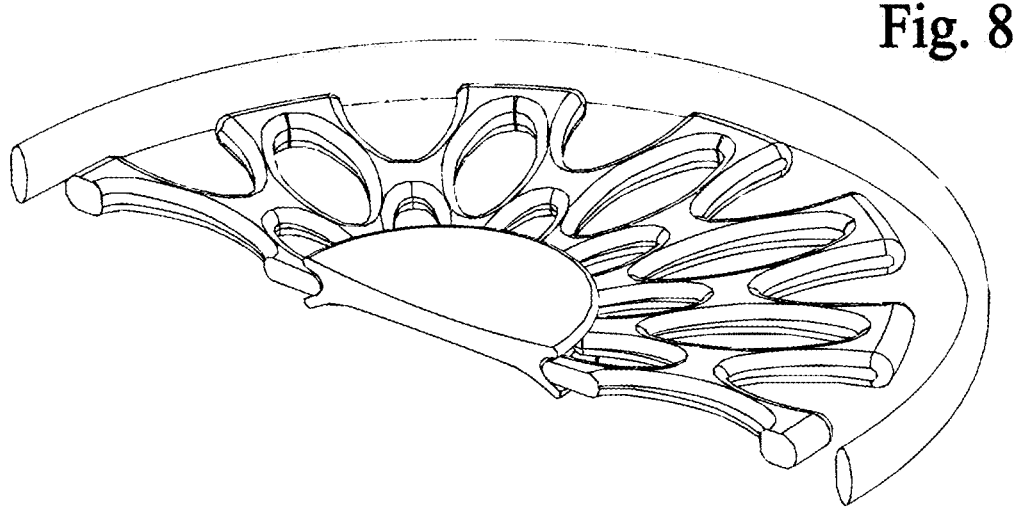
FIG. 8 is a perspective cross-section view of supporting structural elements of a midsole device according to an embodiment in a compressed state.

In order to achieve a specific distribution of forces (such as but not necessarily an equally distributed force) upward on, for example, the user's heel at full compression, it is useful for a conical disk as disclosed here to compress to a flat or concave shape at full compression. This allows a receiving disk 70, for example, to conform comfortably to a user's heel at full compression. FIG. 6 shows an example of a shape which can achieve this requirement both at full compression and in a non-compressed state. A receiving disk 70 may comprise, for example, a heel disk that can be sized and shaped to receive a user's heel. Multiple receiving disks 70 may be part of a plurality of midsole devices 10 in a single midsole. For example, a first receiving disk 70 may be a heel disk, while a second receiving disk 70 may be positioned under the ball of the foot and be shaped to receive the ball of the foot.

To achieve this, some embodiments may comprise a UOD 24 being approximately the same or smaller than the LID 26 of the foam domed disk 20. With this relative geometry principle, the compression and shearing of the conical walls of the foam results in a compressed shape which can be flat or concave or possibly convex, and less than half of the total at-rest foam height.

This configuration may allow for greater than 30%, greater than 40%, or greater than 50% compression travel in various embodiments. The configuration may also provide an integrated compressible bump stop, after full travel is reached, as a result of the vertical compressibility of the foam after full compression.

According to the principles of the device disclosed here, various exemplary configurations may have different conical wall angles, but have a geometry where the UOD 24 of the conical disk is similar to the LID 26 of the bottom of the conical disk. The ceiling thickness of each disk may be similar to or thinner than the sidewall thickness, although a thicker ceiling may also be used. These two geometric relationships in various embodiments allow each of these disks to deform at full compression into a reasonably flat or concave shape to conform to the curved bottom of a user's heel at full compression.

It should be noted that due to the compressibility of foam, the geometry does not need to be overly precise or accurate. Due to the many possible variations, a simplified section is defined between 25% and 75% of the stack height, where the total stack height is defined at the vertical distance from the bottom of the outsole to the top of the upper (not including any removable insole). The upper OD of this section is defined as the functional upper OD (FUOD) and the lower ID of this section is defined at the functional lower ID (FLID) with similar definitions for the functional lower OD (FLOD) and functional upper ID (FUID). FUODs that are larger than the FLID and <150%, <149%, <148%, <147%, <146%, <145%, <144%, <143%, <142%, <141%, <140% of the FLID as well as FUODs that are smaller than the FLID and >70%, >71%, >72%, >73%, >74%, >75%, >76%, >77%, >78%, >79%, >80% of the FLID have been shown to work with some portion of the benefit described here. In embodiments where the device is comprised of linear sections having the same cross-section as a conical disk, the FLID will correspond to the distance between the inner walls at 25% of the stack height, and the FUOD will correspond to the distance between the outer walls at 75% of the stack height.

Some embodiments of the device have extra material 64 around the UOD or LOD of the foam domed disk or inside of the UID or LID of the foam domed disk. In some embodiments, extra material 64 around the UOD 24 comprises a receiving disk 70. The UOD 24 and the LID 26 may, therefore, be measured below the additional structure around the top of the structure, as shown in FIG. 9 or above the extra material inside the ID at the bottom of the structure, also shown in FIG. 9.

In another way of measuring this relationship, the OD of the top may be taken as the smallest diameter in the top 50%, 40%, 30%, 10% of the structure or truncated section. The ID of the bottom of the structure may be taken as the largest ID in the lower 50%, 40%, 30%, 20%, 10% of the conical structure or truncated section.

The ceiling of the conical disk may be within 10% or more, 20% or more, 30% or more, 40% or more the thickness of the conical disk wall to provide a portion of the benefit of the device. The thickness of the conical disk wall may be measured at 50% of the stack height and perpendicular to the average angle of the ID and OD surfaces of the wall. If a wall is not a straight line or if it is curved or waved or if it has holes or other features or a combination of different materials or foam durometers, a person skilled in the art will be able to average a section of the wall and fit straight lines to it, to determine the effective angle.

The ceiling volume of the device may be of the same compressible foam or matrix material as the conical disk, or a different material, or combination of materials. An accordion section ceiling plug band/ring may be used to provide minimal radially inward compression of the ceiling plug/apex insert and at the same time allow for vertical compression of the plug and wave or accordion section band. This vertically compressible band allows the ceiling plug to be made from a lower density foam which may provide a greater level of comfort for some users at full compression. The ceiling may also comprise pockets or holes that allow the same material to be used but with a lower effective durometer in some areas to allow a more comfortable compliance with the user's heel during compression and especially at or past full compression.

Enhancing Delayed Energy Return

The inherent properties of the conical disk disclosed here, provide for a delayed return of the energy stored during compression, as a result of the reduced spring rate part-way through the travel. This reduced spring rate allows the conical disk to stay more compressed through the midstride than if the spring rate continued to increase through the midpart of the travel, as is common with a conventional foam midsole.

FIG. 9 shows an embodiment of the device which allows for an even greater spring rate reduction or even a spring force reduction, if desired, part way through the compression travel.

Radially Rigid Conical Disk (Web) Inserts

Figure 10A:
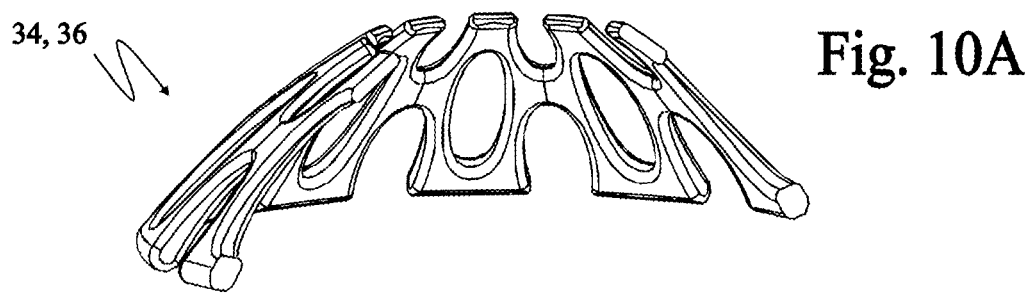
FIG. 10A is a perspective cross-section view of a web insert in an uncompressed state.
Figure 10B:
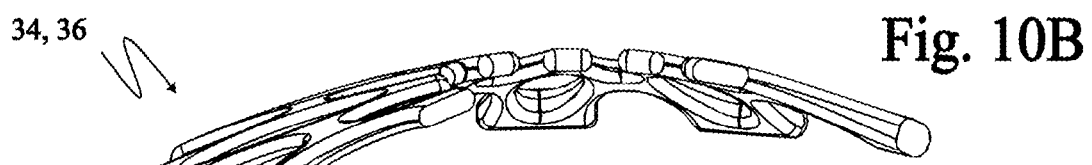
FIG. 10B is a perspective cross-section view of the web insert of FIG. 10A in a partially compressed state.
Figure 10C:
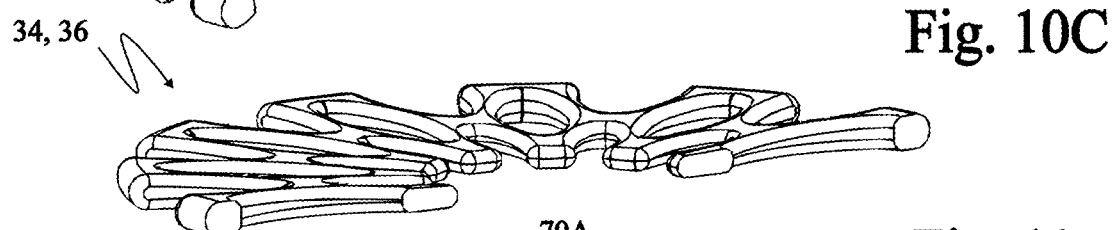
FIG. 10C is a perspective cross-section view of the web insert of FIG. 10C in a compressed state.

The addition of a conical support structure on the inside or outside surfaces of the conical foam disk or embedded into the wall of the conical foam disk, with the web having greater stiffness in the radial/diagonal direction as compared to the horizontal/circumferential direction, can enhance the performance of the conical foam disk structure in several ways. In various embodiments, an internal support structure 34 can provide internal support as an insert within a foam domed disk 20. An exterior support ring 62 may provide exterior support for the foam domed disk 20. The web structure (interchangeably referred to as a web insert or web support structure) 36 can increase the total spring force of the assembly. The web insert can increase the lateral shear stability of the assembly, and the web structure can modify the force displacement curve of the assembly in a beneficial way. This component may be flat or semi-conical or fully conical when at rest and before assembly as shown in FIGS. 10A-10C.

A radially rigid and circumferentially expandable internal support structure 34 such as a conical disk (web) insert 36 is preferably adhered (or secured by some means such as, but not limited to, over-molding) to the inner surface of the foam conical disk 20A but may also be adhered or otherwise attached to the outside of the foam disk or embedded into the foam disk. The purpose of this radially rigid conical structure is to use the vertical compression of the device to radially compress and/or circumferentially expand the foam of the base of the conical disk.

This allows this radially rigid internal support structure 34 to provide a portion of the total spring force, while also providing a greater reduction in the spring rate part-way through the compression as it deforms toward a more flattened shape, or even a past-flat shape as illustrated in FIGS. 12A-12C, 13A-13C, and 14A-14C. This happens as a result of the OD of the web member pushing outward on the LOD 28 of the domed disk 20 to compress and/or stretch the foam in this area in the horizontal direction. When the web structure 36 is completely flat, for example, at or near full compression, the resulting force on the web is horizontally outward and does not add significantly to the total vertical force of the assembly A removable radially rigid and circumferentially expandable conical disc insert is envisioned to allow different inner disk geometry's to be used with different effects on the spring rate, for fine tuning adjustment. In this case, the apex 50 of the disk can be secured to the top of the conical foam domed disk by many different means including, for example, fasteners such as Velcro™ or adhesives.

An internal support structure 34 such as a radially rigid web member 36 may be of many different constructions, including an array of separate fingers or spokes, that may or may not be connected. The non-limiting example shown in FIGS. 10A-10C, 12A-12C, 13A-13C, and 14A-14C provides sufficient radial rigidity, which is used to radially compress part of the foam conical disk as will be described shortly, without creating a high level of spring force on its own. To test this during the design phase, the radially rigid conical disk should compress to flat on its own, with no support from the conical foam structure, with less than 50%, less than 40%, less than 30%, less than 20%, less than 10% of the total force required to compress the foam conical disk without the radially rigid conical disk included in the assembly.

An example of an internal support structure 34 comprising a radially rigid conical disk web structure 36 is shown in FIGS. 10A-10C, 12A-12C, 13A-13C, and 14A-14C, all illustrating a section view with an array of radially elongated elliptical through-holes, overlapping circumferentially with an array of inner elongated through-holes and outer elongated through-holes. A bridge section of material exists between the radial members around these through-holes in such a way as to allow a high level of radial rigidity which allows the web to deform without unreasonably high internal strain to allow circumferential expansion during compression of this disk.

When the foam dome and web components are assembled together, the total force of the assembly will be greater than the sum of forces to compress the two components individually. This is because the preferred assembly of the components uses the radial expansion of the bottom of the radially rigid conical disk (web) to compress and/or stretch a portion of the bottom section of the foam conical disk structure.

FIG. 9 shows the lower end 40 of the radially rigid conical disk (web) embedded in a concave annular receiving feature on the ID of a plane near the bottom of a conical foam domed disk 20. As a result, when the assembly is compressed, the foam will compress and shear, while the radially rigid conical disk will undergo minimal radial compression along the radial fingers, as it deforms from conical to flat and pushes down and radially outward on the inner surface of the foam conical disk that it is adhered to.

Figure 11:
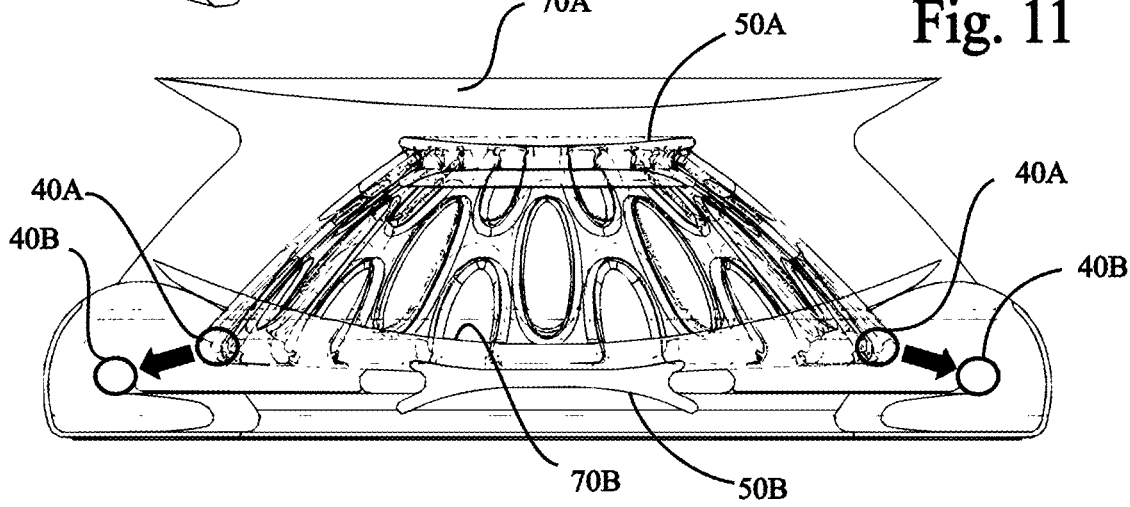
FIG. 11 is a front cross-section view of two midsole devices according to an embodiment in which the first midsole device is in an uncompressed state and situated behind the second midsole device which is in a compressed state, further illustrating the relative motion of guide support structure lower end during compression.
Figure 12A:
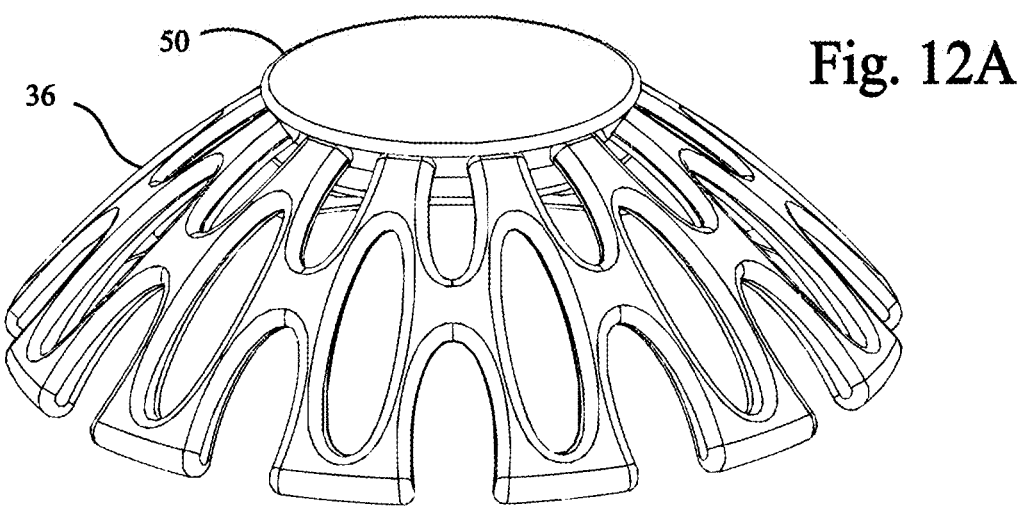
FIG. 12A is an isometric view of a guide support structure and an apex insert of a midsole device according to an embodiment in an uncompressed state.
Figure 12B:
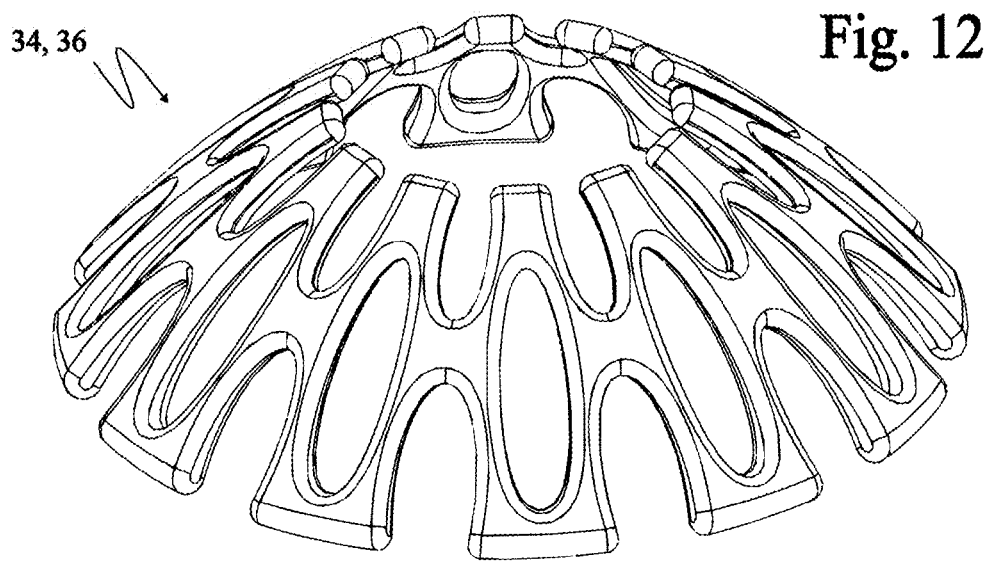
FIG. 12B is an isometric view of the guide support structure of FIG. 12A in an uncompressed state.
Figure 12C:
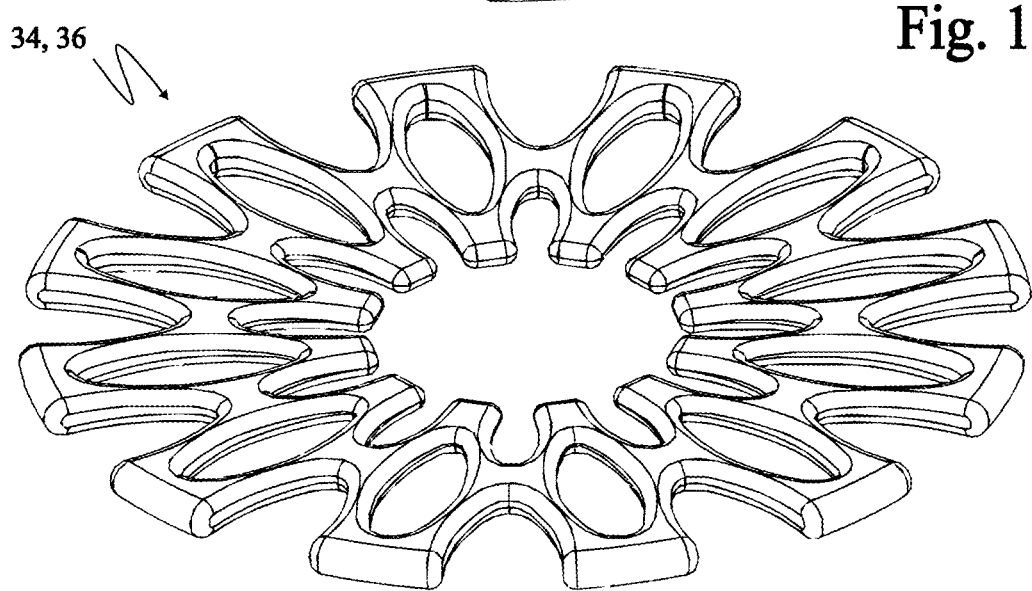
FIG. 12C is an isometric view of the guide support structure of FIG. 12A in a compressed state.
Figure 13A:
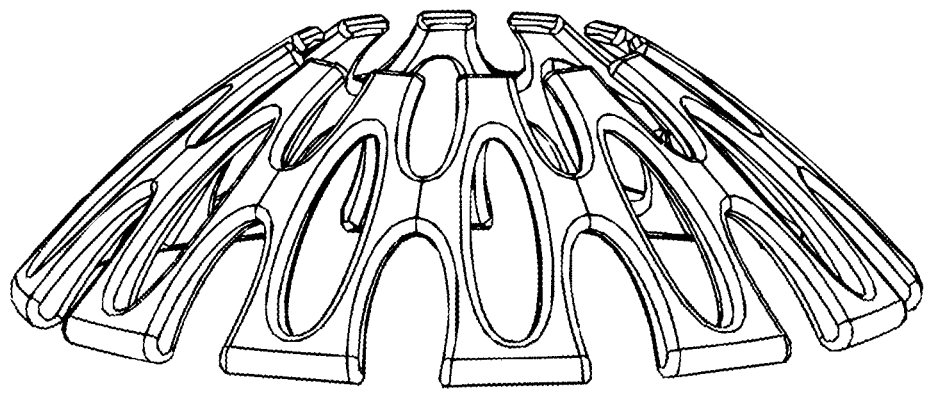
FIG. 13A is a perspective view of the guide support structure of FIG. 12A in an uncompressed state.
Figure 13B:
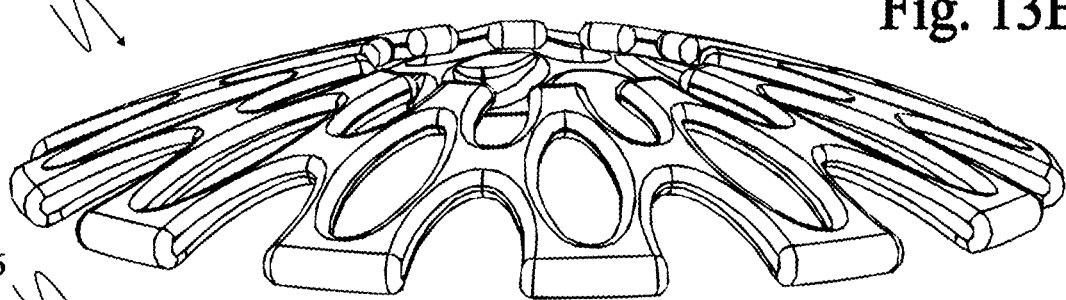
FIG. 13B is a perspective view of the guide support structure of FIG. 12A in a partially compressed state.
Figure 13C:
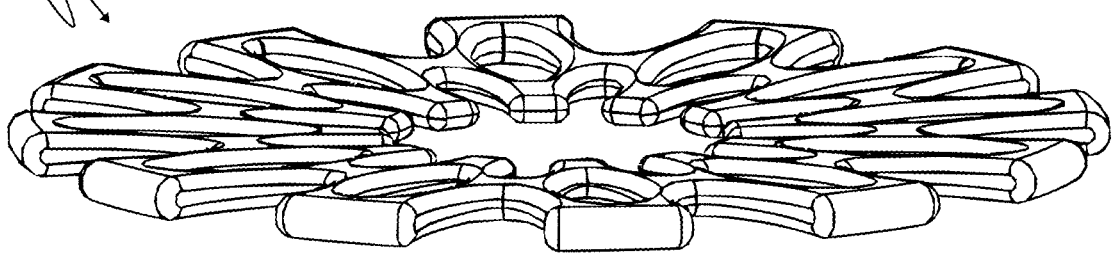
FIG. 13C is a perspective view of the guide support structure of FIG. 12A in a compressed state.
Figure 14A:
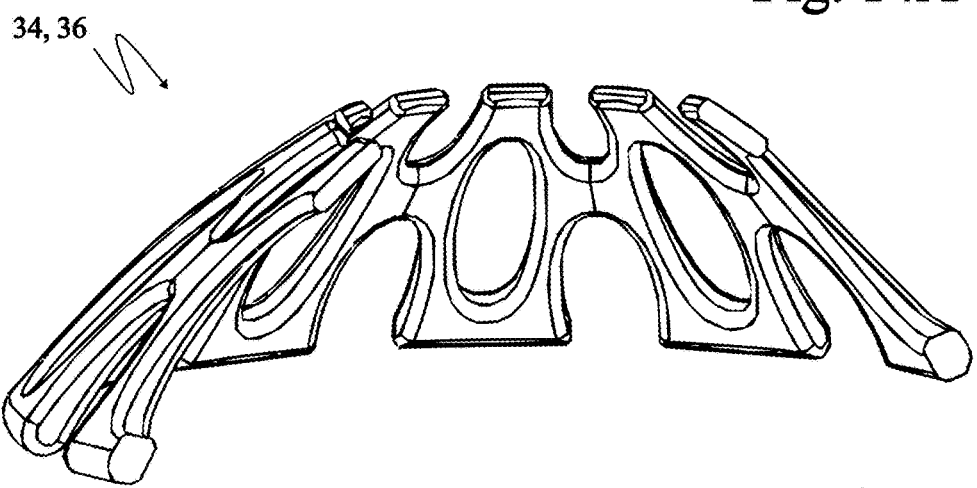
FIG. 14A is a perspective cross-section view of the guide support structure of FIG. 12A in an uncompressed state.
Figure 14B:
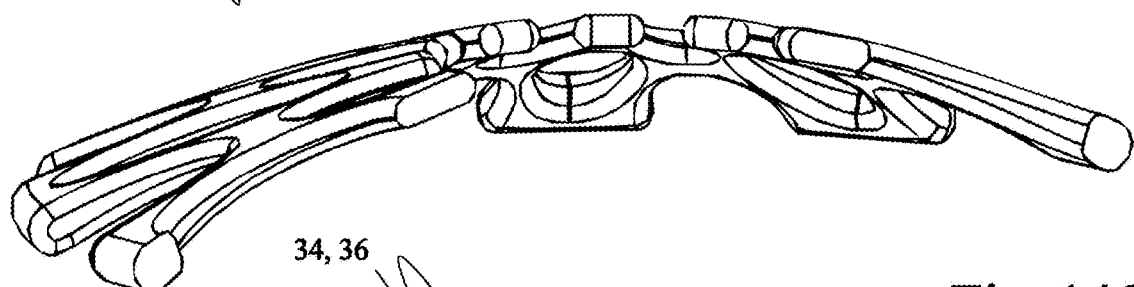
FIG. 14B is a perspective cross-section view of the guide support structure of FIG. 12B in a partially compressed state.
Figure 14C:
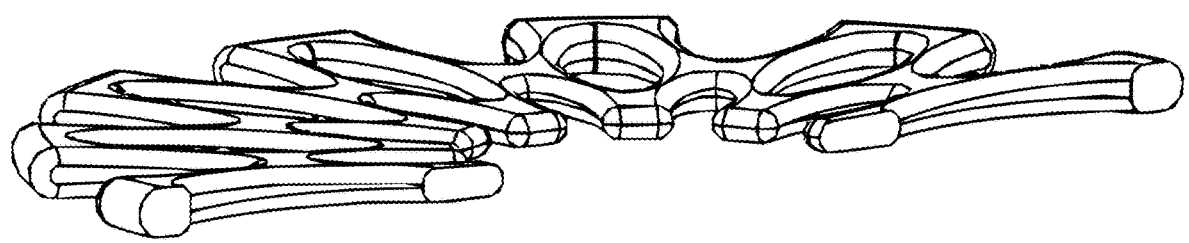
FIG. 14C is a perspective cross-section view of the guide support structure of FIG. 12C in a compressed state.
Figures 15A, 15B:
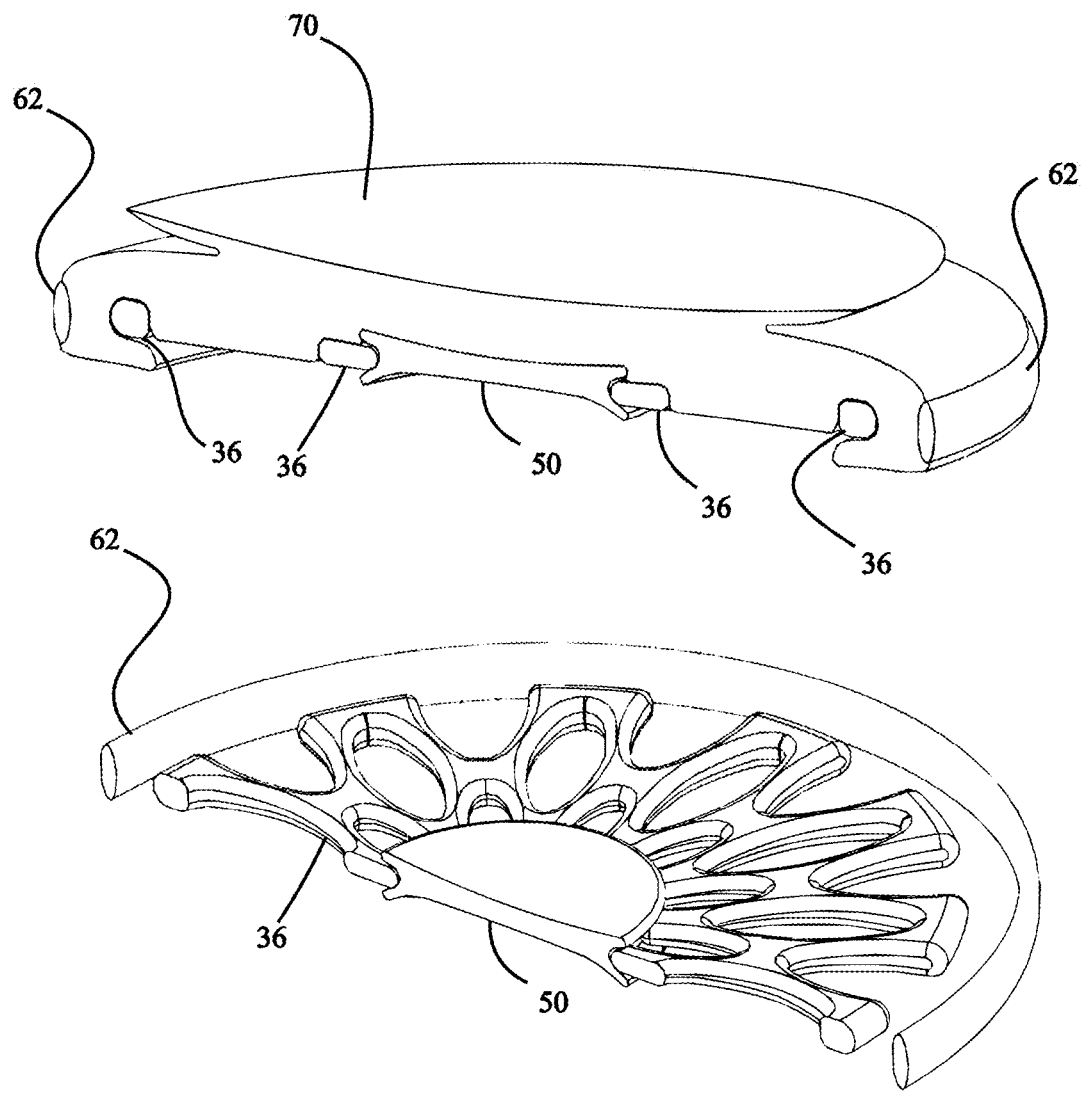
FIG. 15A is a perspective cross-section view of a midsole device according to an embodiment in a compressed state.
FIG. 15B is a perspective cross-section view of the apex insert, guide support structure and ring member of FIG. 15A in a compressed state.

As illustrated in FIG. 11, the internal support structure can provide vertical and radial forces that change in proportion during travel. The reaction force of the horizontal compression of the conical foam disk is a vertical force initially, when the radially rigid conical disc is still in a conical shape. The closer the radially rigid support structure conical disc is to flat, as compression of the assembly progresses, the lower the component of vertical force that the radially rigid conical disc will produce as it pushes radially horizontally outward on the foam. As a result, the force of compressing the foam conical disc will be augmented by the vertical force generated by the radially rigid support structure conical disc pushing outward on the base of the foam. The radially rigid support structure conical disk (web) spring rate can be designed to have a greater variation in the spring rate including an increasing spring rate initially and decreasing spring rate partway through the compression travel. By designing the radially rigid support structure conical disc (web) to provide a percentage of the total vertical force, the characteristic spring rate of the entire assembly can be designed to provide anywhere from a very slight reduction in the spring rate if the conical foam disk is providing a great majority of the total force, to a spring rate that falls off more dramatically, or even a spring force that falls off partway through the travel if the radially rigid conical disc provides very little vertical spring force of its own, and the web pushing out on the foam results in a greater portion of the total spring force (as compared to the vertical force of the web itself) throughout the mid-part of the travel.

The contribution of the radially rigid support structure conical disk to the total spring force can be modified or optimized by the use of a non-extensible or elastic ring of material around the outside of the base of the foam conical disc.

The use of a ring around the base of the foam conical disc will increase the spring force resistance on a horizontal plane which opposes the flattening of the radially rigid conical disc. Without this ring, the foam base of the foam conical disc will be caused to stretch radially. With the ring, the base of the foam conical disc will stretch less in the radial direction and will be forced to undergo more radial compression as a result of the radially expanding inner radially rigid support structure conical disk (web) as it flattens. Both of these scenarios have the advantage of storing energy in the foam either through compression or stretching or both.

Compressible Foam Conical Disk Insert

Figure 3A:
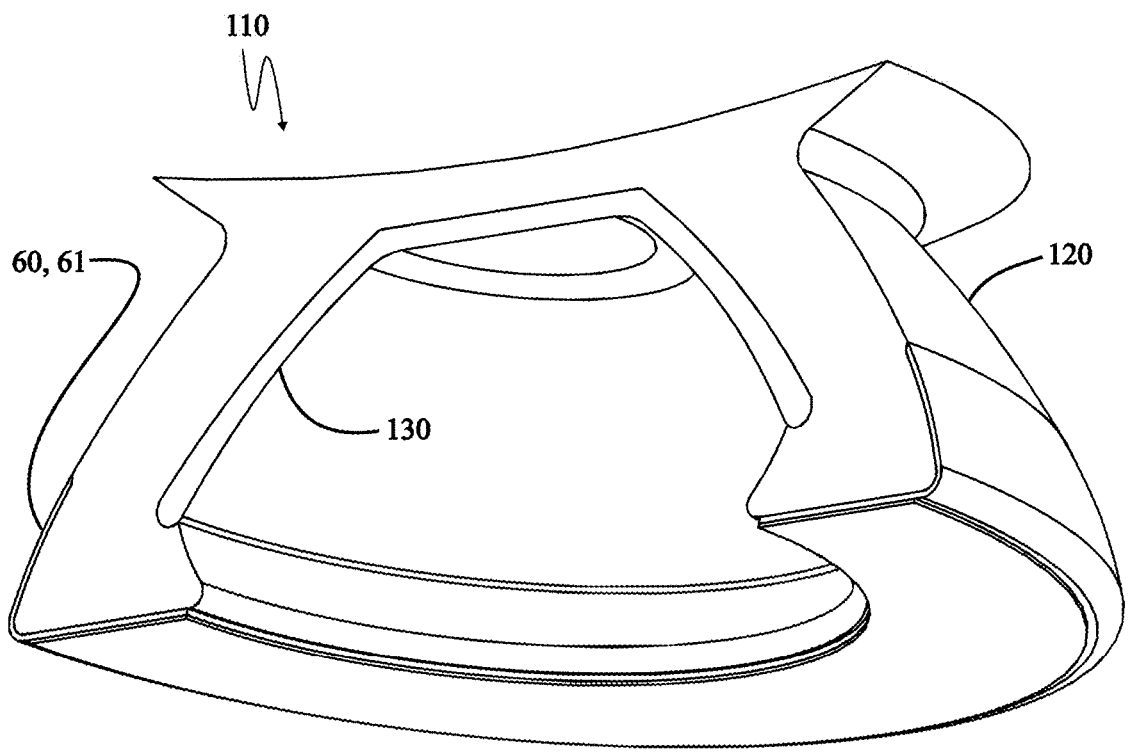
FIG. 3A is a perspective cross-section view of a midsole device comprising a higher density conical foam insert inside a lower density conical foam disk according to an embodiment.
Figure 3B:
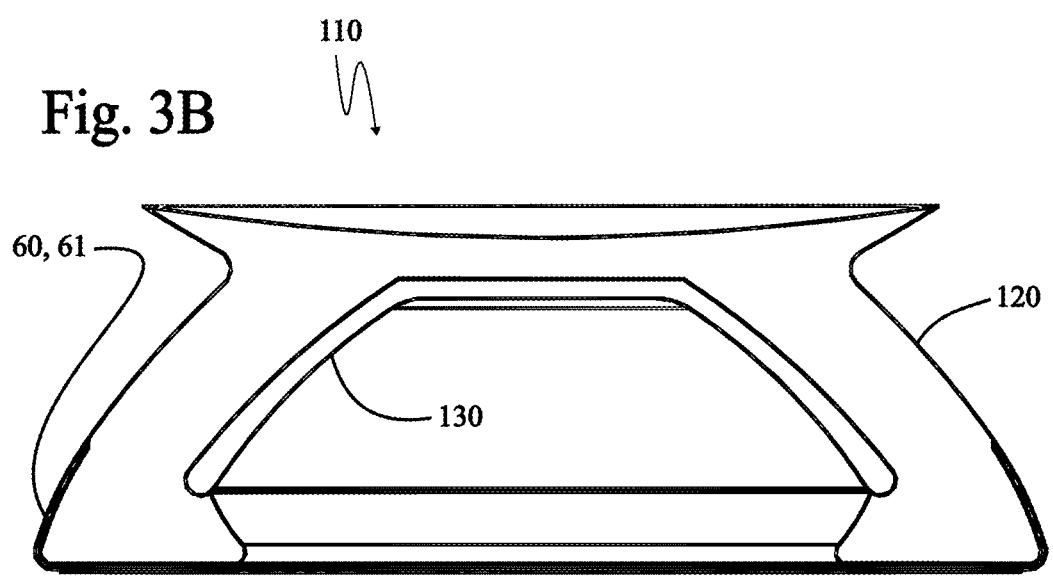
FIG. 3B is a front cross-section view of a midsole device according to the embodiment shown in FIG. 3A.

FIGS. 3A-3B illustrate a compressible internal support structure 34 comprising a foam or elastic solid inner conical disc. This internal support disc may or may not comprise one or more pockets or through holes to increase circumferential expandability. By making this insert from a more compressible material (as compared to other embodiments using, e.g., solid plastic) such as a higher density foam, it is possible to provide some of the same benefits as the radially rigid conical disc web insert, but with less radial expansion of the bottom of the foam conical disk. The compressible foam or elastic solid inner conical disc may be adhered to the inner or outer surface of the main conical foam disk or embedded inside the wall of the main conical foam disk.

Angular Stability Embodiments

FIGS. 3A-3B show an embodiment of a midsole device 10 with a larger upper section of material 64 to increase the area of the top of the conical foam disk. The angular stability of the device is also increased by having the larger OD of material on the top of the disk.

Midsole Devices with Non-Circular Geometries

Figure 16A:
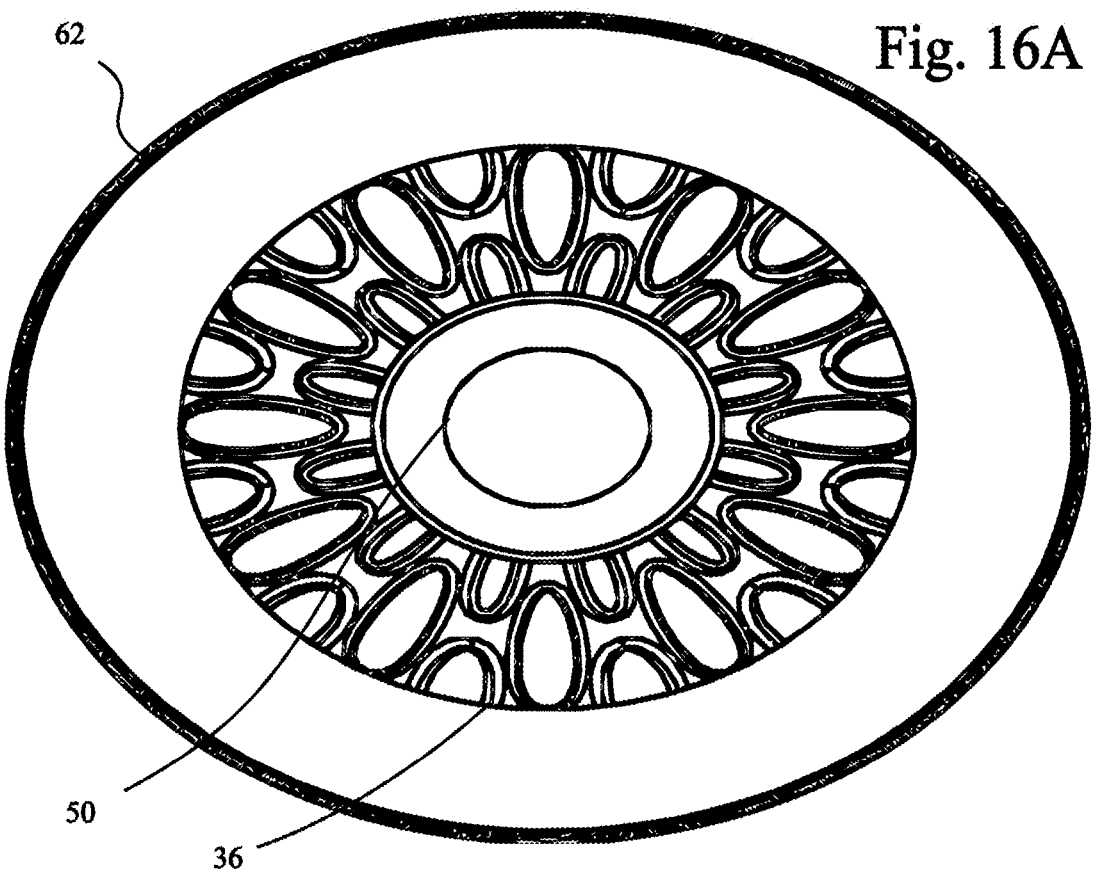
FIG. 16A is a top view of reinforcing structures of an elliptic midsole device.
Figure 16B:
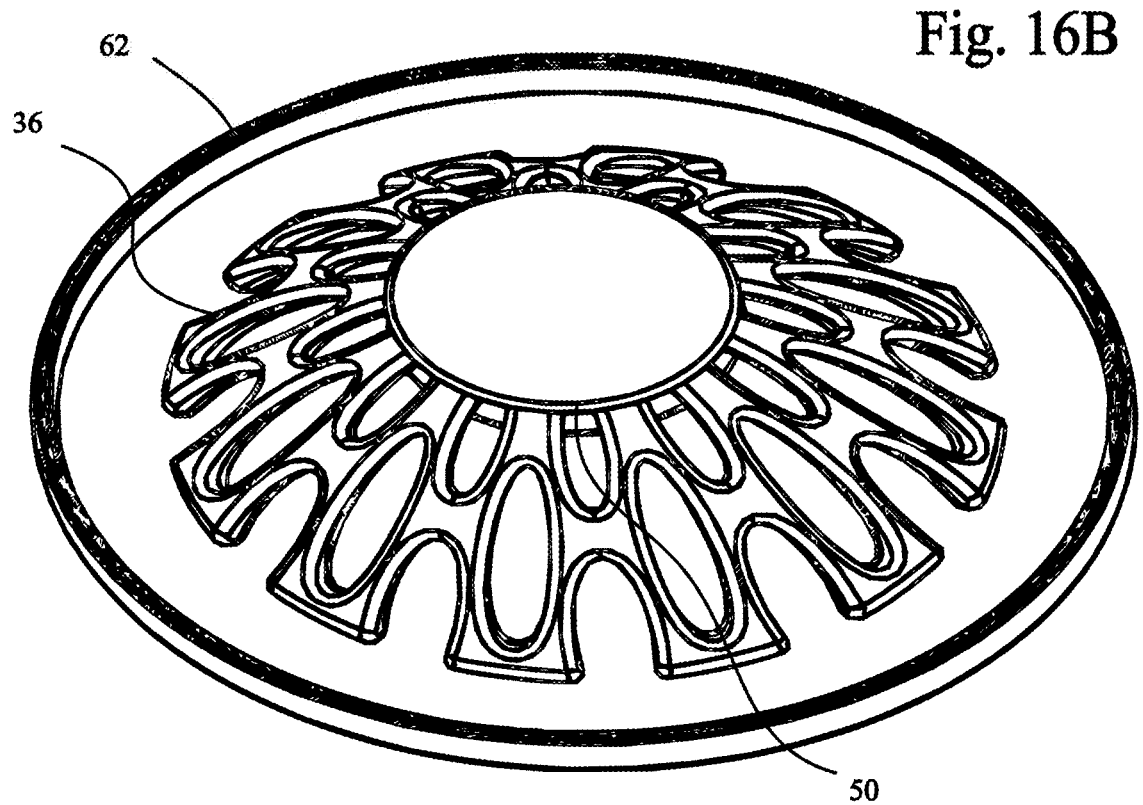
FIG. 16B is a perspective view of reinforcing structures of the elliptic midsole device of FIG. 16A
Figure 17E:
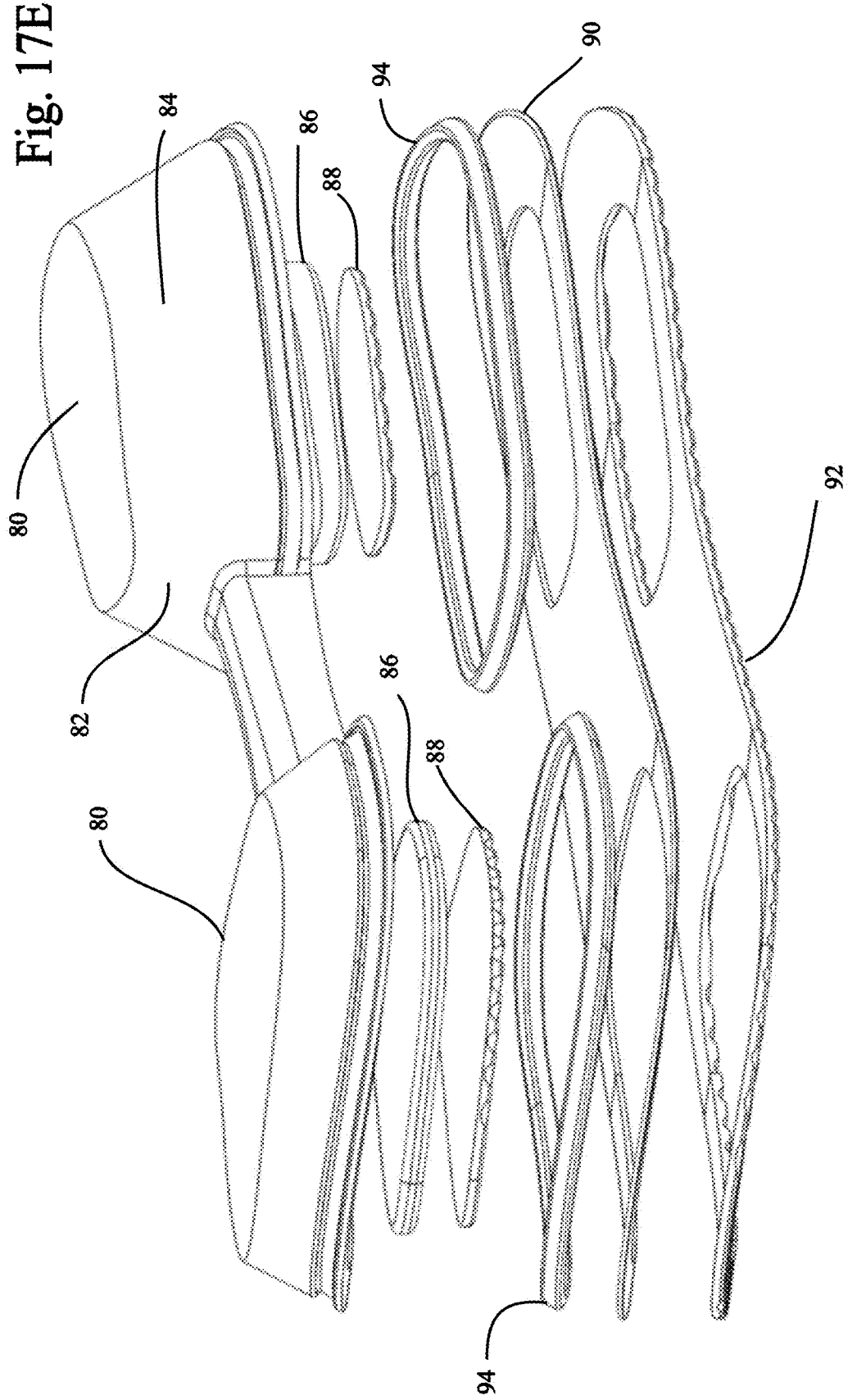
FIG. 17E is a perspective exploded view of the non-round configuration of a midsole device of FIG. 17A.
Figure 18A:
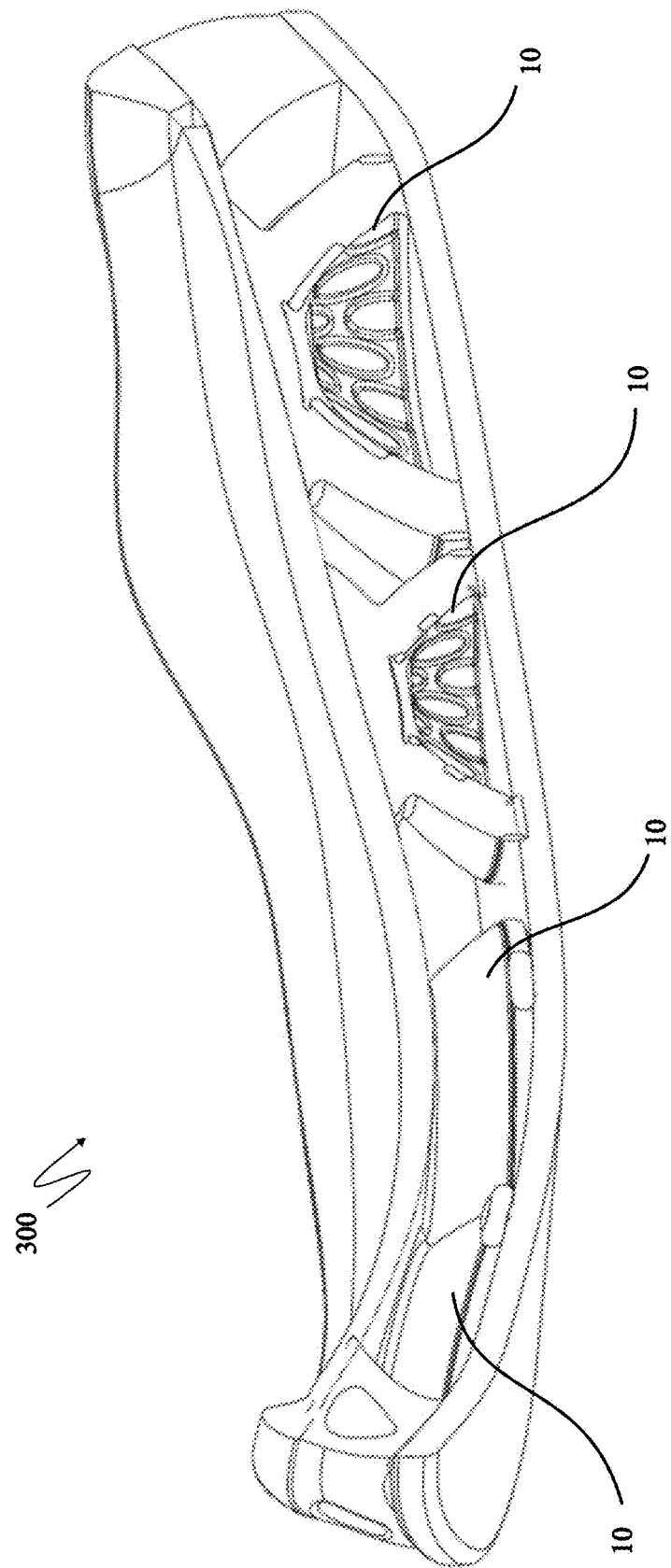
FIG. 18A is a perspective cross-section view of a shoe midsole according to an embodiment.
Figure 18B:
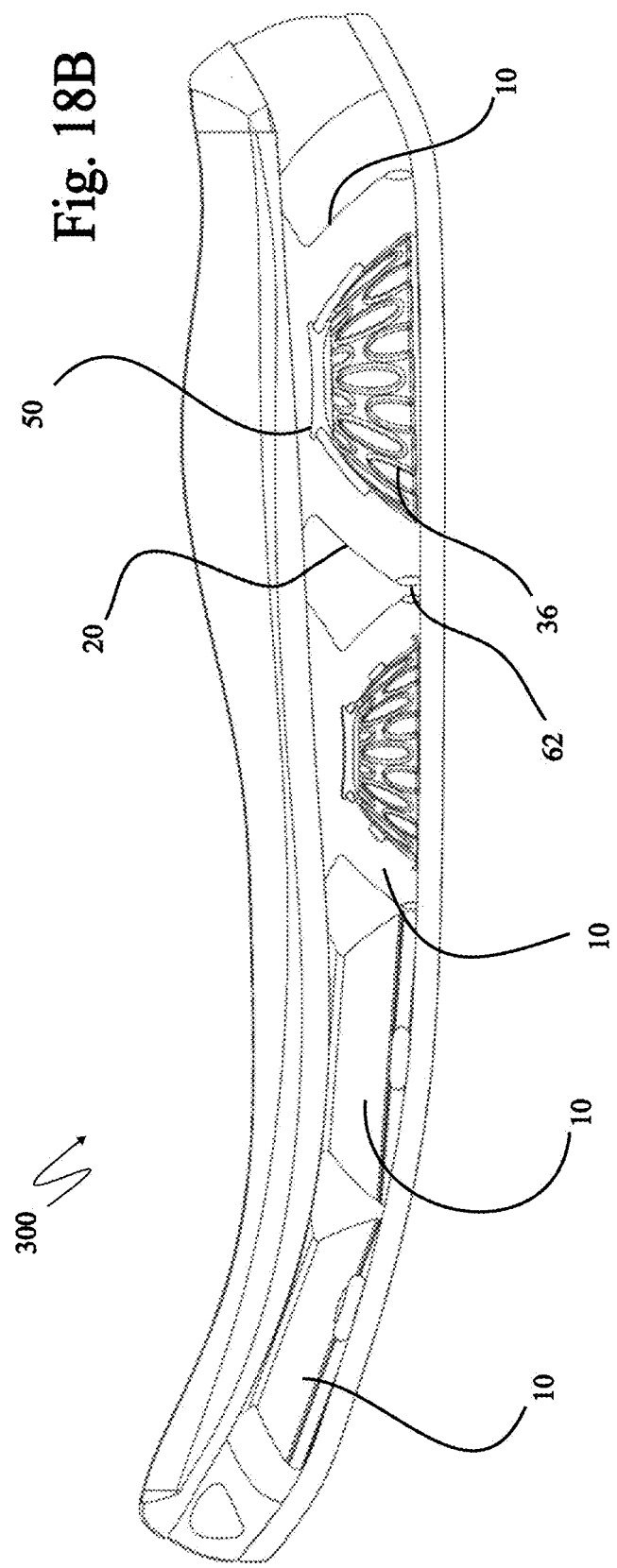
FIG. 18B is a side cross-section view of the shoe midsole of FIG. 18A.
Figure 19A:
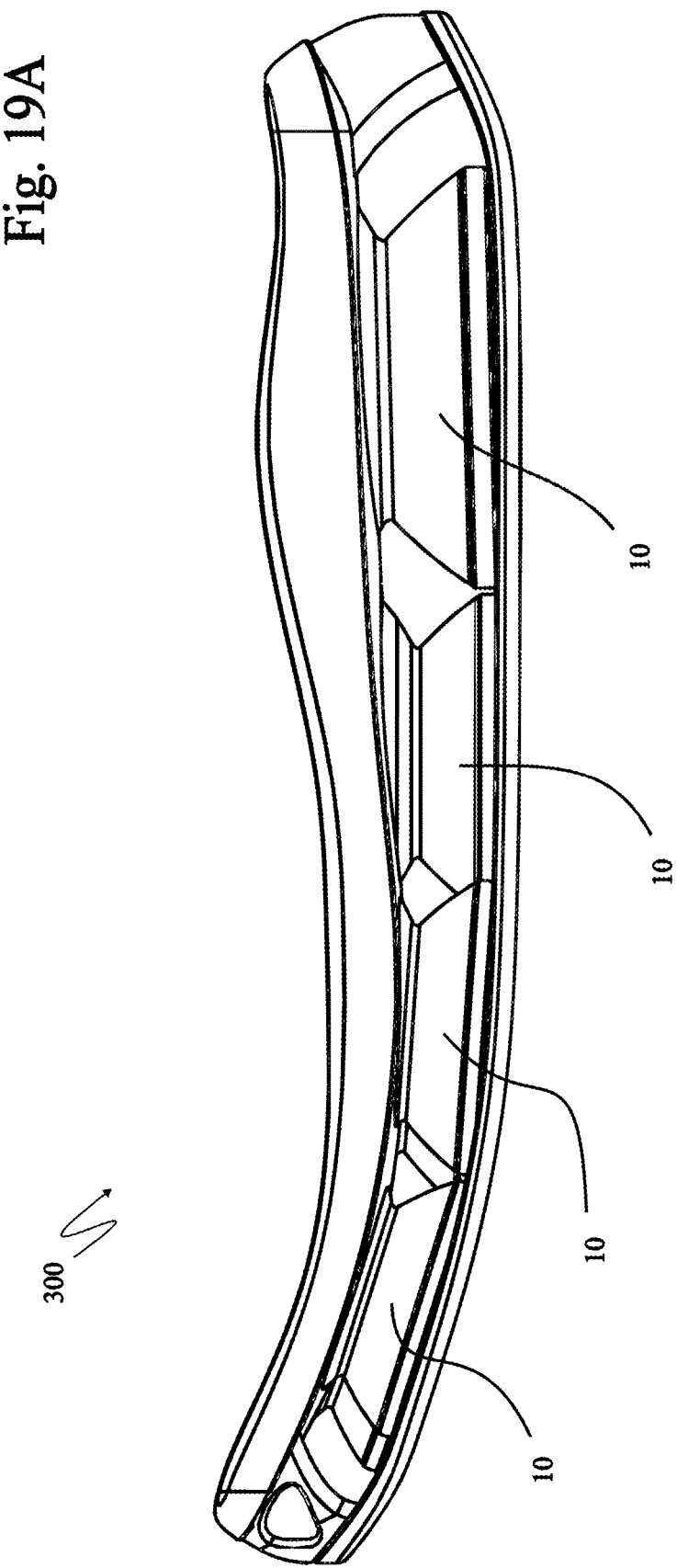
FIG. 19A is a side view of a shoe midsole according to an embodiment shown without sidewalls of the midsole, thereby revealing a multiplicity of midsole devices in the midsole.
Figure 19B:
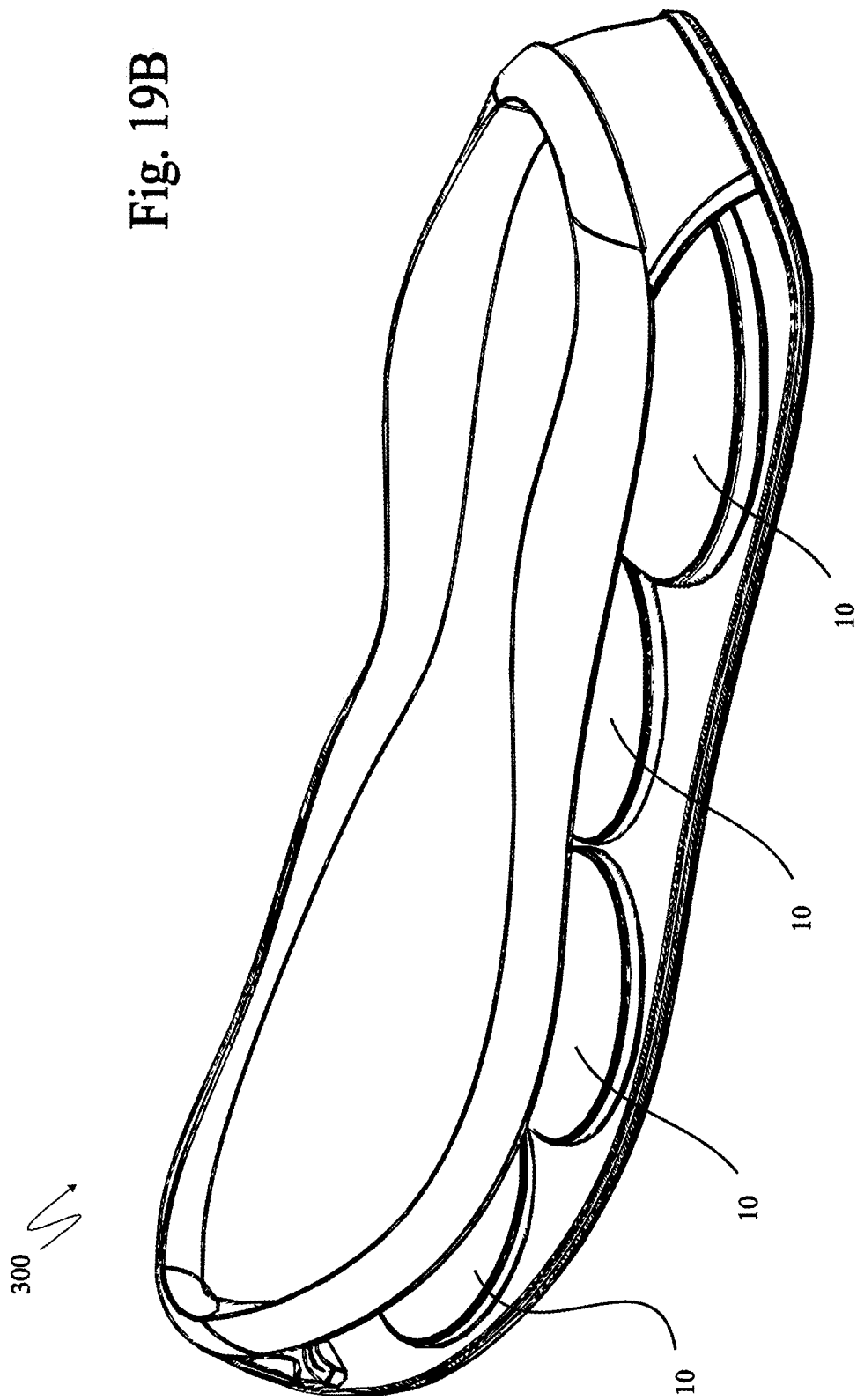
FIG. 19B is a perspective view of the shoe midsole of FIG. 19A.
Figure 20D:
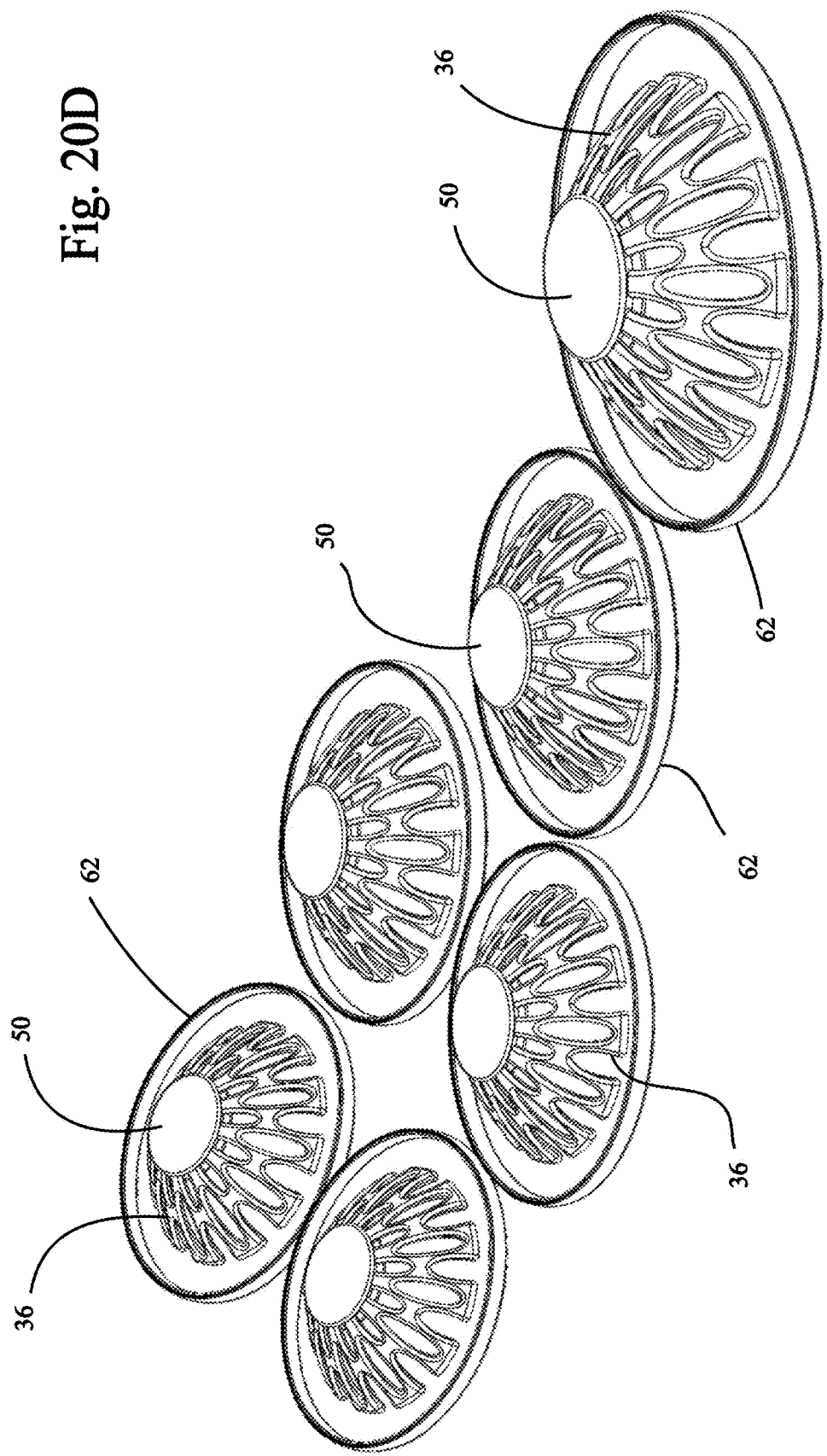
FIG. 20D is a perspective view of the guide support structures of FIG. 20C.
Figure 20E:
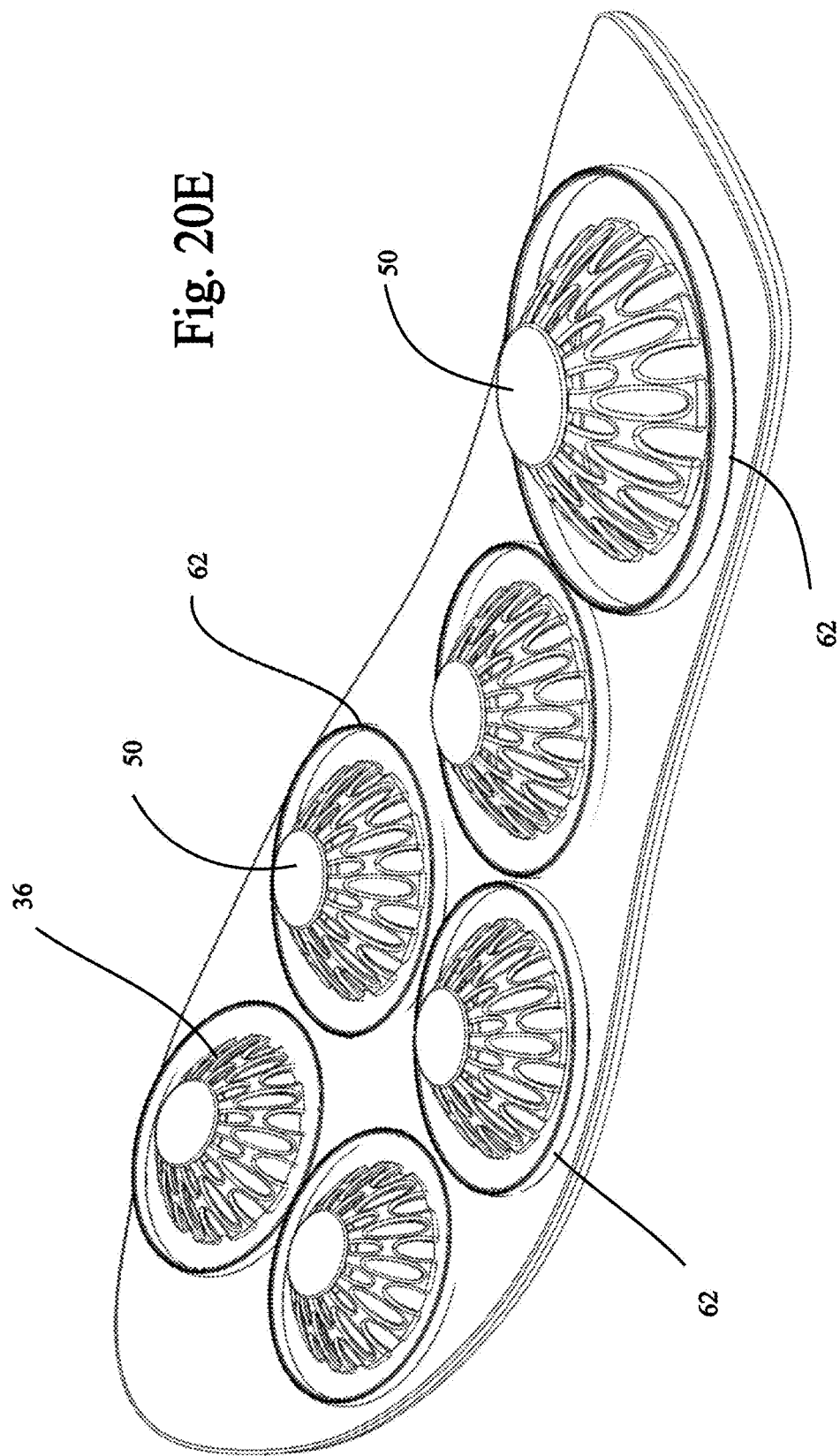
FIG. 20E is a perspective view of the guide support structures of FIG. 20C positioned on an outsole.

An example of a non-circular embodiment of a disk is illustrated in FIGS. 16A and 16B which illustrate reinforcing structures of an elliptic midsole device 10. FIGS. 17A-17F show some examples of non-round configurations including linear sections 84 of diagonal wall shapes 82 of a midsole with non-round midsole devices comprising non-round discs 80. Note that diagonal walls 82 are typically opposed across the length or width of the midsole by one or more oppositely angled diagonal walls to prevent horizontal shifting of the upper during compression. The configurations shown in 17A-17F have an additional damping foam layer 86 inside the disc with an outsole portion 88 which contacts the ground at full compression, in addition to the outer foam damping layer 90 and corresponding outsole 92 over the rest of the sole including the bottoms of the walls of the disc. Also shown in FIGS. 17A-17F are ring members 94 around the discs which act as lateral expansion limiters 60 analogous to ring 62 in FIG. 1.

Complete Midsole

FIGS. 18A-18C, 19A-19B collectively illustrate exemplar complete midsoles 300 with embodiments of midsole devices 10 embedded. FIGS. 20A-20D illustrate how a multiplicity of midsole devices 10 can be incorporated into a midsole 300.

FIG. 21A-FIG. 21D collectively illustrate embodiments in which holes 330 in the outsole 310 may be used to prevent air from sealing in the conical chambers, thus allowing the open bases of the domes to act as openings allowing air to enter and exit the cavities. Horizontal airflow channels 320 in the bottom of the outsole 310 are used to enable airflow if walking on a smooth flat surface. Other airflow channels may also be used above the outsole to prevent suction if walking in water or mud. Where airflow ports are located above the outsole, the conical or other shaped foam structure may be air sealed on the bottom.

Forefoot Outriggers.

FIGS. 25A-25E show exemplary embodiments of the present device with one heel disk and two forefoot disks. The forefoot disks and heel disks may each comprise variations on midsole devices 10 as set out generally herein. The forefoot disks may be at a combined width of the top of two of them somewhat side-by-side, and preferably slightly staggered fore and aft to align with the user's (MTP) joints, with an upper combined width which is approximately equal to the width of the bottom of the upper. The flared shape of the disks is then shown to protrude to the left, and/or the right of the upper by 10% or more, 20%, or more, 30% or more of the largest diameter of each device.

Lateral protrusions on the outsole, provide a complete platform for the bottom of the conical disks. By following the general shape of the upper for other areas of the outsole, minimal weight is added to the outsole. These protrusions may be flat to the ground, but are preferably tapered upward in the laterally outward direction to prevent early contact of the protrusions with the ground when running around a corner.

Shearing Foam Toe Area

Figure 25A:
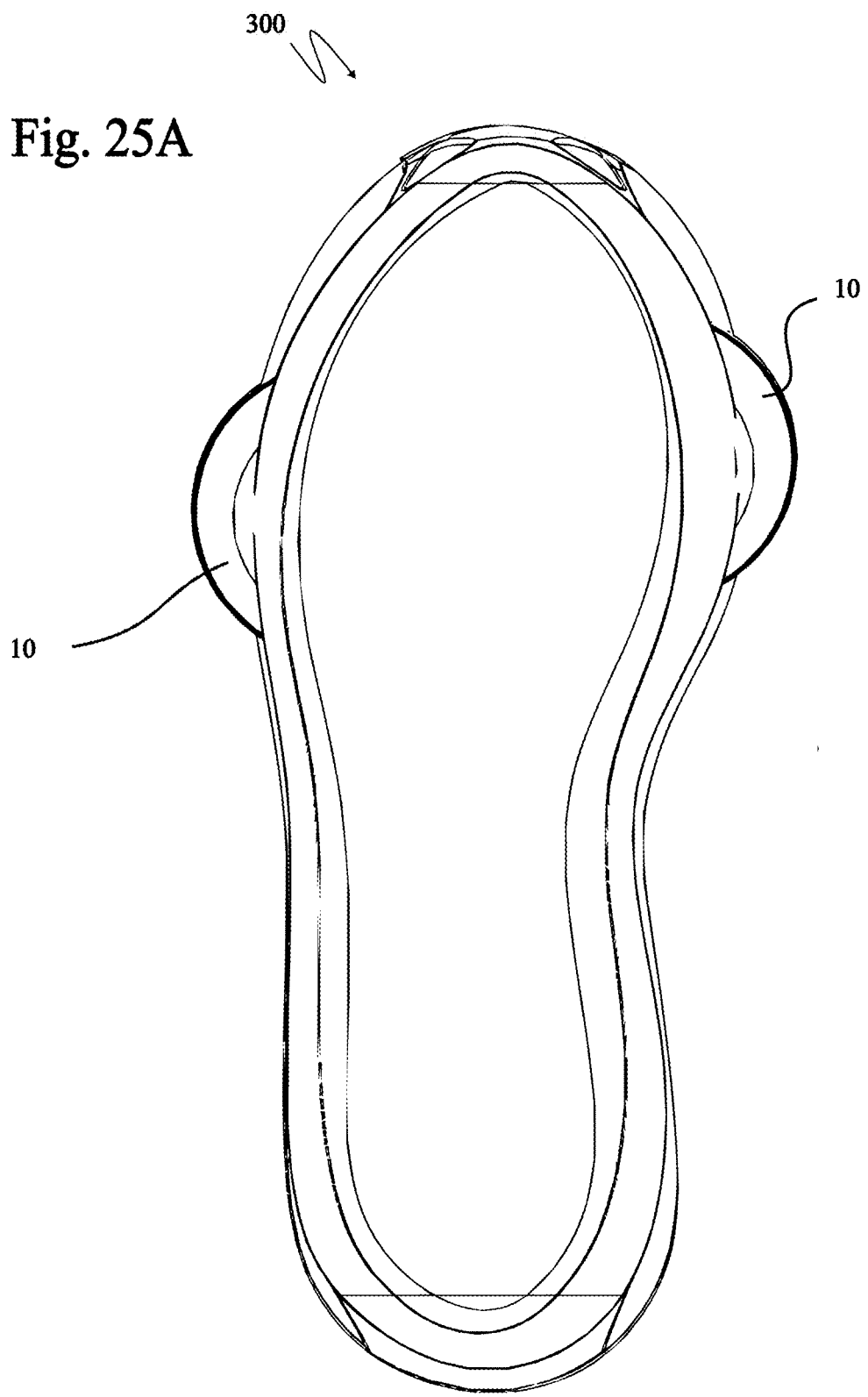
FIG. 25A is a plan view of a midsole according to an embodiment comprising tapered midsole devices.
Figure 25B:
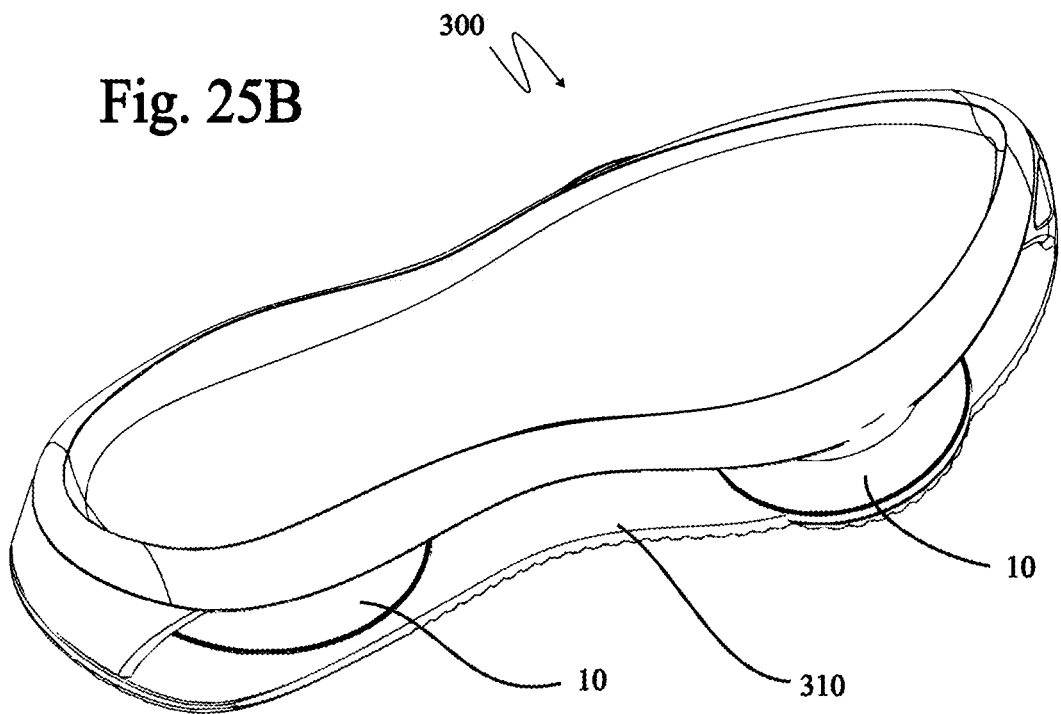
FIG. 25B is a perspective view of the midsole of FIG. 25A.
Figure 25C:
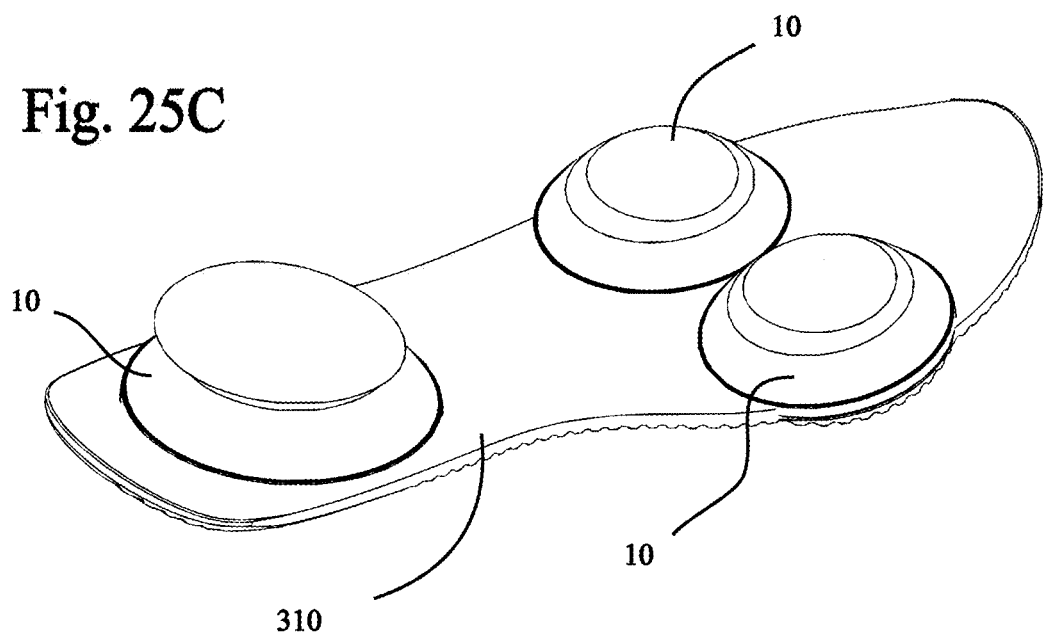
FIG. 25C is a perspective view of the midsole devices and outsole of FIG. 25B.
Figure 25D:
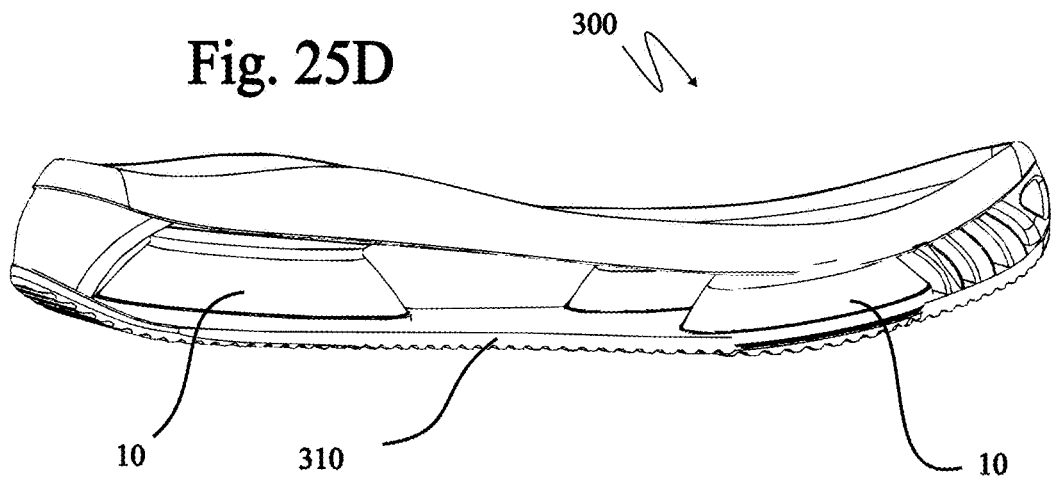
FIG. 25D is a side view of the midsole of FIG. 25A.

A non-limiting exemplary embodiment is shown in FIG. 25D. In this embodiment, the midsole in front of the forefoot domes has a structure, made of a compressible or deformable material such as foam or an elastomer which is able to deform in a shearing regime forward or rearward relative to the upper. When the user strikes their heel to the ground before striking the forefoot, a forward shearing of the midsole toe area, relative to the upper, has been observed in prototypes, and results from the high travel of the midsole under compression and the vertical travel of the top of the foam domes relative to the outsole and the taper that may exist in a midsole of the device. A shear-deflection block or blocks as shown here, store the fore-aft shearing energy and releases it back into the upper by propelling the upper forward during toe off as the toe of the midsole expands and returns from the shear-deflected shape to the original at-rest shape.

Tapered Foam Domes

The high compression ratio (the compression travel for a given stack height) of embodiments of the present device results in an unusually low profile midsole under full compression. It is typical, for large stack height in a conventional shoe, such as with a 40 mm stack height at the centre of the users heel, to have a maximum change in thickness, at rest, between the heel and the toe, of 4 mm to 10 mm.

It has been found by experimentation that a reduction in thickness, at rest, of the forefoot of device shown here, under the medial and lateral metatarsophalangeal (MTP) joints, of greater than 10 mm, greater than 11 mm, greater than 12 mm, greater than 13 mm, greater than 14 mm, greater than 15 mm, greater than 16 mm, greater than 20 mm, offers a better user experience for some users. This is because the unusually high percentage of compression travel from this technology would result in the toe being uncomfortably high, compared to the heel at full compression if a standard 4 to 10 mm, forefoot thickness difference was used when the shoe is at rest.

The total compression of the midsole under the heel is higher than the total compression of the midsole under the forefoot. When wearing the shoes, it takes less force than a conventional midsole to do the initial compression of the heel and forefoot, so the shoes will feel like they have a more conventional 4 to 10 mm reduction in thickness of the toe when they have a downward force applied to the them by the user, as long as they have a greater than 10 mm drop from heel to toe when not weighted.

Figure 25E:
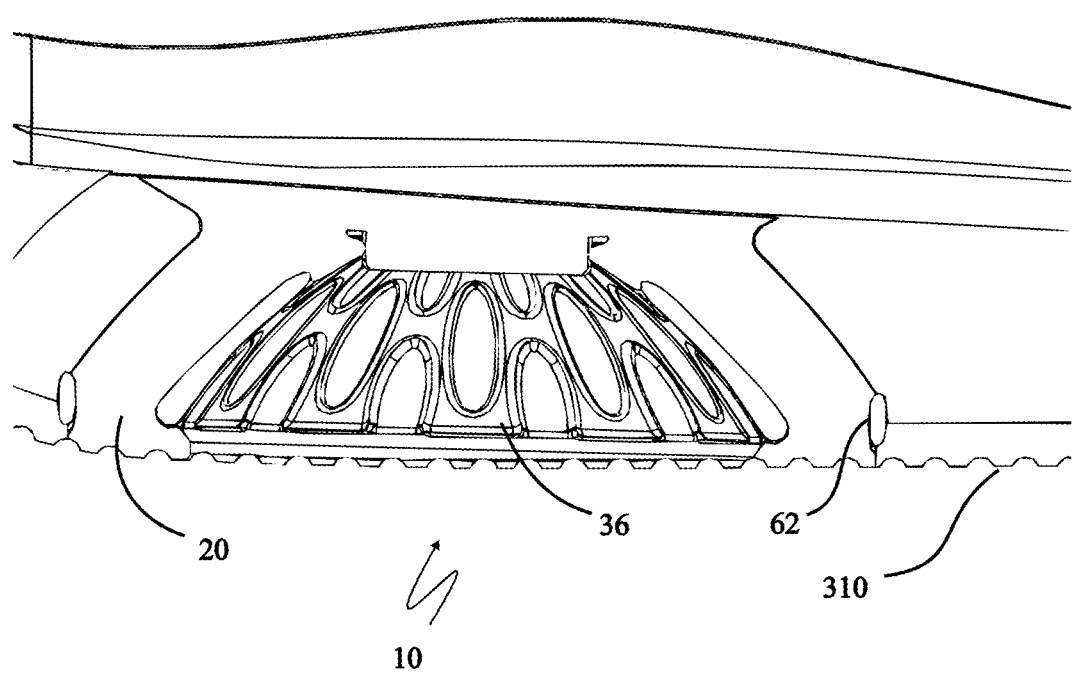
FIG. 25E is a side cross-section view of a midsole device of FIG. 25D.

In FIG. 25E it is also shown that a slight taper on the top, and/or bottom of one or more foam domes may provide a more natural feel to the user and reduces pressure points along the leading edge of a non-tapered dome.

For some applications, it is considered beneficial to also taper the web inserts as well.

The domes and/or webs may be tapered on the top and/or the bottom of the dome.

One Piece Guide Support Structures, Foam Domes and Outsole

In an embodiment, one or more of the foam domes are manufactured as a one-piece construction together with the outsole. The domes may also be of a one-piece construction with one or more other domes and a foam or other material layer above them and on the bottom of the upper. This may be more difficult to manufacture, however. The guide support structures and/or ring springs may all be one piece as well. Connection elements may be used. This may be beneficial for simplifying assembly and overall stability of the midsole.

Compression-Biased Damping

A benefit provided by various embodiments of the conical foam domed disk 20 (with or without the internal web structure and with or without the ring spring) is the delay of energy return until later in the stance, which results from the device's non-linear stiffness throughout its expansion (specifically that the expansion force will have a reducing spring force part way through the expansion or even an increase in spring force part way through the expansion). This is beneficial to delay the energy return, but this attribute is also seen in the device's compressive stiffness, resulting in a reduction of the spring rate or even a reduction in the spring force, part-way through the compression loading. This falling off of the spring rate or possibly, the spring force, during compression, can cause the midsole to bottom out more abruptly than desired. As such, a construction which minimizes or eliminates the drop-off in stiffness during compression is desirable, but it is also desirable not to increase the spring force near the bottom of the travel during the expansion so the midsole can remain more compressed during midstride and return much of this energy later in the stance.

Figure 24A:
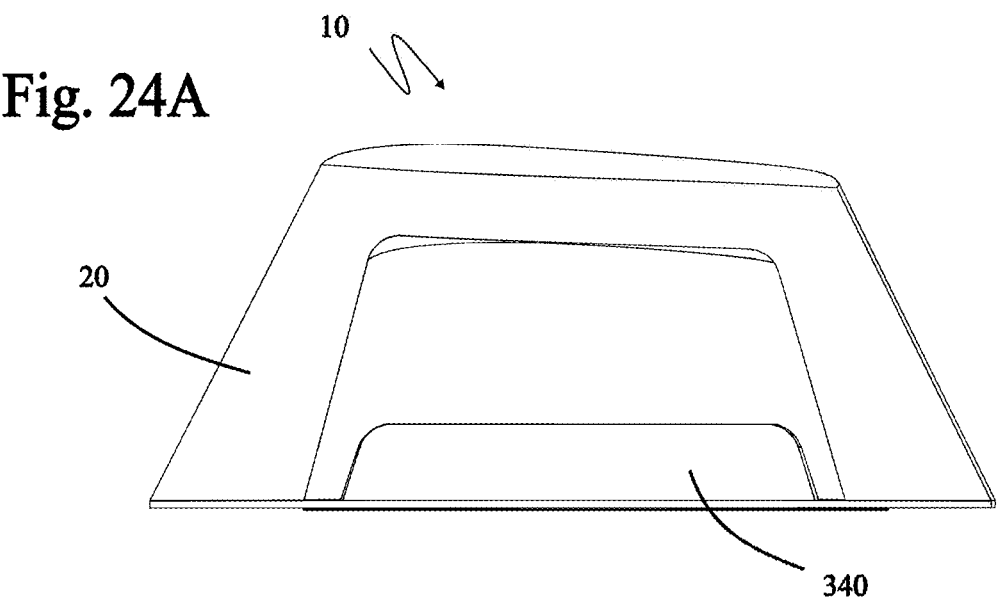
FIG. 24A is a side cross section view of an embodiment of a midsole device including a biased damper.
Figure 24B:
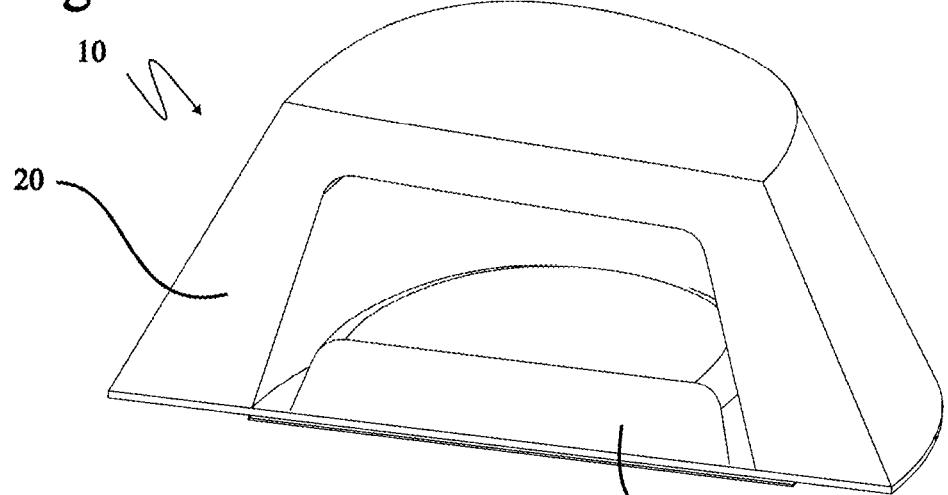
FIG. 24B is a perspective cross section view of the embodiment of FIG. 24A.
Figure 24C:
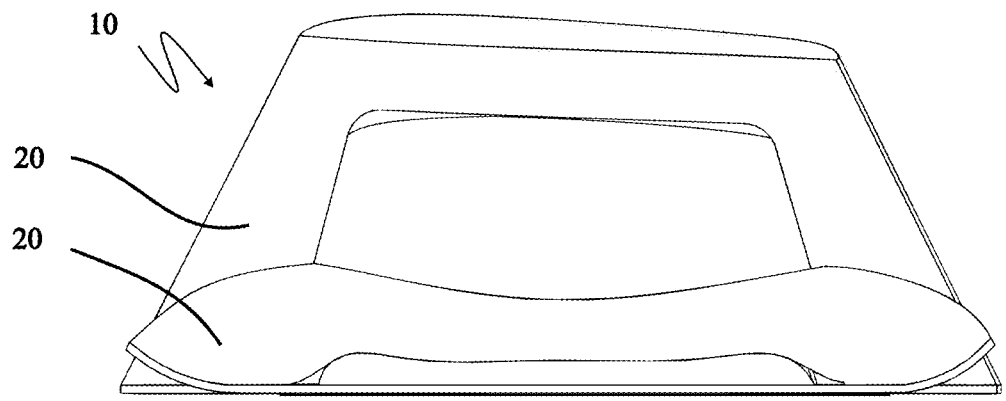
FIG. 24C is a side cross section view of the embodiment of FIG. 24A with a domed disk of the midsole device shown in a compressed state in front of the same domed disk in an uncompressed state.
Figure 32:
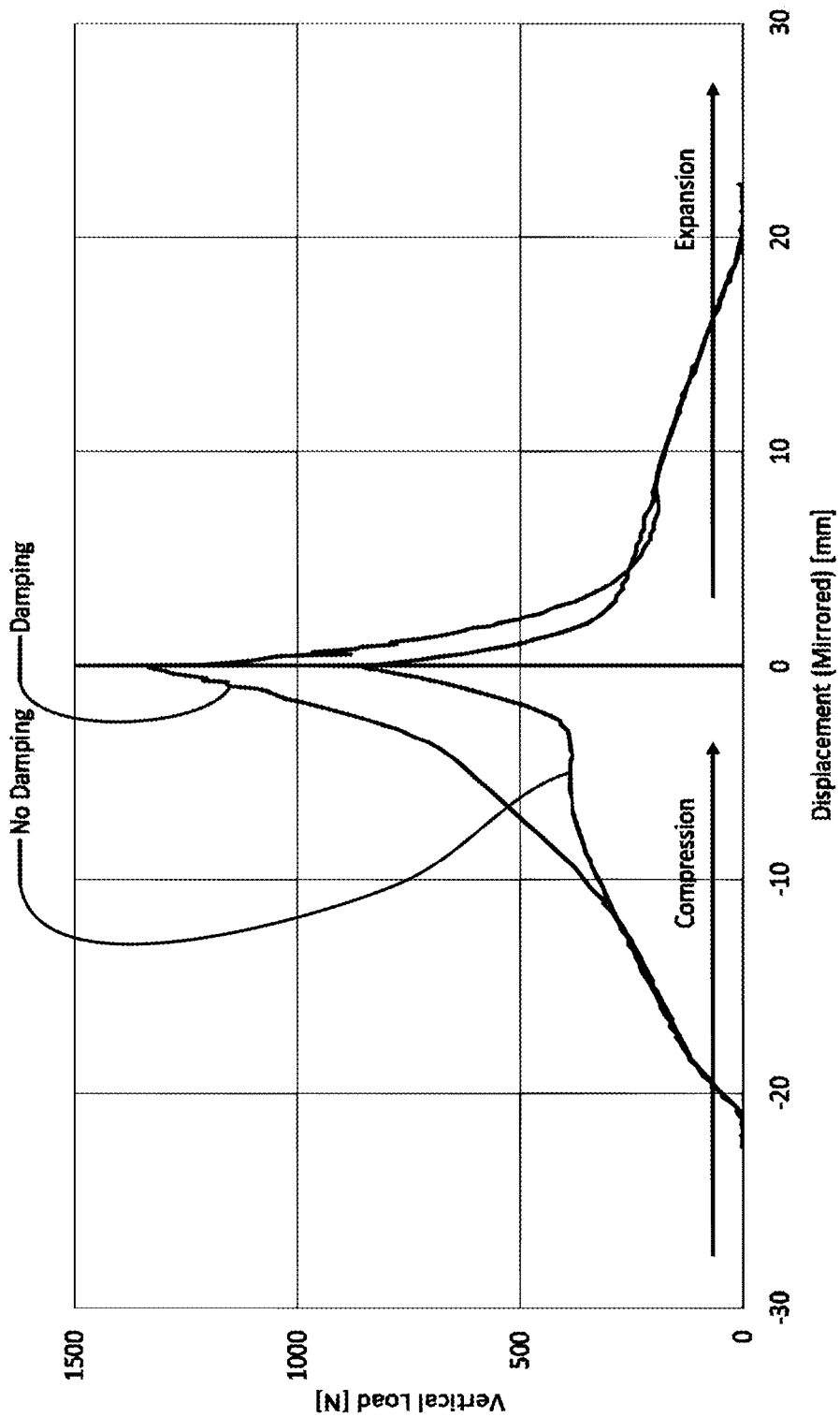
FIG. 32 is a graph showing a comparison of the load vs displacement profiles for a single device with and without the inclusion of compression-biased damping elements.

One solution to this issue is the inclusion of compression-biased damping elements 340 in the device 10, as illustrated in FIGS. 24A-24C. After being compressed, the damping element/s are not caused to expand by the rest of the structure during midsole expansion, so the compression biased damper will contribute much more to the compressive phase than the expansive. This can be seen in FIG. 32, which displays a comparison of the load vs displacement profiles for a single device with and without the inclusion of compression-biased damping element/s. The more linear compression curve is desirable and provides greater comfort and impact reduction to the user. The more linear curve, however, translates to losses in efficiency because the damping element is dissipating the additional energy rather than storing it and releasing it later in the stride where it could provide additional propulsion. This loss of energy is only during compression, however, and is seen as a reasonable trade-off between performance and comfort.

Midfoot Power Dome (Alternative or in Addition to Damping)

Figure 33:
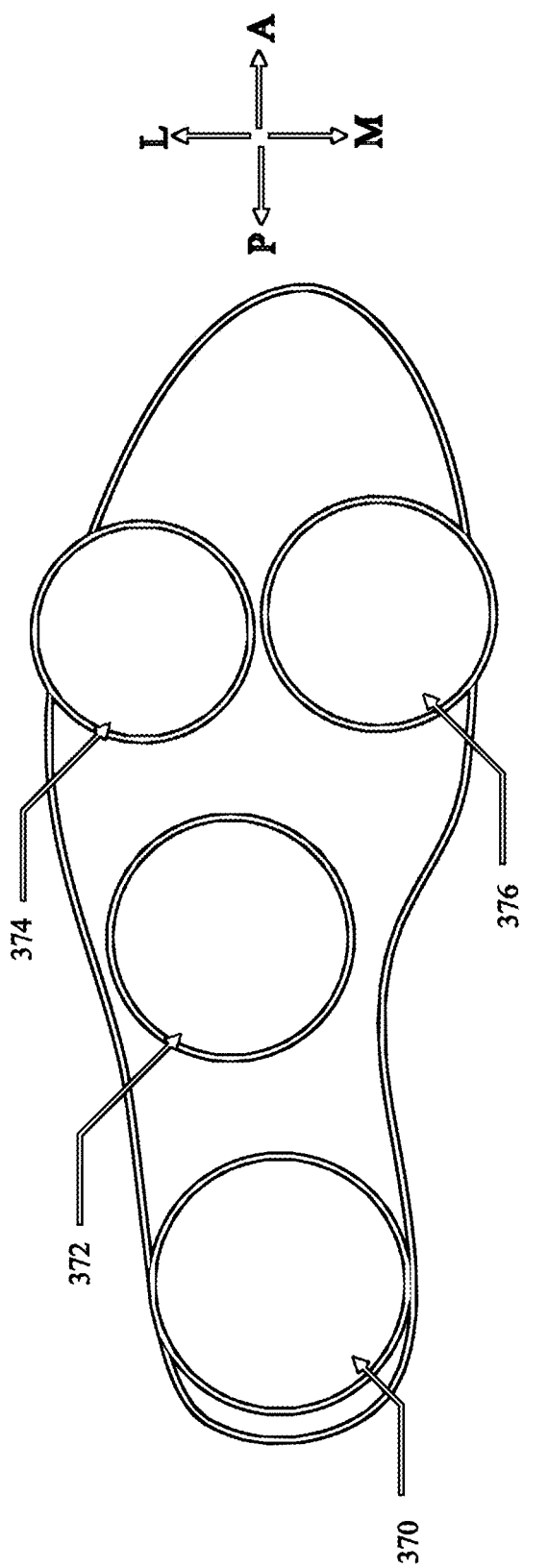
FIG. 33 is a top plan view of a midsole comprising four midsole devices in an exemplary configuration.

In an embodiment, the integration of multiple conical foam disks into a single shoe, staggering their effects such that the variable spring rate of each disk complements the previous disk. FIG. 33 discloses a non-limiting example configuration of four conical foam disks according to the principles of this device: rearfoot device 370, midfoot device 372, lateral forefoot device 374, and medial forefoot device 376, though many other configurations are possible and anticipated by the inventors. In the exemplary configuration, contact is expected to begin at device 370, progress to device 372 before device 370 is fully compressed, then progress to begin compressing devices 374 and 376 in parallel before device 374 is fully compressed.

Figure 34:
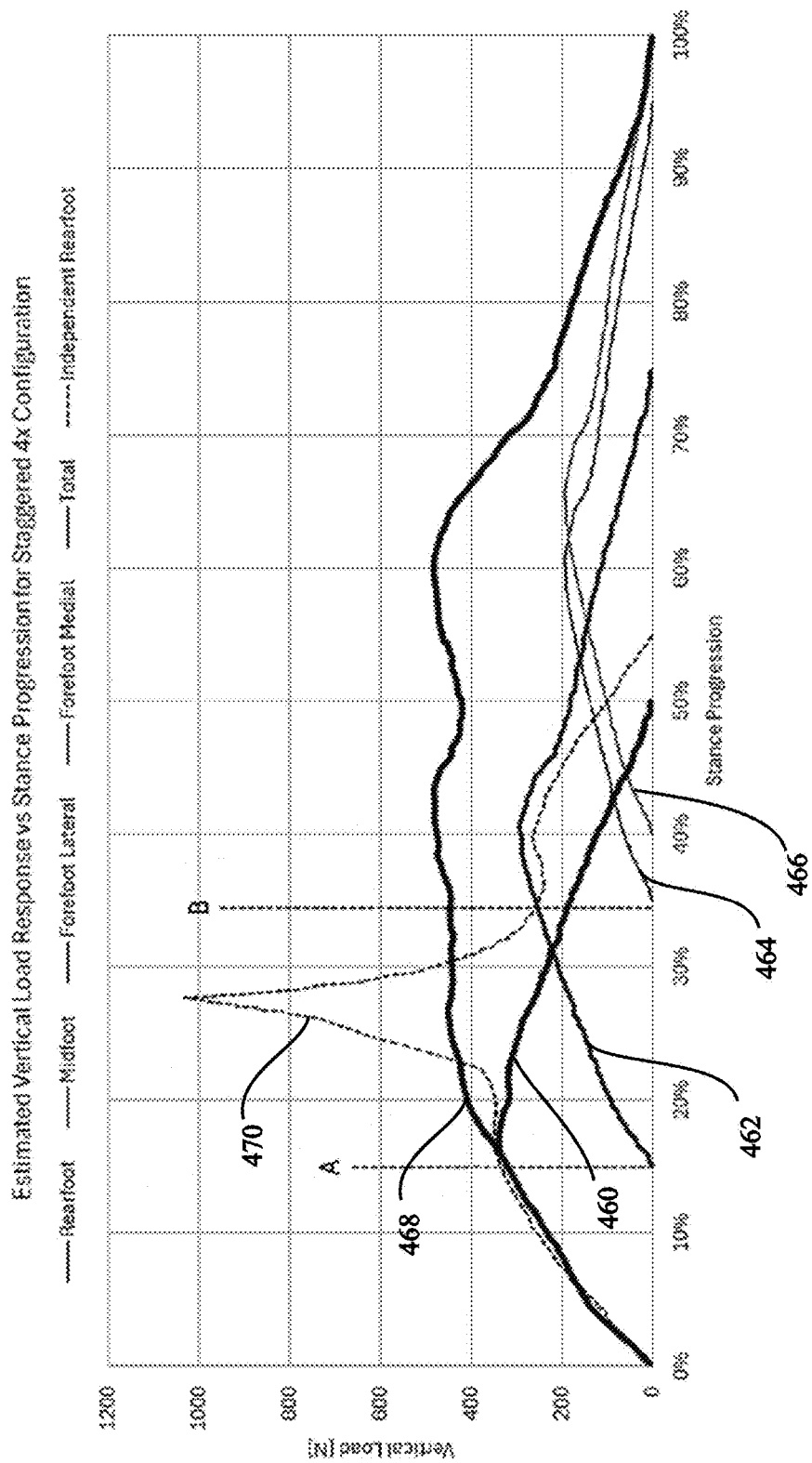
FIG. 34 is a graph showing an estimation of the load response provided by a distribution of midsole devices and the timing of their operations throughout stance.

The graph in FIG. 34 depicts a non-limiting example of an estimation of the load response provided by each midsole device 10 and the timing of their operations throughout stance, as well as a trace of the load response provided by an exemplary independent rearfoot device for comparison. FIG. 34 shows estimated vertical load for a rearfoot device 460, a midfoot device 462, a forefoot lateral device 464 and a forefoot medial device 466. Total vertical load 468 is the sum of the loads of the four midsole devices. Independent rearfoot device load 470 represents the load response of an exemplary independent rearfoot device. The total vertical load line 468 is smoother than the single heel device comparison line (independent rearfoot device load 470)

which has a more significant peak which would be felt by the user as a higher impact event at the end of the heel strike phase.

The rearfoot and forefoot devices are located to provide optimal support to a user's foot, with the rearfoot unit supporting the heel and the two forefoot units supporting the medial and lateral metatarsophalangeal (MTP) joints. The midfoot device's anteroposterior position is defined such that it begins compression just before the rearfoot unit's load response flattens (FIG. 34—Point A). Accordingly, the rearfoot unit's reduction in stiffness is supplemented by the introduction of the upward force provided by the midfoot device so the user does not experience a decrease in support underfoot, as the spring rate of the heel device falls off, resulting in a smoother transition (known as "ride" in the industry) as the user's weight transfers along the midsole from the heel to the forefoot. This effect can also be applied in the transition between midfoot to the forefoot (FIG. 34—Point B). The midfoot unit's mediolateral position is typically defined such that it is centered under the arch of the foot, though this can be adjusted as desired to compensate for gaits exhibiting over/under-pronation, for example.

An advantage of this approach over an additional damping component, is that the compression energy of the midfoot disk is stored and released, to increase propulsion, rather than being dissipated with a damping element.

Damping element/s may still be used together with the midfoot disk configuration with various effects.

Web Member

The inventors have shown, through FEA analysis and empirical testing, that the performance of the device can be improved in several respects with the addition of a circumferentially and/or horizontally expandable member of a higher compression stiffness in the radial/diagonal cross section direction as compared to the conical foam disk. This web structure is adhered or otherwise attached to the inside, and/or outside of the conical foam disk or it may be embedded into the diagonal foam wall of the conical foam disk. A non-limiting list of benefits of the addition of the web structure in some embodiments is to increase the internal strain in the foam during compression of the assembly to increase the spring force of the assembly, to increase the lateral shear stability of the assembly, and in some further embodiments, to increase the non-linearity of the spring force during compression as a result of the flattening of the web toward full compression to direct the vertical compression forces of the user into a horizontal force with decreasing vertical resistance toward and at full compression. The web structure may deform to a shape that is past horizontal, at full compression, such that some of the internal strain will be acting to push the ID of the web downward instead of upward. This may serve to further reduce the upward spring force of the assembly, part way through the compression travel for a more significant delay in the energy return during rebound.

Figure 42A:
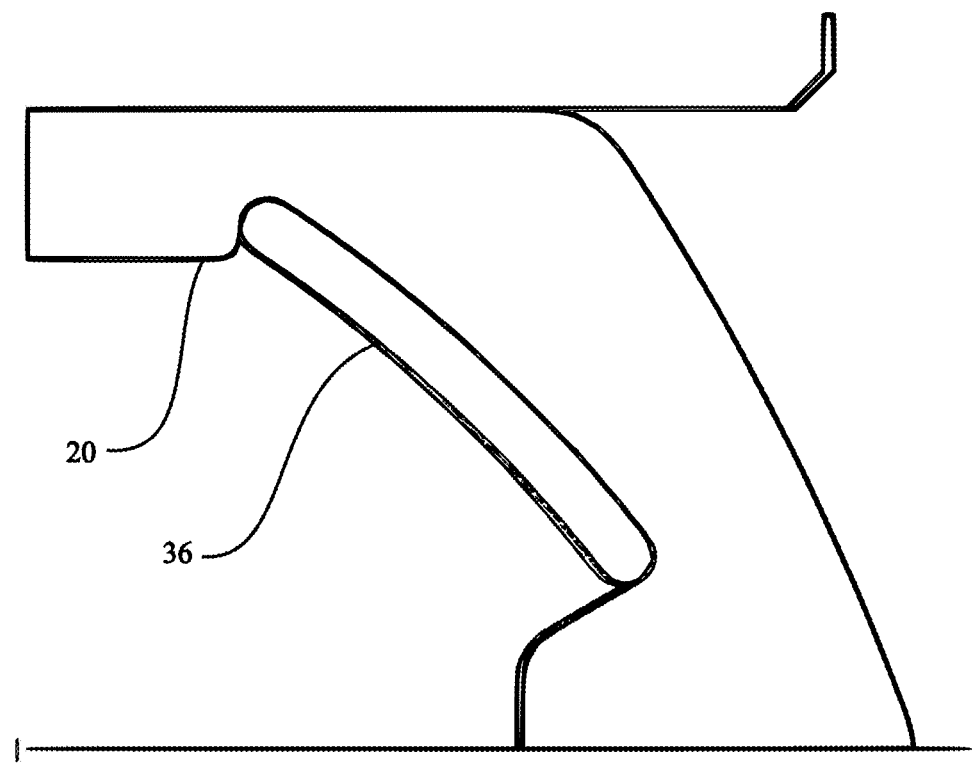
FIG. 42A is a front cross-section view of a midsole device according to an embodiment comprising a web insert in an uncompressed configuration.
Figure 42B:
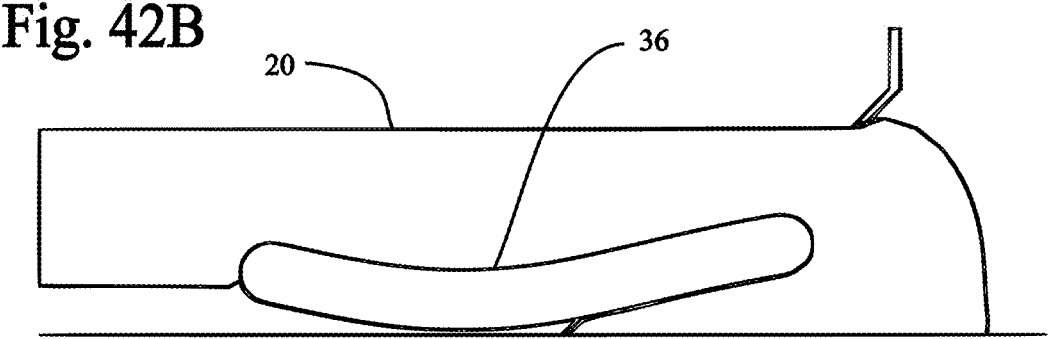
FIG. 42B is a front cross-section view of the midsole device of FIG. 42A in a compressed configuration exhibiting buckling of the web insert.

While the web can increase the spring force and other performance aspects of the conical foam dome, there is a symbiotic structural relationship between the two where the foam dome also provides enough bending stiffness to the web structure to prevent it from fully buckling in the radial/diagonal direction at full load. This allows the web to be a very lightweight structure because it does not need to prevent its own buckling. In fact, the web has been shown, in some configurations of the device, to experience a controlled buckling behavior where it is forced, by the deformation of the conical foam disk during compression travel of the assembly, to pass from a straight or concave shape through to a convex curved shape at full compression. This is a buckling motion, but it is controlled and limited in its extent by the stiffening effect of the foam. This effect is shown in FIGS. 42A and 42B in which the web structure 36 buckles as the domed disk 20 compresses during travel.

Figure 36:
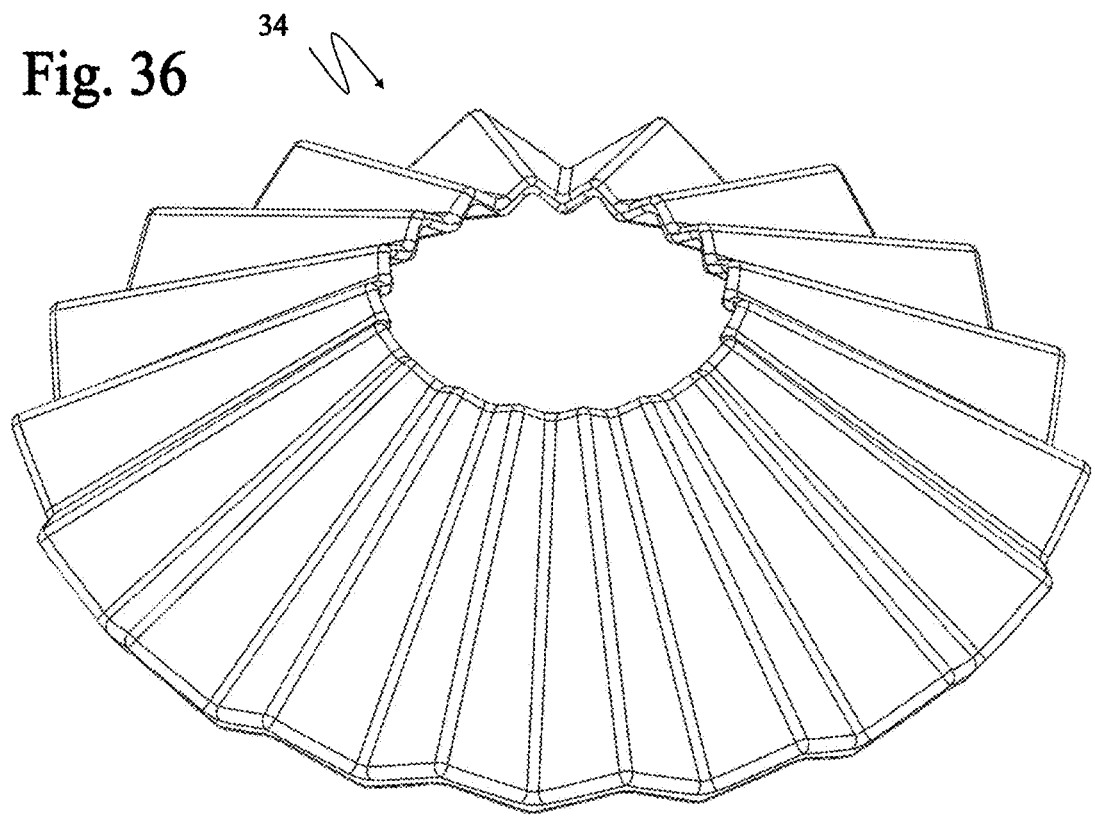
FIG. 36 is a perspective view of a web structure comprising an accordion or wave web.
Figure 37:
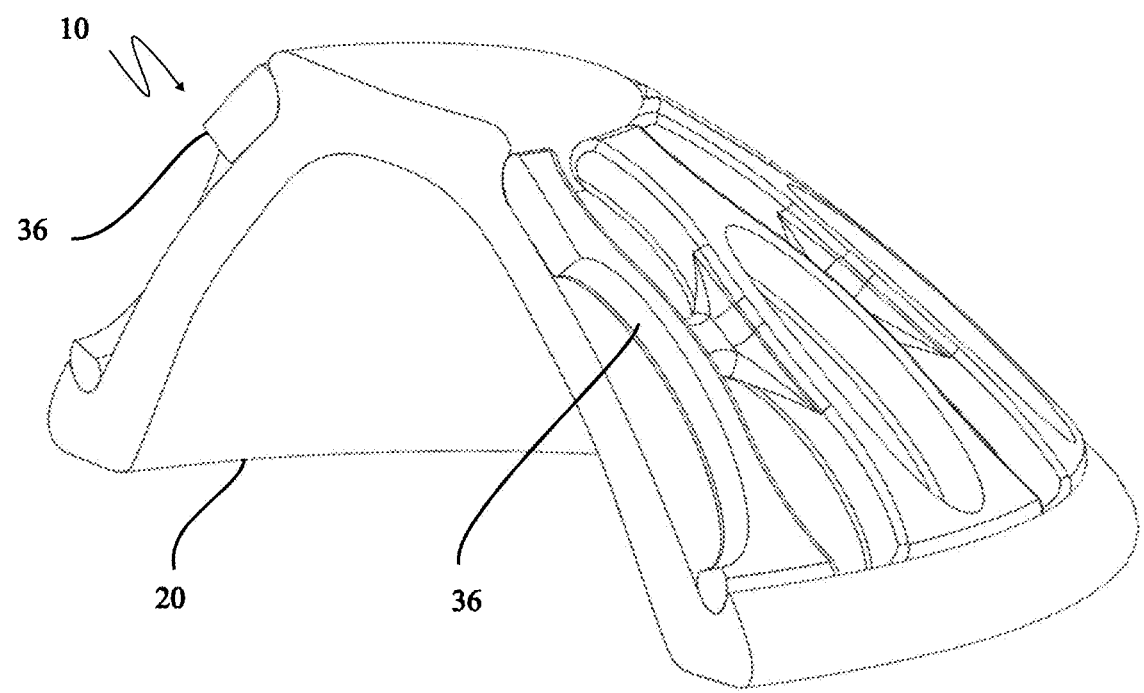
FIG. 37 is a perspective cross-section view of midsole device comprising a web structure on the outside of a foam domed disk.

The web may be of many shapes to achieve a range of desired effects. A non-limiting exemplary web structure, shown here, has a non-continuous circumferential shape, preferably at any vertical plane, although a continuous shape at some, but not all vertical planes may work, as well as a continuous shape at any or all vertical plane positions as long as there is minimal or no uninterrupted circles of material. This could be true of, say, a circumferential or horizontal wave or accordion shape for all or part of the web structure, as illustrated in FIG. 36.

Figure 26A:
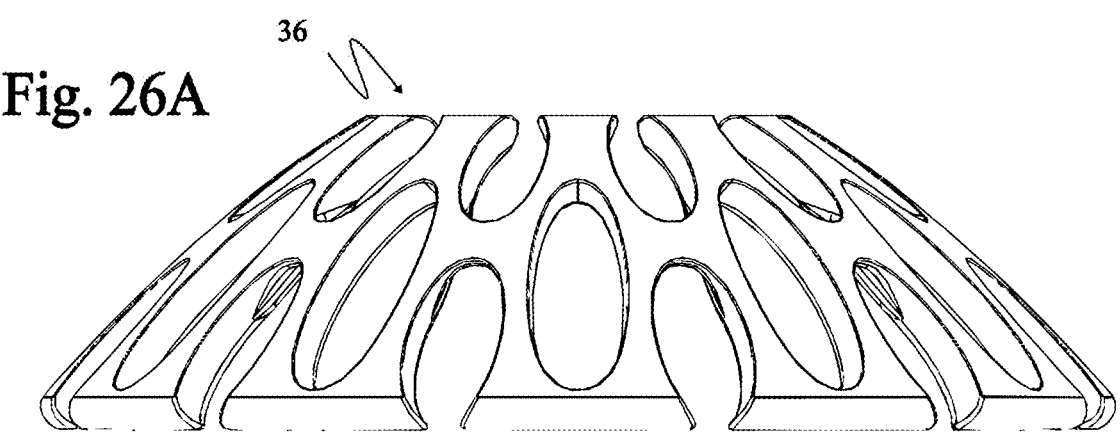
FIG. 26A is a front view of a web structure according to an embodiment.
Figure 26B:
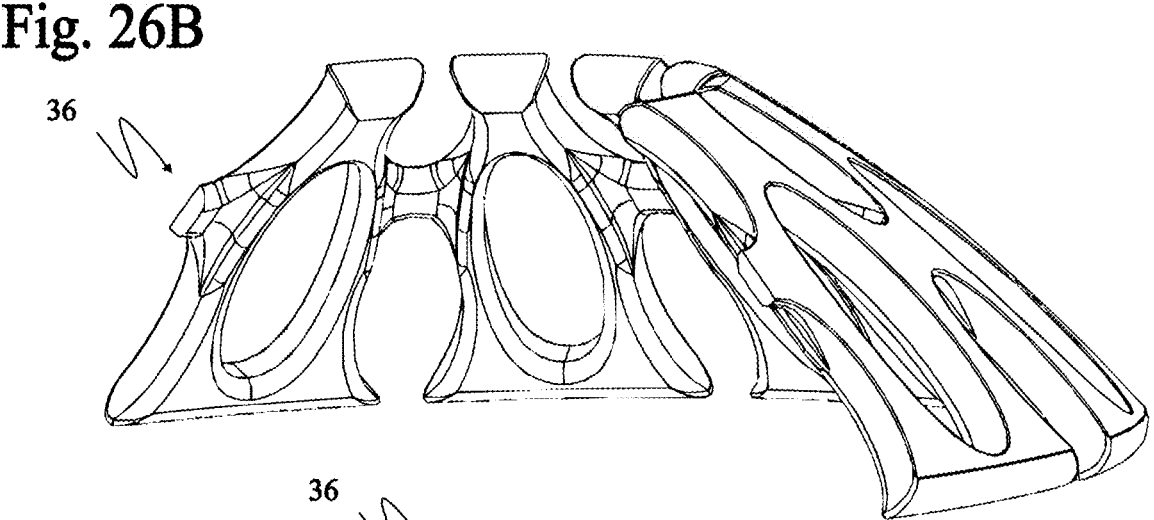
FIG. 26B is a perspective cross-section view of the web structure of FIG. 26A.
Figure 26C:
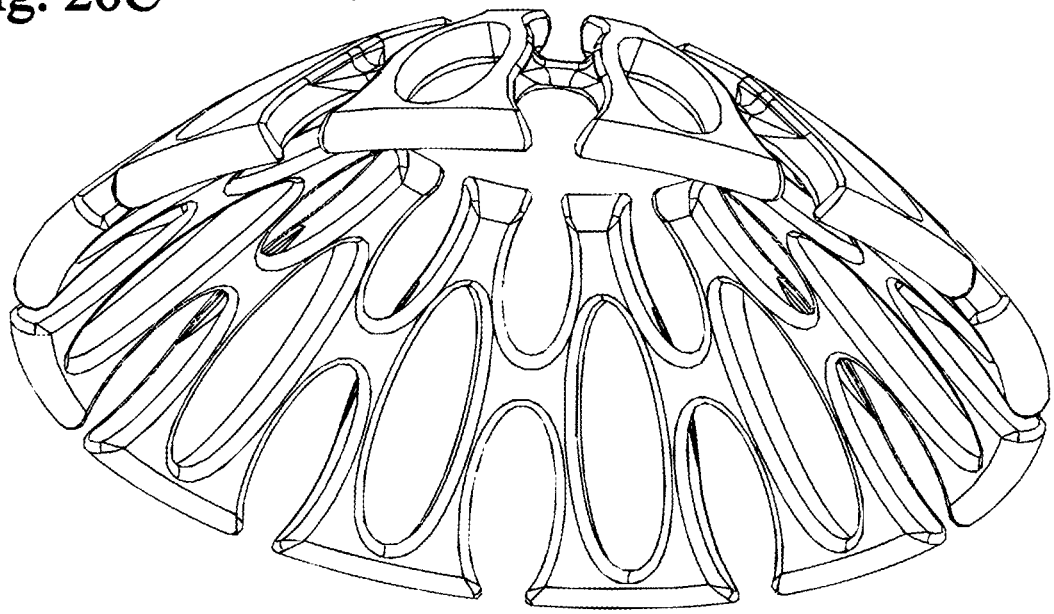
FIG. 26C is a perspective view from below of the web structure of FIG. 26A.
Figure 26D:
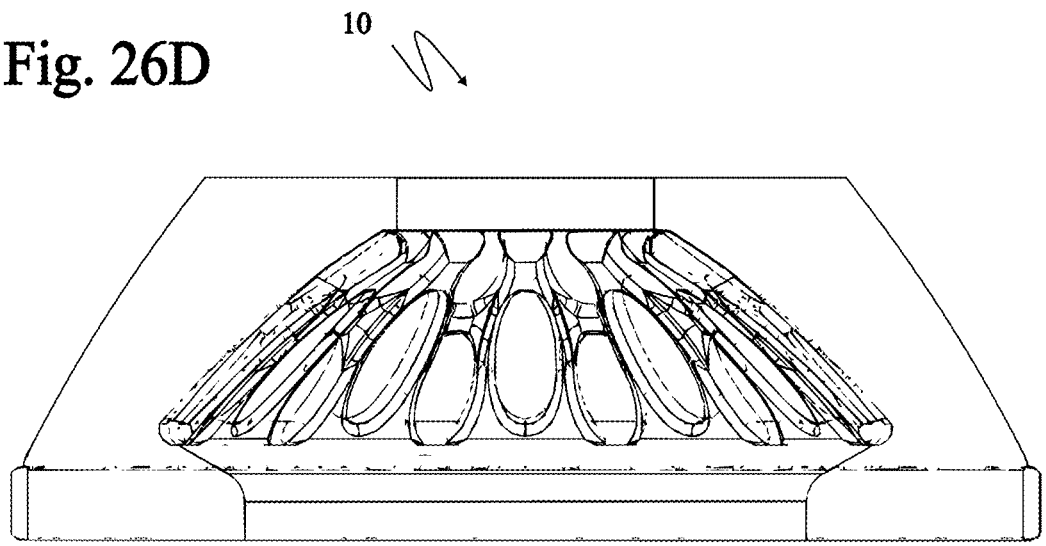
FIG. 26D is a front cross-section view of a midsole device according to an embodiment comprising a foam apex insert.
Figure 35:
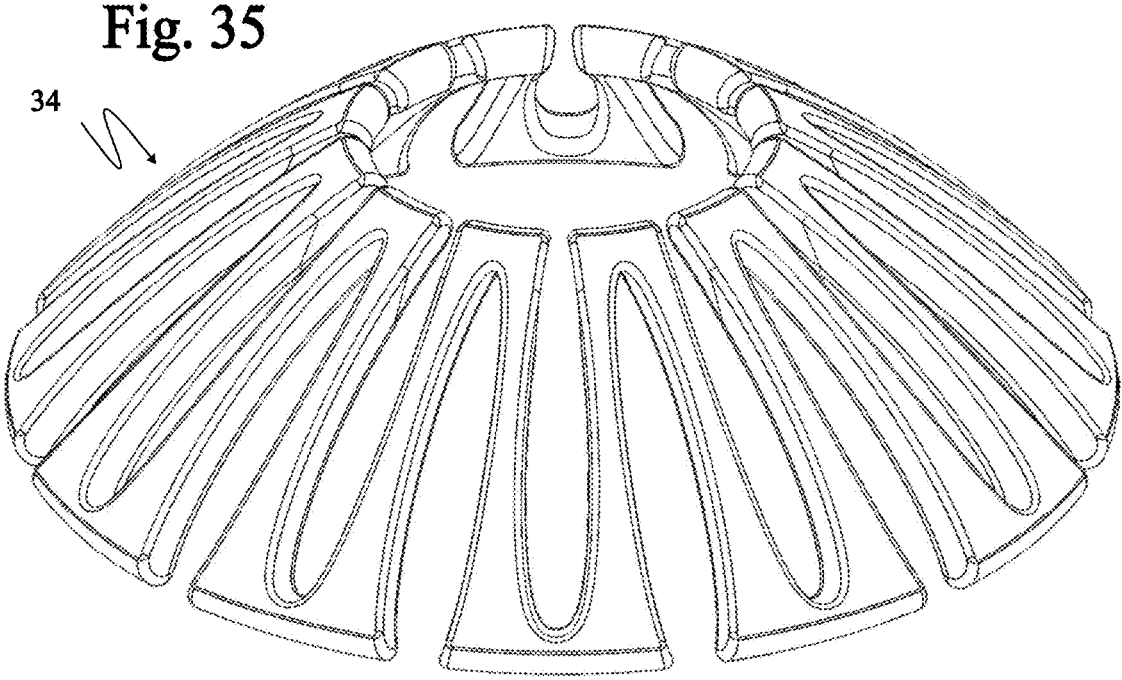
FIG. 35 is a perspective view of a web structure comprising radial fingers with the fingers bridged at the inner diameter and the outer diameter in an alternating pattern.

In the cross section of the web in FIG. 26B, a first somewhat radial/diagonal finger is connected together at the top/ID to a second adjacent finger to one side of said first finger but not the other side of said first finger. The bottom of said first finger is also connected to an adjacent finger to one side but not the other. In this non-limiting example, every second finger is attached by a circumferential bridge structure to every third finger at a different radial/diagonal position such that the fingers can bend and twist during vertical compression of the web in a way that provides minimal resistance of the web to vertical compression. An exemplary representation of such a web structure is illustrated in FIG. 35. The result is a web structure which does not add a high level of spring force to the conical foam disk except by virtue of the radial forces which are transferred to the foam through the additional strain on the foam which is caused by the web.

It has been shown by experimentation that when the fingers (AKA spokes) of the web are thick enough to provide the required performance enhancement to the conical foam dome, the bridge members, if they are the same thickness of the fingers, become too stiff to allow flattening of the web without adding to much spring force to the conical foam disk part way through the travel. Circumferential bridge features may therefore be radially thinner than the adjacent conically/radially extending fingers. This thinner section allows the web to flatten with less force while still maintaining the radial/conical stiffness of the finger members.

Many different web geometries are possible and anticipated by the inventors. Structural principles that have been determined to be beneficial, are higher stiffness in the radial/conical direction and lower stiffness in the circumferential direction. An interrupted ID and OD of the web are also beneficial to allow the disk to flatten without exceeding a desired stress threshold in the web material. The web is preferably of a stiffer material than the foam dome material.

Stack Height

In a non-limiting exemplary embodiment, the conical foam disk has a total height of 35 mm.

The maximum legal stack height for a racing shoe in 2024 under some jurisdictions is 40 mm. This leaves 5 mm of material for the upper and the outsole, which may be considered to be quite thin for these two components combined.

Figure 26E:
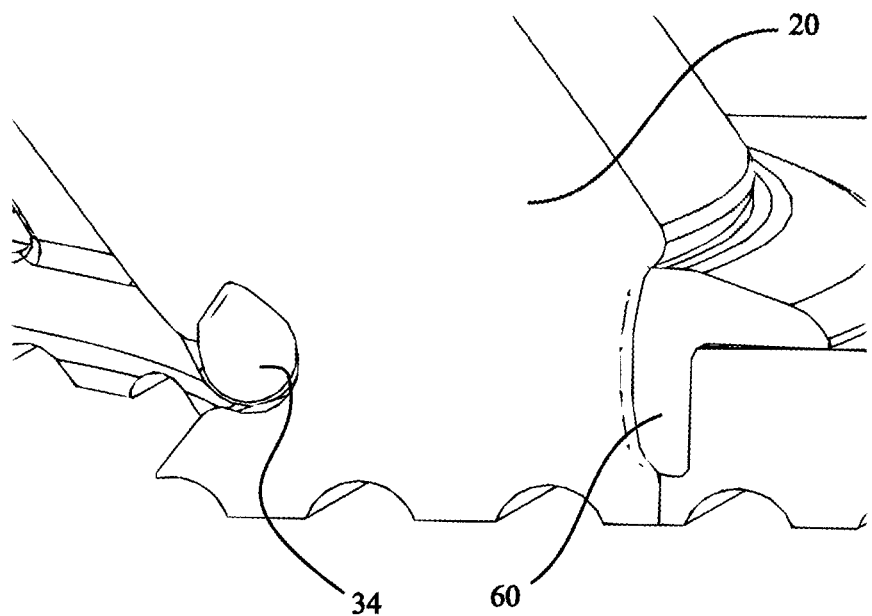
FIG. 26E shows a magnified view of the bottom edge of a foam domed disk comprising a guide support structure and a ring spring with a downward extending flange.

To account for this, FIGS. 25E and 26E show the lower 2 to 5 mm or more of the device protruding into the outsole. The lower surface of the device may even contact the ground and may also be coated with a non-wearing material similar to the rest of the outsole.

Figure 22:
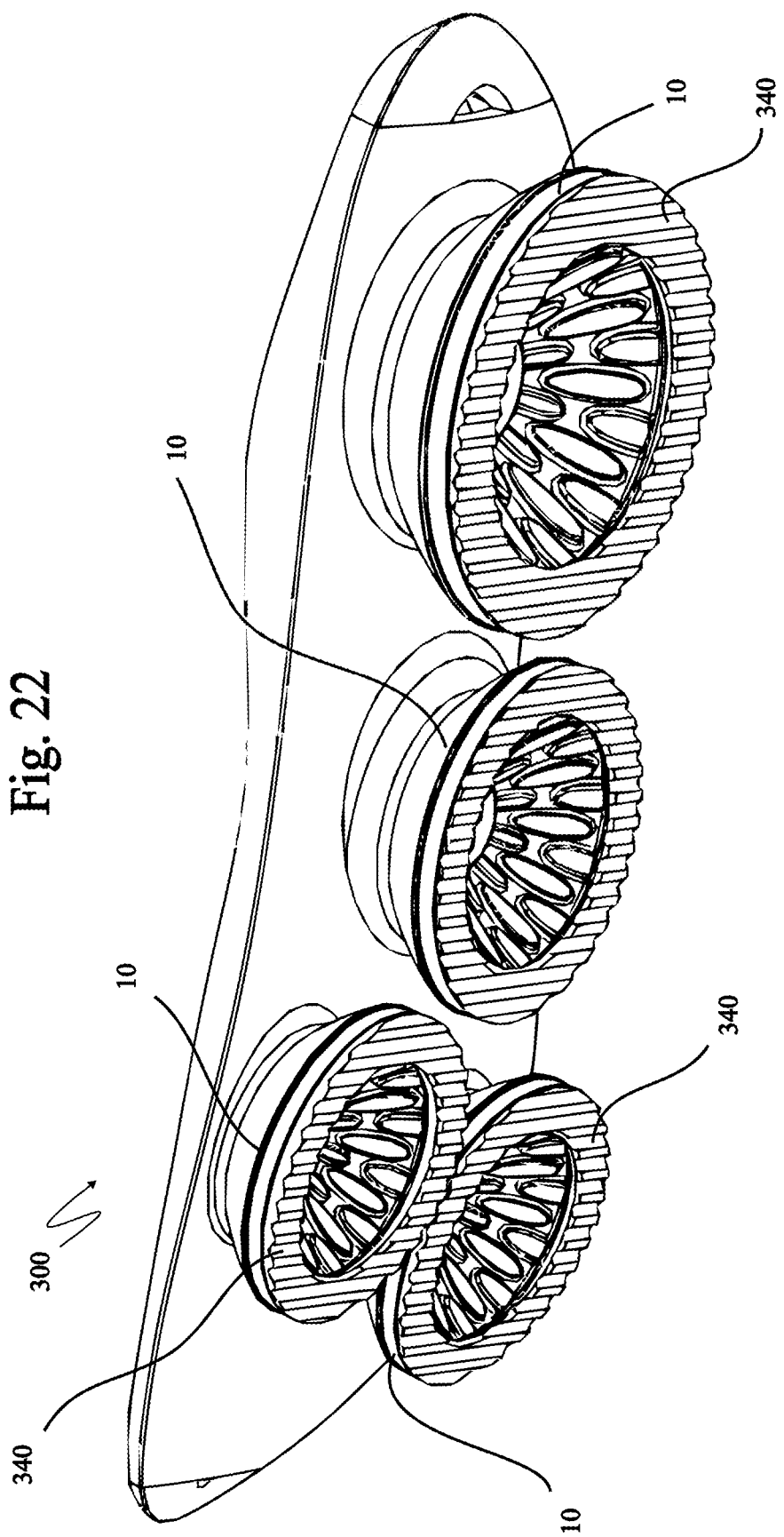
FIG. 22 is a bottom perspective view of midsole devices projecting down from a midsole according to an embodiment.

FIG. 22 shows a partially disassembled outsole to show the domes and low ground contacting surface.

The ring spring may or may not be used and it, if used, it may be considered advantageous to create a flange on the ring spring as shown in FIG. 26E, which can be used to provide additional surface area for adhering the dome to the outsole as shown in the image below.

In this case, it is considered advantageous to achieve some performance characteristics, to provide a ring of material on the top of the outsole and around the OD of the bottom of the dome. This ring may also include a cylindrical feature, which captures more of the dome material above and/or below the flat ring.

The dome or domes may be manufactured as one piece with the outsole, as shown in FIGS. 17A and 17B.

Airflow.

If the bottom surface of the dome contacts the ground, it may be important, in some embodiments, to provide airflow channels, so air can be discharged and drawn back into the device with minimal or a predetermined resistance.

In a non-limiting exemplary embodiment, grooves, channels, or pockets 340, as illustrated for example in FIG. 22, are shown in the bottom of the dome, which communicate with grooves or channels or pockets in the outsole which are open to atmosphere around the ground contact of the outsole, as illustrated for example in FIGS. 21A-21D, to provide an air flow path to and from atmosphere during compression and rebound of the device In embodiment, one or more airflow channels are provided above the outsole on the conical dome to allow air or water, etc. to be discharged from the dome during compression and for air to be drawn back into the dome during expansion.

All of these measures provide that a suction cup effect is not created under some conditions.

Figure 39:
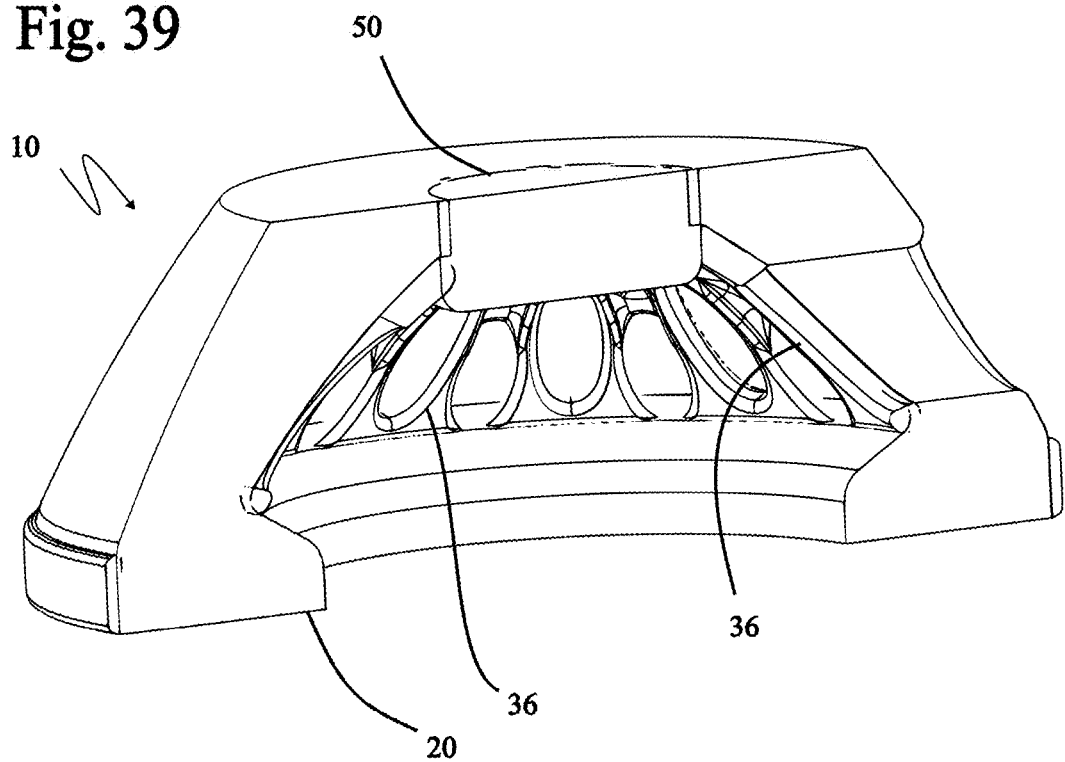
FIG. 39 is a perspective cross-section view of a midsole device comprising a foam apex insert.
Figure 40:
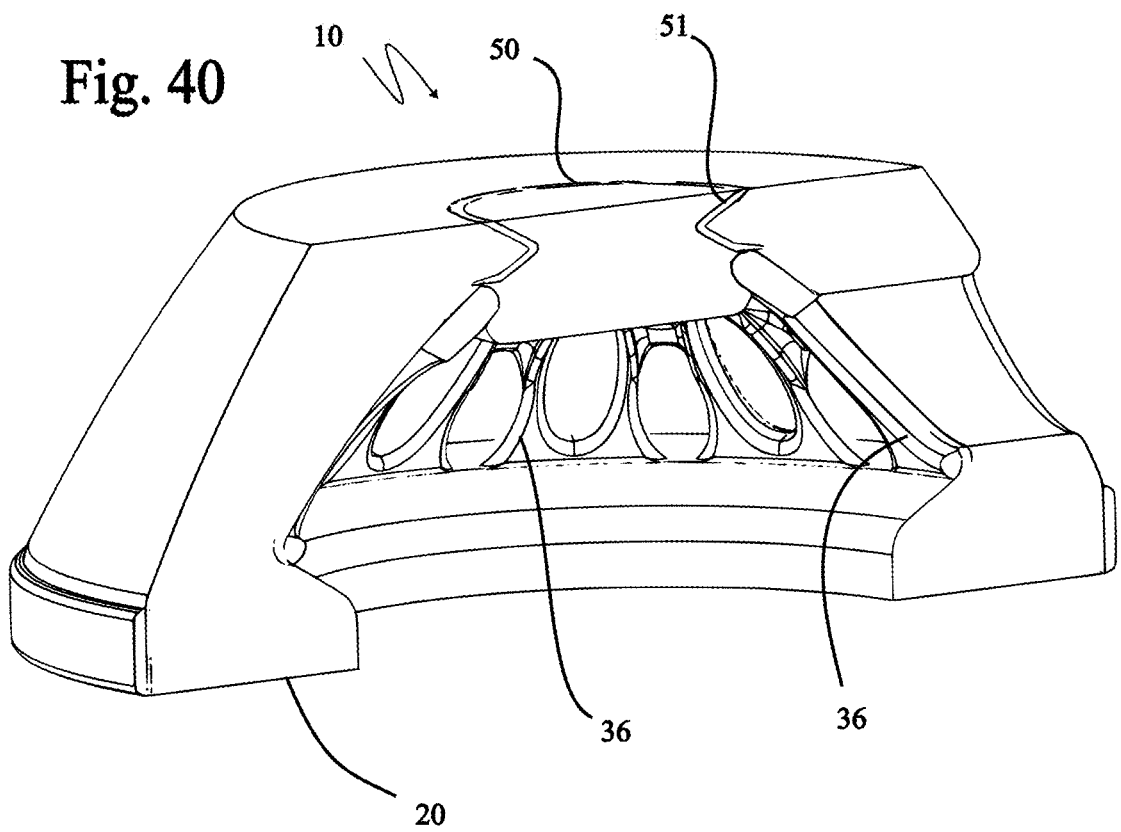
FIG. 40 is a perspective cross-section view of a midsole device comprising an accordion-shaped ring around a foam apex insert.

Also shown in FIGS. 1 and 2 is a variation on the compressible foam insert at the apex of the dome and web. This insert 50 may be of the same or different foam than the dome 20 and may be a separate component as shown, or contiguous with the dome 20. This apex insert 50 provides resistance to the ID tips of the web fingers from moving radially inward, while still allowing them to move inward enough (as a result of the radially inward compression of the foam insert), to reduce the maximum stress on the foam dome at the opposite and outer ends of the radial/conical fingers. Two further embodiments illustrating a foam apex insert 50 are illustrated in FIGS. 39 and 40. In FIG. 39, foam apex insert 50 may comprise the same, or higher or lower durometer foam than foam material of domed disk 20, or may be of a different material. In FIG. 40, foam apex insert 50 comprises an accordion shaped ring 51 around apex insert 50. An accordion shaped ring (or comparable structure) may compress vertically with minimal force while maintaining desired radial stiffness and, therefore, allow a lower durometer apex insert 50 to be used for more comfortable bottom out performance.

Check Valve

Figure 27A:
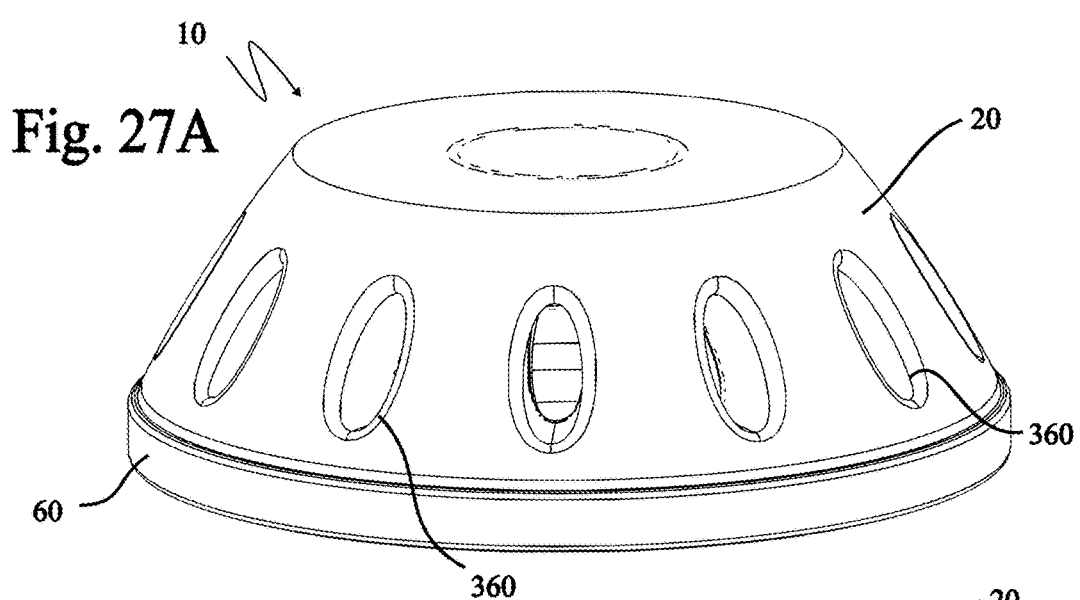
FIG. 27A is a perspective view of a midsole device according to an embodiment comprising a plurality of air discharge ports.
Figure 27B:
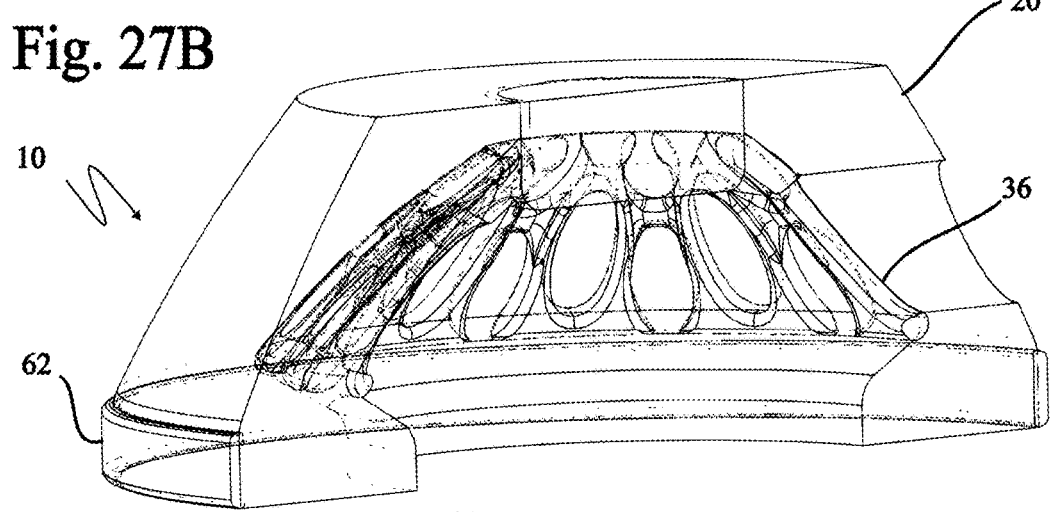
FIG. 27B is a cross-section view of a midsole device according to an embodiment comprising air discharge ports.
Figure 27C:
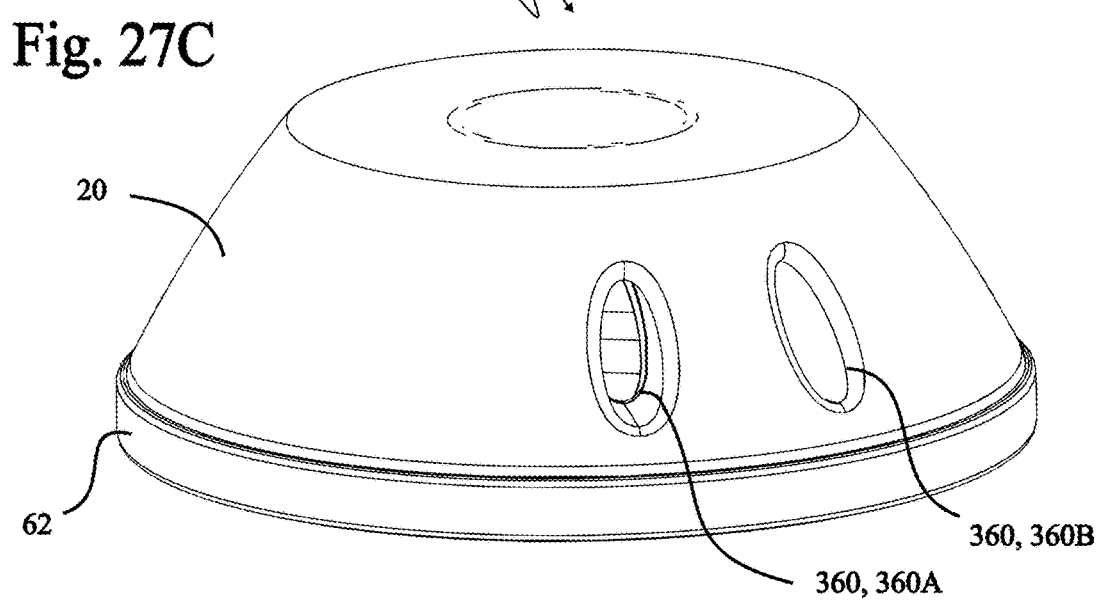
FIG. 27C is a perspective view of a midsole device according to an embodiment comprising an open air discharge port and a one-way check valve port.
Figure 27D:
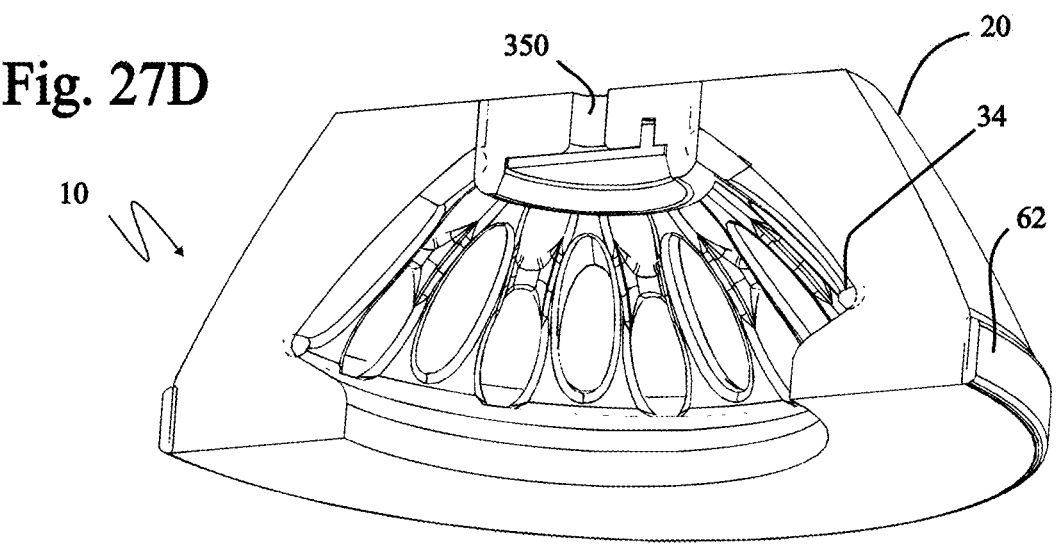
FIG. 27D is a perspective cross-section view of a midsole device according to an embodiment comprising a top one-way check valve in an apex insert.
Figure 27E:
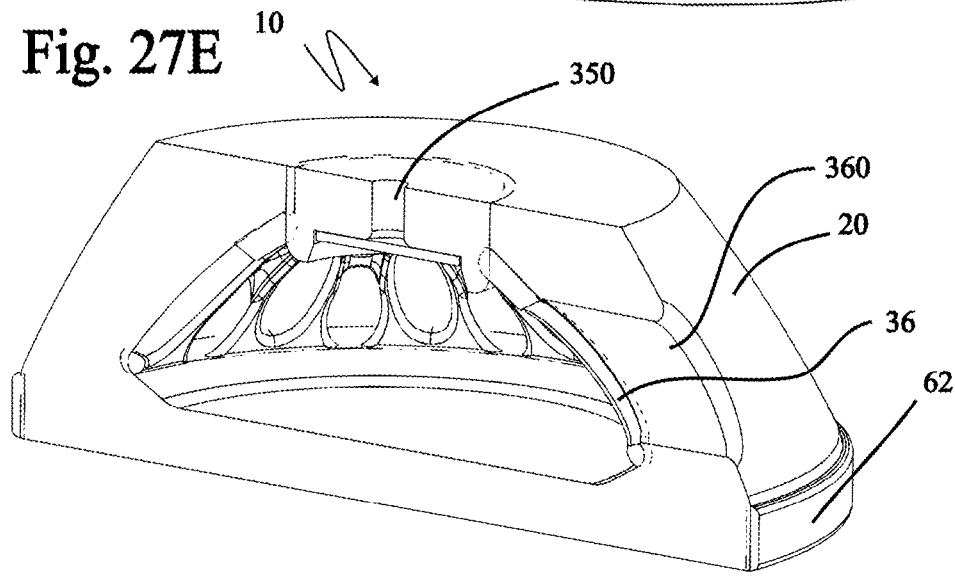
FIG. 27E is a perspective cross-section view of a midsole device according to an embodiment comprising a top valve and one or more air discharge ports 360.
Figure 27F:
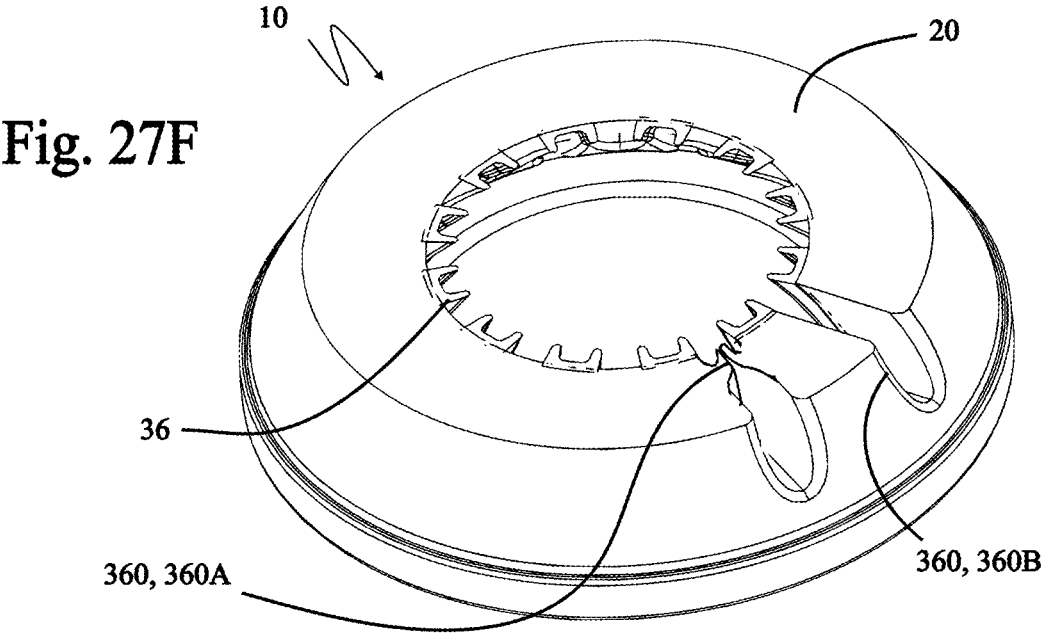
FIG. 27F is a perspective horizontal cross-section view of a midsole device according to an embodiment comprising a one-way check valve port and a non-occluding air discharge port.

The airflow channel or channels in FIGS. 27E and 27F may also be provided with means to achieve greater airflow restriction during compression than during rebound.

This includes a complete or partial occlusion of one or more airflow channels during compression such that an air damper is created.

In a non-limiting exemplary embodiment, airflow out of the cone volume is restricted during compression. During expansion of the cone, airflow is allowed into the cone for example through a one-way check valve 350 at the apex of the cone from the inside of the upper. This will promote one-way flow of air to cool the user's foot without drawing in water or dirt from the ground. In this case, it is desirable to have one or more air discharge ports 360 in the wall of the conical dome. These can be constructed with an inserted, one-way check valve 360A, or may simply be openings shaped with a sealing interface and optionally a taper which seals during compression and unseals during expansion due to the deformation of the dome and or the differential air pressure.

If one or more of these openings are situated at the back of the dome, they can be shaped to collapse as a result of the heel strike deformation and restrict airflow when the back of the dome is compressed. As the user's heel rolls off of the back of the dome toward the forefoot, the shape of the back of the dome changes such that the openings open again, and airflow with or without minor restriction is allowed back into the dome.

It may be preferable for some applications, to have a separate, non-occluding air inlet and discharge port 360B. The purpose of this non-occluding airflow chamber is to provide a controllable and even adjustable (with some adjustment means by the user) discharge flow restriction that is not affected by the occluding valve or valves or opening or openings during compression. This allows for a controlled air damper during compression without requiring significant damping of the expansion of the disk due to the non-restricted airflow back into the dome from the valve or valves or opening or openings.

The volume inside the dome can be constructed to provide a small enough final volume that any water that could be drawn into the dome through the slots will be forced out mechanically through positive displacement and/or via the high flow rate of air exiting the dome. Airflow restriction in and out of the dome may be controlled by passive valves such as restriction valves and one-way check valves. Airflow restriction in and out of the dome may be controlled by active valves or restriction means such as a miniature electronic proportional valve such as but not limited to a MEMS device or a piezoelectric valve that can be controlled and adjusted by a CPU with inputs from an algorithm and/or the user.

Geometries

Several different geometrical definitions of various embodiments of a midsole device are described here, including methods of characterizing if a particular geometry is within a range of geometries to provide a significant portion of one or more performance benefits of the device.

Design of Experiments (DOE)

Figure 28:
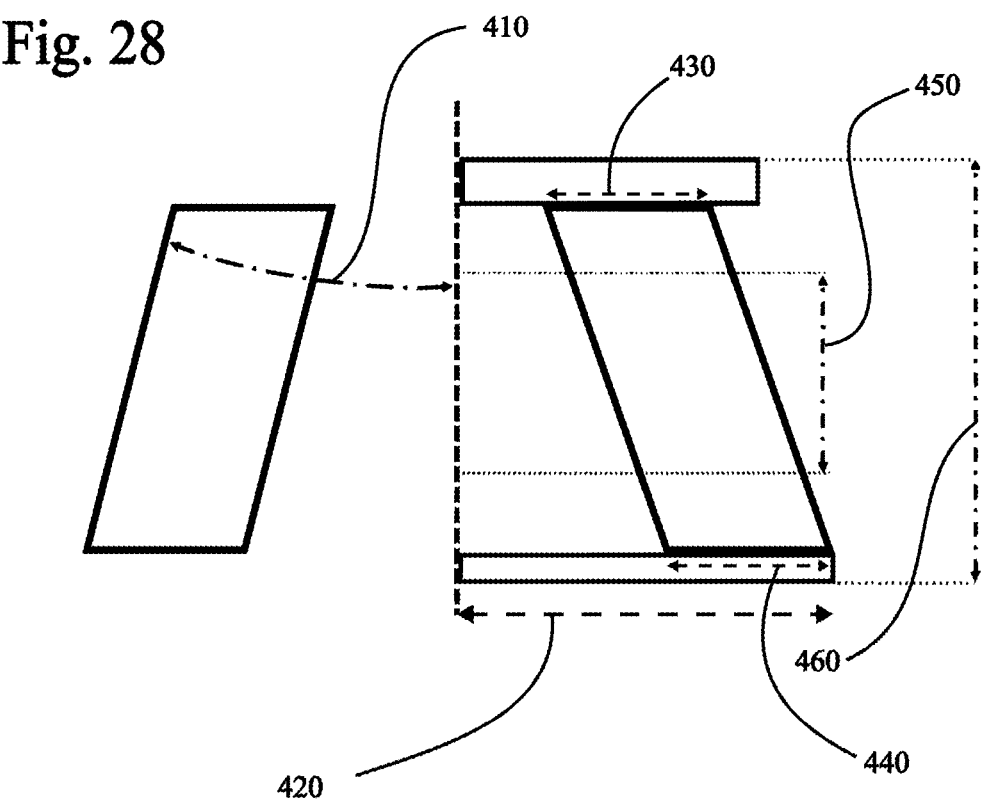
FIG. 28 is a schematic illustration of a simplified representation of a dome disk illustrating geometric variables that may characterize embodiments of a domed disk structure.

A DOE was used to determine the range of geometries which provide one or more of the benefits of midsole device embodiments. The DOE used various geometries of midsole devices to evaluate how different geometry features contribute to different performance metrics. The DOE used statistical methods to evaluate the effects and interactions of geometric features on selected performance metrics. The following geometric variables are applicable to various configurations of a foam domed structure: outer angle; maximum width from centerline; top wall thickness percentage of the max width; bottom wall thickness percentage of the max width; material stiffness scaling; functional height; and aspect ratio. A definition for each of these geometric variables is provided here for the case of a midsole device 10 comprising a foam domed disk. Various geometric parameters for are illustrated schematically for a foam domed disk in FIG. 28. In some variations of a midsole device which comprise different shapes and configurations for the foam structure, there may be corresponding variations upon the applicable geometric features and geometric variables: for example, a foam domed disc 20 with a curved exterior surface 30 may require a corresponding modified definition of the outer angle.

The outer angle 410 may be defined as the angle defined between the exterior surface 30 and the vertical centerline of the foam domed disk 20 of the midsole device 10. The maximum width 420 from centerline may be measured at the widest point of the hollow structure, perpendicular to the centerline. If the dome is a non-round shape, an average radius should be taken circumferentially at each height and the maximum average radius will be taken as the maximum width from centerline. The maximum width is held constant in this exemplary DOE and used as a scaling factor for the other variables to express them in dimensionless terms. Top wall thickness percentage of the maximum width is calculated from the top wall thickness 430 at the top of the midsole device expressed as a percentage of the maximum width from centerline. Bottom wall thickness percentage of the maximum width is calculated from the bottom wall thickness 440 at the bottom of the midsole device expressed as a percentage of the maximum width from centerline. Material stiffness scaling is calculated as a scaled stiffness of an exemplary material such as, but not limited to, a Pebax foam with a durometer of approximately 35 Shore C. Functional height 450 was measured as 50% of the midsole device height 460 in which the midsole device height 460 is the separation between the lowest point of the outsole and the foot-receiving surface inside the upper. Aspect ratio is defined as the ratio of the functional height of the structure divided by the maximum width from centerline.

Each geometry specified in the DOE and described by the parameters above was modeled in a computer-aided design (CAD) program and imported into a finite element analysis (FEA) program. The FEA used a thin 2D cross-section with axisymmetric constraints to model the deformation behavior of the geometry as it was compressed by a rigid upper piece to measure the reaction forces. A target of 1100 N of reaction force was used.

Some performance metrics that were used for evaluation included: propulsive energy percentage of total energy return; slope of the curve at the inflection point; absolute energy return for a given force; absolute energy return for a given travel; travel for a given force; force at various points of the force displacement curve. Propulsive energy percentage of total energy return is the percentage of energy return that serves to propel the user forward at midstride. Midstride is approximately: (1) the point at which the center of mass of the user crosses the ankle after which energy returned by the device would contribute to propelling the user forward and (2) the point where the center of mass of the user reaches its lowest vertical point and begins moving upwards, after which energy returned by the device reduces the energy required by the user to move their center of mass upward.

These performance metrics were chosen as they reflect some critical metrics when evaluating shoe performance. The geometry variables were chosen as they were shown to provide the biggest effect to performance through testing. This combination of attributes can fully define the form of the device assuming a given max width.

The DOE takes a given range of geometries and specifies a series of experiments to conduct with various combination of the geometry. A response surface methodology (RSM) was used for defining the experiments and subsequent analysis. An RSM accounts for non-linear relationships between the geometry attributes and the performance metrics. Each of the following variables were varied through the ranges set out here. The outer angle was tested from a low of 1° to a maximum of 49°. The top wall thickness percentage of the max width was tested from 18% to 42%. The bottom wall thickness percentage of the max width was tested from 18% to 42%. Material stiffness scaling was tested from 0.5 to 1.5. Aspect ratio was tested from 0.46 to 0.94.

Key Geometry Parameters

In the DOE analysis, three geometric parameters were identified as having a statistically significant impact on the performance metrics: outer angle, bottom wall thickness percentage of the max width, and aspect ratio. Of these three parameters, bottom wall thickness only has a limited range of possible values as it is constrained by the angle and aspect ratio, and can be determined as a last step through FEA analysis or experimentation. Two geometric parameters identified by the DOE that can be used to define the regions of benefit of the device are therefore the aspect ratio and outer angle. Other parameters may also be used, and the significance of parameters will depend on the parameters studied.

Propulsive Energy

One of the key benefits of some embodiments of this device is that the geometry results in more of the energy return being delivered later in the user's stride. This is a benefit as then a portion of the energy return acts on the user to propel them forward instead of pushing them backwards. For example, the propulsive energy portion of total energy return may be greater than 30%, 35%, 40%, 45% or 50%. When this occurs, the majority or at least a significant portion of the energy return of the device is used to propel the user forward. By comparison, for a simple spring following Hooke's law, and stipulating a propulsive energy threshold of 50% of the max force as discussed below, would have a propulsive energy return of 25%.

Experimentation has shown that for a device that can compress approximately 70% of its total height when the user actuates with their heel, the propulsive energy threshold is believed, by the inventors, to occur when the force drops to about 50% of the max force of the compressed state. The propulsive energy threshold will vary based on the weight of the user and the size of the device and is not limited to specific compression ratios. While the definition provided here has proven to be a useful tool for helping to quantify the relative benefit of different geometries, it should be regarded as an indicator for which geometry ranges offer the most benefit, rather than an absolute measurement. The FEA analysis was further validated by comparing against force-displacement curves gathered during laboratory testing, giving the inventors confidence in the results.

Figure 29:
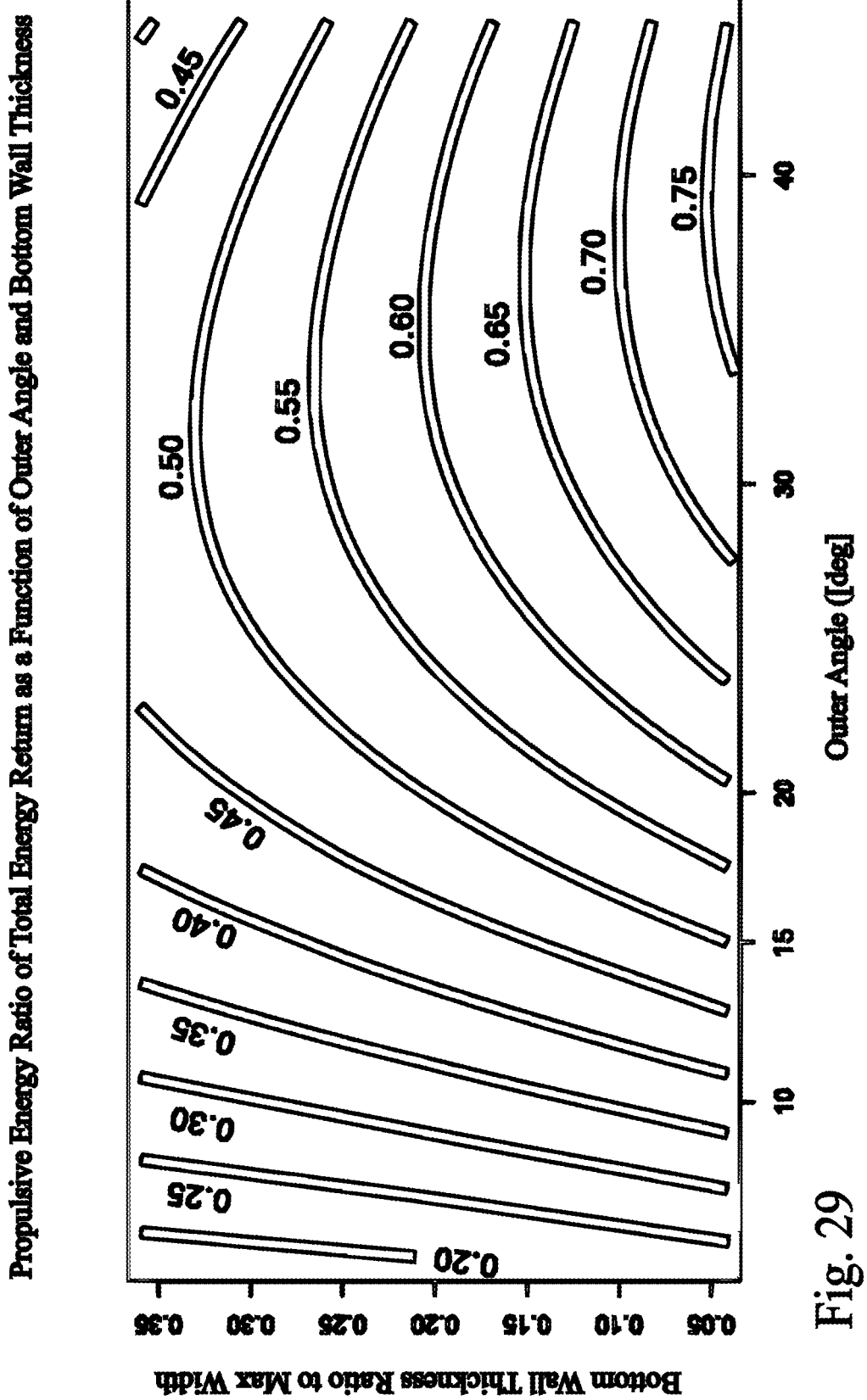
FIG. 29 is a graph of estimated propulsive energy ratio of total energy return as a function of outer angle and bottom wall thickness according to an embodiment.

FIG. 29 is a contour plot created from the results of the DOE showing the propulsive energy percentage of total energy return as a function of the outer angle and bottom section wall thickness percentage of the max width. These 2 variables were determined to have a statistically significant effect on the propulsive energy percentage in the DOE.

As can be seen in the contour plot, the technology crosses the 0.50 ratio of propulsive energy to total energy above 15° outer angle and various bottom wall thicknesses. A >15° outer angle may serve as the minimum outer angle for some embodiments for this aspect ratio because at this point the device has greater than 50% of its total energy return propelling the user forward. However, other target percentages of propulsive energy returned propelling the user forward may be used.

Figure 43A:
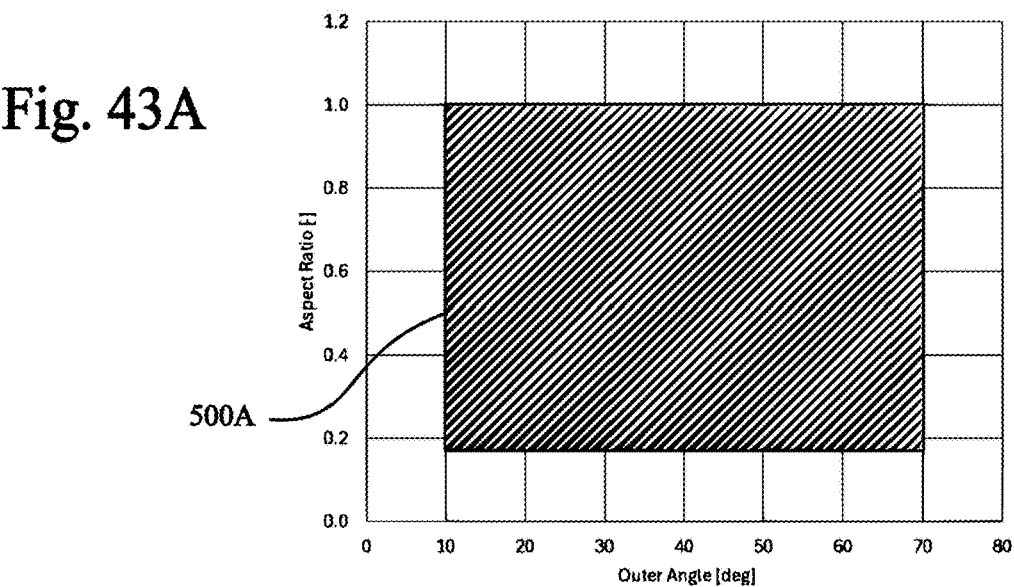
FIG. 43A is a chart illustrating a region defined by desirable ranges of outer angles and aspect ratios.

As previously described, the primary geometric parameters affecting the performance of a device are its outer angle and aspect ratio. Therefore, the combination of accepted values for these parameters can best be described in a plot showing aspect ratio against outer angle. Due to practical considerations, the outer angle of the device must be above 10° and the aspect ratio must be below 1.0, as values outside these limits can compromise the device's stability. Further, the outer angle of the device must be below 70° and the aspect ratio must be above 0.17, as values outside these limits can result in devices which fail to exhibit one or more of the described benefits. Accordingly, the acceptable values of these two parameters can be plotted as shown in FIG. 43A. The shaded region 500A represents the region defined by having an outer angle greater than 10° and less than 70° and having an aspect ratio greater than 0.17 and less than 1.0.

Figure 43B:
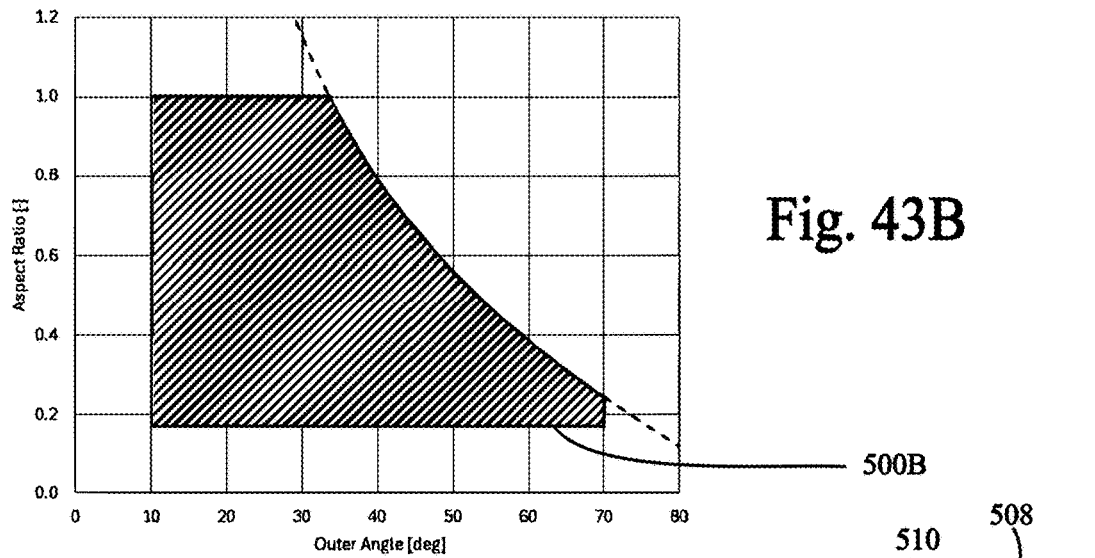
FIG. 43B is the chart of FIG. 43A excluding a set of outer angles and aspect ratios representing implausible geometries.
Figure 43C:
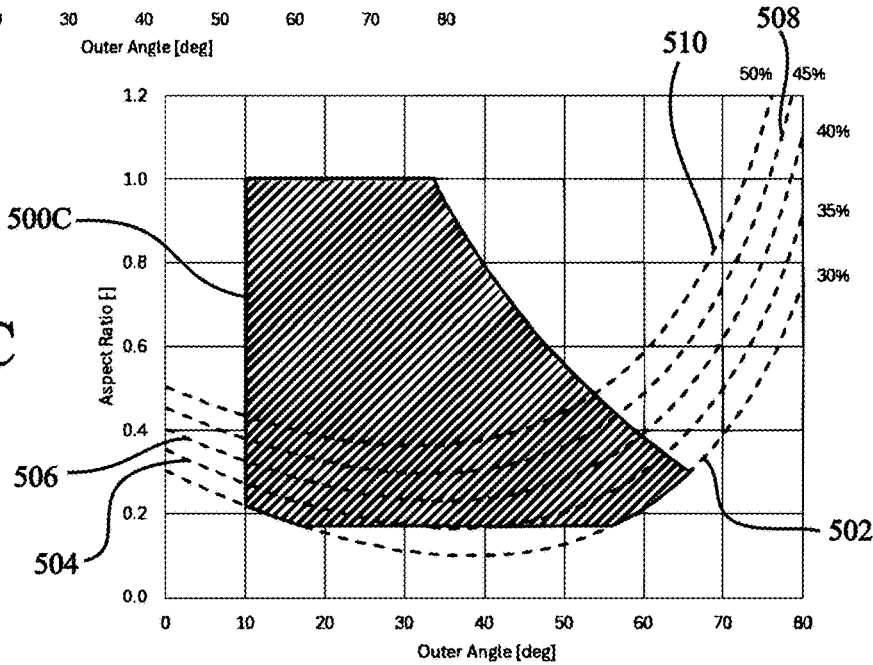
FIG. 43C is the chart of FIG. 43B further excluding outer angles and aspect ratios exhibiting an estimated Propulsive Energy Percentage (PEP) of less than 30%.

However, certain combinations of these parameters result in negative widths of critical components and as such are geometrically impossible. Removing the affected area yields the updated plot shown in FIG. 43B. The shaded region 500B represents the remaining acceptable values after the exclusion of implausible geometries from the shaded region 500A. Additionally, other combinations of these parameters do not produce geometries which provide the desired performance, as measured by the Propulsive Energy Percentage (PEP)/Propulsive Energy Ratio (PER) metric previously described. Further limiting the space to those parameter sets which produce greater than 30/35/40/45/50% PEP results in the plot shown in FIG. 43C. Shaded region 500C represents the remaining portion of shaded region 500B after the exclusion of the parameter space which produces less than 30% PEP, i.e., falling below the 30% PEP line 502. Further limited regions could be defined by: excluding parameters which produce less than 35% PEP, i.e. falling below the 35% PEP line 504; excluding parameters which produce less than 40% PEP, i.e. falling below the 40% PEP line 506; excluding parameters which produce less than 45% PEP, i.e. falling below the 45% PEP line 508; and excluding parameters which produce less than 50% PEP, i.e. falling below the 50% PEP line 510.

The contours shown are defined by the following equation, derived using a parametric model developed from the results of FEA:

$$R = 5.5877 - 0.039980 - \sqrt{0.00011530\theta^2 - 0.32460\theta + 31.0415 - 0.0960/T_{PEP}},$$

where R represents the aspect ratio, θ represents the outer angle, and $T_{PEP}$ represents the PEP which the contour describes. Note that the final area depicted does not define the limits imposed on the parameters in the claims but instead serves to indicate the extent of what geometries may be considered viable and desirable according to some embodiments.

Figure 30:
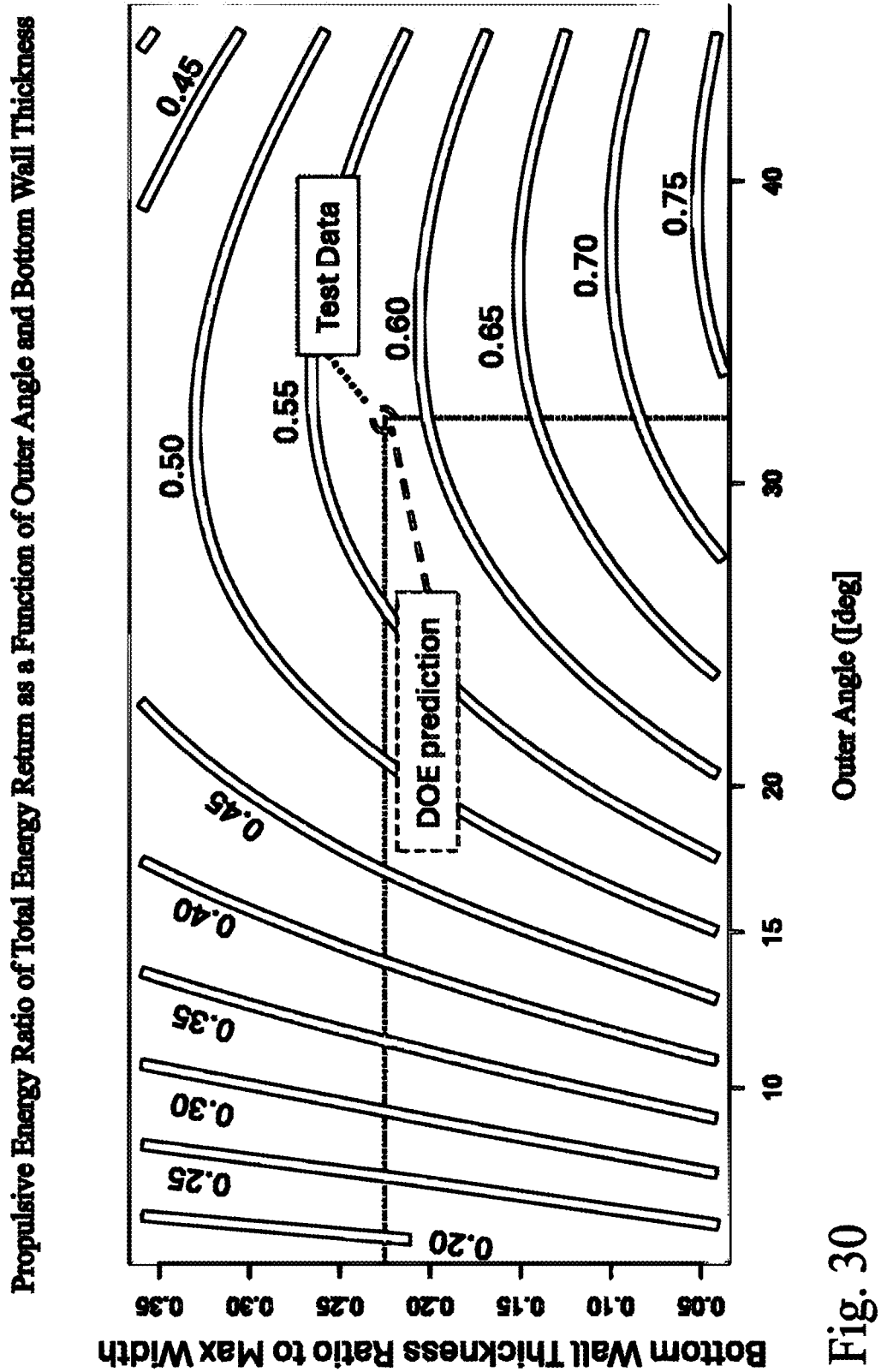
FIG. 30 is a graph of estimated propulsive energy ratio of total energy return as a function of outer angle and bottom wall thickness according to an embodiment.

The DOE predictions were further validated by conducting tests of a sample and measuring force as a function of displacement on a test bench and calculating the propulsive energy ratio of the total energy and superimposing on the contour plot above to compare with the DOE prediction, as shown in FIG. 30.

The outer circle in FIG. 30 shows the calculated test results that indicated a propulsive energy ratio of ~0.58 for a geometry with a 32° outer angle and 0.225 bottom wall thickness ratio. As can be seen the test data matches the DOE prediction denoted by the inner circle (~0.58). OUTER WALL ANGLE DEFINITION Many examples given here are for a circular or non-circular dome structure. Similar principles may be applied to a linear or curved section of a diagonal foam structure. Assuming a flexible/compressible resilient foam dome structure, the outer angle is one of the key parameters for certain approaches of defining some geometries and some embodiments that achieve benefits of the present device. If a vertical cross section does not include a straight section of wall to measure the angle, an averaging method is described below under the heading "determining a simplified structural representation"; if a vertical cross section includes extraneous features or additional lower durometer foam, such as for aesthetic purposes, an approach to determining an equivalent angle of single durometer foam is described below under the same heading. One or more of these approaches may be used to identify if a device is within the claimed range of this disclosure, and a geometry and construction is considered to be within the range of this disclosure if it is described by at least one of these approaches. A typical shoe construction requires an upper to receive the user's foot, a midsole and an outsole to interface with and grip the ground. The upper and outsole may have a wide range of constructions and use a wide range of materials; to keep these components from complicating these approaches the vertically measured center 50% of the device may be used for one or more of the approaches of determining if a geometry is within the range of geometries disclosed here. These approaches are guidelines that anticipate variations to the device which will still result in a functionally equivalent design. Many other variations are anticipated by the inventors such as holes or fins or textured surfaces or straight or spiraled slots that may or may not have a significant effect on the performance and that may or may not put a geometry inside the range of geometries disclosed here. Persons skilled in the art will be able to determine if variations not specifically listed here create a device with the functional equivalence of the range of midsole geometries and constructions disclosed here.

Non-Interfering Collapsing Geometry

Another possible consideration, which may be used instead of, or in addition to, the outer angle consideration, is the degree to which the diagonal wall structure is free to collapse vertically downward. In an embodiment, the diagonal wall structure is free to collapse vertically downward without interference with another adjacent diagonal structure, for 80% or more, 70% or more, 60% or more, 50% or more, 40% or more, 30% or more, 20% or more, 10% or more of its vertical travel. In some embodiments a portion of the foam structure wholly forming, or including at least parts of, 80% or more, 70% or more, 60% or more, 50% or more, 40% or more, 30% or more, 20% or more, 10% or more of a height of the foam structure vertically overlaps the cavity.

Determining a Simplified Structural Representation

Assuming a flexible/compressible resilient foam domed disk such as a hollow frustum structure, the outer angle is a critical consideration used in defining embodiments achieving one or more benefits of the present device. It is anticipated by the inventors that variations to the outer wall shape are possible such as holes or fins or ribs or grooves or the addition of lower durometer compressible material, for example. The hollow frustum may also be irregularly shaped (such as but not limited to, non-round, faceted etc.) without a single consistent cross-section. An exemplary approach to characterizing a simplified structural representation is illustrated in FIGS. 31A-31C.

To compute the outer angle ($\theta_{eff}$) of an embodiment possessing both primary 470 and secondary 474 materials or having an irregular shape, the following is an example of a process that may be applied to generate a simplified structural representation (SSR) resembling a hollow conical frustum. The outer angle is given by the SSR's conic half angle.

Truncate the device (an actual device or, for example, a CAD model of the device) by removing the top and bottom 25% by height, yielding the central region 474 with half the height of the original device. The height of the device is defined as the distance between the lowest point of the outsole and the foot-receiving surface inside the upper (under an insole if a removable insole is present) also referred to as the stack height, along the device's central vertical axis 476. This removes the complexity of accounting for the many possible variations in the outsole component and upper component and extracts the core geometry involved in deformation behavior. Identify the primary material, defined as the highest durometer compressible foam material which spans the full height of the truncated body, and remove all materials radially inward of it (this is to eliminate the effect of other foam materials inside the dome such as, but not limited to lower durometer damping foam). Extract a representative cross-section of the remaining body/s on a radial/axial vertical plane. For continuously rotationally symmetric devices, all cross-sections are equal by definition, so any radial vector can be used. For discretely rotationally symmetric devices, an average cross-section can be determined by someone skilled in the art of shoe design. Identify the angle ($\theta_i$) of each material's outer wall with respect to the vertical axis. If a material's outer wall is linear, this angle can be identified by inspection. If a material's outer wall is not linear, this angle must be calculated using a least squares regression. The surface must be discretized using a sufficient number of points to capture all major features. The points must be distributed equally along the vertical axis, NOT along the path length of the surface. Identify the average radial width ($w_i$), height ($h_i$), and durometer ($d_i$) of each material. For materials which do not span the full height of the truncated body, only compute the average radial width across the material's actual height. Calculate the effective angle of the structure as the weighted average of each material, according to the following equation:

$$\theta_{eff} = \frac{\sum(\theta_i w_i h_i d_i)}{\sum w_i h_i d_i}$$

Calculate the effective width of the structure as the weighted sum of each material, according to the following equation:

$$w_{eff} = \frac{\sum(w_i h_i d_i)}{h_{ref} d_{ref}},$$

where $h_{ref}$ and $d_{ref}$ represent the height of the truncated body and durometer of the primary material, respectively. Construct a trapezoid whose inner wall is described by the inner wall of the primary material and whose outer wall is described by the effective angle and width calculated above. The effective width should be applied at half the truncated body's height, such that the resultant trapezoid yields an average radial width equal to the effective width.

Revolve the trapezoid about the central vertical axis to produce the device's SSR.

The outer angle of the SSR is used in the DOE to determine the useful range of geometries which produce one or more benefits of the device.

After the outer wall angle is determined, the inner wall angle can be determined by FEA or experimentation.

If a device has an outer wall angle when at rest of 15 degrees or less from vertical, the structure is unlikely to provide a high level of lateral shear stability which is preferred for comfort and performance on uneven terrain or when moving laterally, although it is believed by the inventors to be possible to provide lateral shear stability by another means, so that an outer wall angle of less than 15 degrees from vertical may be usable for some applications.

With the above in mind, the device is shown to provide the most benefit at an outer wall angle from vertical of >10°, >11°, >12°, >13°, 14°, >15°, >16°, >17°, >18°, >19°, >20°, >21°, >22°, >23°, >24°, >25°, >26°, >27°, >28°, >29°, >30°, >31°, >32°, >33°, >34°, >35°, >36°, >37°, >38°, >39°, >40°, >41°, >42°, >43°, >44°, >45°, >46°, >47°, >48°, >49°, >50°, >51°, >52°, >53°, >54°, >55° measured over 40% or more, 50% or more, 60% or more.

S-Curve Deformation

In another way of defining examples of geometries that conform to the principle of the device disclosed here, an existing shoe or shoe CAD design is cross sectioned with a vertical plane such as, for a heel device a plane that crosses the center of a user's heel position. This cross section is then further split across its symmetry line/central axis. A straight line can be plotted in-between the inner and outer walls of the geometry, with the line angle selected such that the line acts as a bifurcation line between the inner and outer wall angles. The top and bottom 25% of the geometry is to be excluded when generating the line angle, but the line is to be extended until it contacts the bounding edges of the cross section which includes the top of the foot or insole receiving surface and the bottom of the outsole. In cases where the inner and outer walls are curved and/or otherwise non-straight, and perfect bifurcation is therefore unachievable, the midpoint of the bifurcation line should be determined first, with an angle selected to create as close to a bifurcation line as possible. FIG. 41A shows one example of this bifurcation line.

Two horizontal rigid plates extending beyond the bounds of the cross section are bonded to the body in the FEA program; with one bonded to the top face of the foam member, and the other to the base of the foam member. These bodies form surfaces that contact the deforming foam member at high compression. The top compression plate typically contacts the outer wall at high compression, while the bottom face contacts the inner wall as the device bottoms out. The diagonal foam member is then vertically compressed, or compressed in a height direction representing an actual likely direction of compression in use, to 70% of the member's total height while constraining the top compression face and bottom face of the foam structure to zero lateral motion, such as in the FEA program, and the deformation of the FEA nodes comprising the straight bifurcation line (if a CAD model) or actual points (if an actual device) are used to describe the resulting curve. Material line 480 in FIG. 41A represents either a straight bifurcation line (if a CAD model) or line between actual points (for an actual device). If an S-shaped curve in material line 480 results, and if that curve passes through a plane perpendicular to the height direction 3 times or more (as illustrated in FIGS. 41B and 41C), or crosses through a plane that is angled relative to the height direction in the cross section plane, a total of three times or more (steeper in this example means rotated clockwise) such as 1 to 2 deg, 2 to 3 deg, 3 to 4 deg, 4 to 5 deg, 5 to 6 deg, 6 to 7 deg, 7 to 8 deg, 8 to 9 deg, or 9 to 10 deg, 10 to 11 deg, 11 to 12 deg, 12 to 13 deg, 13 to 14 deg, 14 to 15 deg, 15 to 16 deg, 16 to 17 deg, 17 to 18 deg, 18 to 19 deg, 19 to 20 deg, the device is determined to be within the bounds of an embodiment of the present device. In FIG. 41C, exemplary lines are shown at 0 deg, as well as at +15 degrees and −15 degrees to clarify the angle range referred to above.

Note that while the original straight line may extend above the midsole through the bottom of the upper (not shown in FIG. 41A) and below the midsole to the bottom of the outsole (shown above) the S-shaped curve will cross the horizontal or angled line a minimum of three times within the midsole. This internal S-shaped curve is a beneficial feature in various embodiments of a midsole device. Embodiments with compression of a foam midsole producing this type of internal S curve, may provide increased compression travel for a given stack height. A conventional foam midsole that lacks the horizontal S-curve as described here, at full compression, might not provide the full delayed energy return which results from a reduced spring force or dramatically reduced spring rate part-way through the travel but may still provide other benefits such as high travel and lateral shear stability.

The inventors have found through FEA analysis and experimentation that many of the devices in the range of outer wall angles described here can be designed to exhibit this S-Shaped curve when compressed.

Extraneous Geometry

It is anticipated by the inventors that the principles of the device disclosed here may be realized with the use of complex geometry such as by creating a diagonal foam wall member with vertical or horizontal or diagonal grooves or features on the inner or outer surfaces, or by creating fins or flanges or other protrusions, or by creating a waved shaped inner or outer surface, or by any other additional material or removal of patterned or non-patterned material. In some cases, the cross section along a single vertical plane may not accurately represent the general construction of the diagonal member with regard to the performance characteristics it would provide. In such cases, the geometry can be represented by the average cross section of a linear or rotational array of planes with cross sections on each plane that are averaged together to reasonably represent the general construction of a section of a midsole diagonal foam structure. The number of arrayed planes and the spacing of the planes can be determined, by someone skilled in the art, to reasonably represent the characteristics of the midsole device structure with regard to the geometry of the device disclosed here. An example for a dome structure in the heel might be 10 planes spanning 180 degrees of a dome but more or less planes at greater or lesser angles may be used. An example for a more linear structure may be 10 planes spanning 40 mm along the length of a diagonal section but more or less planes at greater or lesser spacing may be used.

When an average geometry that someone skilled in the art would determine to be representative of the general structure, such as of the heel section of the midsole or the forefoot section of the midsole, any of the methods/ways of determining the geometry can be used to determine if a section of a shoe midsole falls within a range of geometries claimed for various embodiments.

Different embodiments may fall within the range of a different one or more of these ways of measurement without necessarily falling within the other(s). Different ways of determining the geometry of a device disclosed here are more suitable for specific embodiments of the device.

The invention claimed is:

1. An energy return device for a midsole of a shoe for absorbing and returning energy from compression of the device under a downward force applied from a typical wearer via an upper of the shoe over a range of travel extending in a height direction from the upper of the shoe in an uncompressed state towards an outsole of the shoe, the energy return device comprising:
   a resilient structure of compressible foam or matrix material supporting the upper in relation to the outsole, the resilient structure defining a cavity, the resilient structure defining an opening for air to enter the cavity or being permeable to air;
   the resilient structure being arranged to collapse, under the compression by the downward force applied to the upper by the typical user, into the cavity so that during a first part of the range of travel of the compression the structure deforms by bending of the resilient structure, the resilient structure collapsing by buckling into lateral bounds defined by the resilient structure at a height corresponding to a maximum lateral extent of the cavity, and during a second part of the range of travel of the compression at a further degree of compression than the first part, the resilient structure deforms by direct compression of the material of at least a buckled portion of the resilient structure between the upper and the outsole and/or by direct compression of the material of the at least a buckled portion of the resilient structure between the upper and the ground.

2. The energy return device of claim 1 further comprising a lateral expansion limiter arranged to resist lateral expansion of the resilient structure.

3. The energy return device of claim 1 in which the resilient structure when not compressed under the downward force comprises a domed structure.

4. The energy return device of claim 3 further comprising a guide support structure extending along walls of the domed structure and having greater stiffness in a radial or diagonal direction than the domed structure for shaping the collapse of the dome under the compression by the downward force.

5. The energy return device of claim 4 in which the guide support structure comprises a conical disk.

6. The energy return device of claim 4 in which the guide support structure comprises a web, the web having an interrupted Outer Diameter (OD).

7. The energy return device of claim 6 in which the web comprises radially extending fingers.

8. The energy return device of claim 4 in which the guide support structure is attached to an inside surface of the domed structure.

9. The energy return device of claim 4 in which the guide support structure has pockets or through holes that are radially aligned so as to make the insert conical disc insert more extensible or compressible in the circumstantial direction relative to the radial direction, such that under the compression by the downward force, the guide support structure flares out at a bottom end of the guide support structure increasing a strain deformation of and around a bottom of the domed structure.

10. The energy return device of claim 3 in which the domed structure when not compressed by the downward force has an upper average outer diameter at a plane perpendicular to the height direction at 75% of a stack height that is <150%, <149%, <148%, <147%, <146%, <145%, <144%, <143%, <142%, <141%, or <140% and >70%, >71%, >72%, >73%, >74%, >75%, >76%, >77%, >78%, >79%, or >80% of a lower average inner diameter at a plane perpendicular to the height direction at 25% of the stack height.

11. The energy return device of claim 3 further comprising an opening in the outsole, and in which the opening for air to enter the cavity is present and aligned with the opening in the outsole or the structure is permeable to air.

12. The energy return device of claim 11 in which the outsole has a tread design which allows air to flow in and out of the conical disk assembly and to the edges of the outsole when it is in contact with the ground.

13. The energy return device of claim 11 in which the opening for air to enter the cavity is present and aligned with the opening in the outsole and a ceiling of the cavity comprises a surface adapted to contact ground under the shoe in use.

14. The energy return device of claim 1 in which the energy return device has greater than 40%, or greater than 50% of a total energy return within a portion of the range of travel corresponding to the downward force being less than 50% of the downward force applied from the typical wearer.

15. The energy return device of claim 1 in which a portion of the resilient structure forming 80% or more, 70% or more, 60% or more, 50% or more, 40% or more, 30% or more, 20% or more, or 10% or more of a height of the resilient structure, when not compressed under the downward force, is positioned within the horizontal footprint of the cavity.

16. The energy return device of claim 1 in which, when the resilient structure is compressed in the height direction, there is a degree of compression less than or equal to the compression of the device under the downward force applied from the typical wearer at which a set of points of the resilient structure forming, when the structure is not compressed under the downward force, a straight line in a vertical cross section of the resilient structure having an angle in relation to the height direction representing an outer wall angle of the resilient structure, are shifted under the degree of compression to form a curve that crosses a plane perpendicular to the height direction 3 times or more.

17. The energy return device of claim 1 in which, when the resilient structure is compressed in the height direction, there is a degree of compression less than or equal to the compression of the device under the downward force applied from the typical wearer at which a set of points of the resilient structure forming, when the structure is not compressed under the downward force, a straight line in a vertical cross section of the resilient structure having an angle in relation to the height direction representing an outer wall angle of the resilient structure, are shifted under the degree of compression to form a curve that crosses a plane 3 times or more where the plane is tilted by 1 to 2 deg, 2 to 3 deg, 3 to 4 deg, 4 to 5 deg, 5 to 6 deg, 6 to 7 deg, 7 to 8 deg, 8 to 9 deg, 9 to 10 deg, 10 to 11 deg, 11 to 12 deg, 12 to 13 deg, 13 to 14 deg, 14 to 15 deg, 15 to 16 deg, 16 to 17 deg, 17 to 18 deg, 18 to 19 deg, or 19 to 20 deg from being perpendicular to the height direction.

18. The energy return device of claim 1 in which the resilient structure has an outer surface and an angle of the outer surface of the resilient structure measured from vertical is >15 deg, >16 deg, >17 deg, >18 deg, >19 deg, >20 deg, >21 deg, >22 deg, >23 deg, >24 deg, >25 deg, >26 deg, >27 deg, >28 deg, >29 deg, >30 deg, >31 deg, >32 deg, >33 deg, >34 deg, >35 deg, >36 deg, >37 deg, >38 deg, >39 deg, >40 deg, >41 deg, >42 deg, >43 deg, >44 deg, >45 deg, >46 deg, >47 deg, >48 deg, >49 deg, >50 deg, >51 deg, >52 deg, >53 deg, >54 deg, or >55 deg measured over 40% or more, 50% or more, 60% or more, or 70% or more of a height distance from the outsole to the upper.

19. The energy return device of claim 1 having the opening for air to enter the cavity and in which the opening has a check valve biased to resist air flow out of the cavity.

20. The energy return device of claim 19 in which the resilient structure further defines a second opening to the cavity, the second opening having a restricted orifice.

21. The energy return device of claim 1 having the opening for air to enter the cavity in which the opening has an orifice restricted in size to cause greater resistance to compression, as compared to energy return in expansion from the energy return device.

22. The energy return device of claim 1 having the opening for air to enter the cavity and in which the opening is adapted to be restricted by the downward force applied from the typical wearer.

23. The energy return device of claim 22 in which the opening is located at a heelward end of the resilient structure and adapted to be restricted by the downward force applied by a heel strike and become less restricted as the user moves forward in a stride.

24. The energy return device of claim 1 in which the resilient structure is formed of closed cell foam.

25. A shoe having a midsole comprising one or more energy return devices of claim 1.

26. The shoe of claim 25 in which the one or more energy return devices are multiple energy return devices and the shoe comprising at least an energy return device of the multiple energy return devices under the heel of the shoe and plural energy return device of the multiple energy return devices under the forefoot of smaller diameter and height than the at least an energy return device under the heel.

27. The shoe of claim 25 further comprising a wedge of compressible foam or deformable material ahead of the forwardmost energy return device connecting a bottom surface of the upper with a top surface of the outsole, that shears as the stance progresses toward toe-off, and the resistance to shearing of this member un-shears the structure during toe-off.

28. The shoe of claim 25 in which the one or more energy return devices are multiple energy return devices and in which the multiple energy return devices are arranged from the heel to the forefoot so that a second energy return device of the multiple energy return devices begins to compress from foot strike pressure before a previous disk is fully compressed.

29. The energy return device of claim 1 where compression of the compressible foam or matrix material of the resilient structure between the upper and the outsole during the second part of the range of travel includes vertical compression of a now-horizontal sidewall.

30. The energy return device of claim 4 in which the resilient structure when not compressed under the downward force comprises a domed structure, the energy return device further comprising a lateral expansion limiter arranged to resist lateral expansion of the domed structure, the lateral expansion limiting structure comprising a ring about a base of the domed structure.

* * * * *